United States Patent
Isono et al.

(10) Patent No.: US 6,604,795 B2
(45) Date of Patent: Aug. 12, 2003

(54) BRAKING SYSTEM INCLUDING HIGH-PRESSURE SOURCE BETWEEN MASTER CYLINDER AND BRAKE CYLINDER

(75) Inventors: Hiroshi Isono, Toyota (JP); Takayuki Yamamoto, Aichi-gun (JP); Yasuji Mizutani, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/025,456

(22) Filed: Dec. 26, 2001

(65) Prior Publication Data

US 2002/0084693 A1 Jul. 4, 2002

(30) Foreign Application Priority Data

Dec. 28, 2000 (JP) ........................................ 2000-402219
Dec. 28, 2000 (JP) ........................................ 2000-402220
Aug. 15, 2001 (JP) ........................................ 2001-246366

(51) Int. Cl.$^7$ .............................................. B60T 13/18
(52) U.S. Cl. ........................ 303/11; 303/116.2; 303/15; 303/115.4; 303/116.1
(58) Field of Search .................. 303/11, 116.2, 303/15, 115.4, 116.1, 113.1, 115.5, 115.1, 115.2

(56) References Cited

U.S. PATENT DOCUMENTS

| | | | |
|---|---|---|---|
| 4,755,008 A | * 7/1988 | Imoto et al. | 303/113.2 |
| 6,126,248 A | * 10/2000 | Kawahata et al. | 303/114.1 |
| 6,290,310 B1 | * 9/2001 | Kusano | 303/122.11 |
| 6,309,032 B1 | * 10/2001 | Kusano et al. | 303/116.1 |
| 6,412,882 B1 | * 7/2002 | Isono et al. | 303/114.1 |
| 6,467,266 B1 | * 10/2002 | Kanazawa et al. | 60/552 |

FOREIGN PATENT DOCUMENTS

| | | |
|---|---|---|
| JP | A 10-502889 | 3/1978 |
| JP | A 4-163268 | 6/1992 |
| JP | A 8-216869 | 8/1996 |
| JP | A 9-507663 | 8/1997 |
| JP | A 9-511967 | 12/1997 |
| JP | A 11-20672 | 1/1999 |

* cited by examiner

*Primary Examiner*—Jack Lavinder
*Assistant Examiner*—Benjamin A Pezzlo
(74) *Attorney, Agent, or Firm*—Oliff & Berridge, PLC

(57) ABSTRACT

A braking system including (a) a hydraulically operated brake cylinder for operating a brake, (b) a master cylinder operable according to an operation of a manually operable brake operating member, to pressurize a working fluid, (c) a master-cylinder cut-off valve connected to the master cylinder, (d) a high-pressure source such as a power-operated pressure-control cylinder disposed between the master-cylinder cut-off valve and the brake cylinder and operable according to the operation of the brake operating member, to pressurize the fluid, the high-pressure source including a power-operated drive device and a pressure-control cylinder having a control piston which is operable by the power-operated drive device and which partially defines on respective front and rear sides thereof a front control-pressure chamber connected to the brake cylinder, and a rear pressure chamber which is held in communication with the master cylinder, and (e) a braking-pressure control device (200) operable to control the power-operated drive device, to thereby control the pressure of the fluid in the brake cylinder.

56 Claims, 19 Drawing Sheets

BRAKING SYSTEM INCLUDING HIGH-PRESSURE SOURCE BETWEEN MASTER CYLINDER AND BRAKE CYLINDER

This application is based on Japanese Patent Application No. 2000-402219 filed on Dec. 28, 2000, No. 2000-402220 filed on Dec. 28, 2000, and No. 2001-246366 filed on Aug. 15, 2001, the contents of which are incorporated hereinto by reference.

BACKGROUND OF THE INVENTION

1. Field of the Invention

The present invention relates to a braking system.

2. Discussion of Related Art

JP-A-9-511967 discloses a braking system including (a) brake cylinder arranged to operate a brake with a hydraulic pressure, (b) a master cylinder including a pressurizing piston which is operated according to an operation of a manually operable brake operating member, to pressurize a working fluid in a pressurizing chamber formed in front of the pressurizing piston, (c) a high-pressure source in the form of a pressure-control cylinder including a control piston operated according to an operation of an electric motor, and having a control pressure chamber which is formed in front of the control piton and which is connected to the brake cylinder, and (d) a braking-pressure control device operable to control an electric energy to be supplied to the electric motor, for controlling a pressure of the fluid in the control pressure chamber of the pressure control cylinder, to thereby control the fluid pressure in the brake cylinder.

SUMMARY OF THE INVENTION

It is therefore an object of the present invention to provide a braking system which provides improvements over a known braking system as disclosed in the above-identified publication, for instance, improved efficiency of utilization of the electric energy and/or reduction of a required amount of consumption of the electric energy in various manners.

The above object may be achieved by a braking system constructed according to any one of the following modes of the present invention, each of which is numbered like the appended claims and depends from the other mode or modes, where appropriate, to indicate and clarify possible combinations of elements or technical features. It is to be understood that the present invention is not limited to the technical features or any combinations thereof which will be described for illustrative purpose only. It is to be further understood that a plurality of elements or features included in any one of the following modes of the invention are not necessarily provided all together, and that the invention may be embodied without some of the elements or features described with respect to the same mode.

(1) A braking system comprising: (a) a hydraulically operated brake cylinder for operating a brake, (b) a master cylinder operable according to an operation of a manually operable brake operating member, to pressurize a working fluid, (c) a master-cylinder cut-off valve connected to the master cylinder, (d) a high-pressure source disposed between the master-cylinder cut-off valve and the brake cylinder and operable according to the operation of the brake operating member, to pressurize the fluid, the high-pressure source including a power-operated drive device and a pressure-control cylinder having a control piston which is operable by the power-operated drive device and which partially defines a front control-pressure chamber and a rear pressure chamber on respective front and rear sides thereof, the front control-pressure chamber being connected to the brake cylinder while the rear pressure chamber being held in communication with the master cylinder, and (e) a braking-pressure control device operable to control the power-operated drive device, to thereby control the pressure of the fluid in the brake cylinder.

In the braking system according to the above mode (1) of the present invention, the brake cylinder can be operated with not only the pressure of the fluid pressurized by the high-pressure source, but also the pressure of the fluid which is pressurized by the master cylinder. In other words, the pressurized fluid delivered from the master cylinder can be utilized, in addition to the pressurized fluid delivered from the high-pressure source, to operate the brake cylinder. Accordingly, the high-pressure source can be economically operated with a comparatively small amount of electric energy, and the brake cylinder can be operated to produce a relatively high braking effect. The fluid pressure in the brake cylinder is controlled by the pressure-control cylinder operated by the power-operated drive device under the control of the braking-pressure control device. Further, the rear pressure chamber is connected to the master cylinder such that the rear pressure chamber is normally held in communication with the master cylinder, so that the fluid pressurized by the master cylinder can be utilized to control the fluid pressure in the brake cylinder. In a conventional braking system wherein the fluid pressure in the brake cylinder is controlled by the pressure-control cylinder, the master cylinder is communicated with a stroke simulator but is not utilized to control the fluid pressure in the brake cylinder. In the braking system according to the above mode (1), on the other hand, the pressurized fluid delivered from the master cylinder is used to control the brake cylinder pressure, so that the drive force required to be produced by the power-operated drive device to operate the control piston of the pressure-control cylinder is accordingly reduced (2) A braking system comprising: (a) a hydraulically operated brake cylinder for operating a brake, (b) a master cylinder operable according to an operation of a manually operable brake operating member, to pressurize a working fluid, (c) a master-cylinder cut-off valve connected to the master cylinder, (d) a high-pressure source disposed between the master-cylinder cut-off valve and the brake cylinder and operable according to the operation of the brake operating member, to pressurize the fluid, the high-pressure source including a power-operated drive device and a pressure-control cylinder having a control piston which is operable by the power-operated drive device and which partially defines a front control-pressure chamber and a rear pressure chamber on respective front and rear sides thereof, the front control-pressure chamber being connected to the brake cylinder while the rear pressure chamber being normally held in communication with the master cylinder, and (e) a braking-pressure control device operable to control the power-operated drive device, to thereby control the pressure of the fluid in the brake cylinder.

The braking system according to the above mode (2) has substantially the same advantage as the braking system according to the above mode (1).

(3) A braking system according to the above mode (2), further comprising a fluid passage connecting the master cylinder and the control-pressure chamber, and wherein the master-cylinder cut-off valve is disposed in the fluid passage, and has an open state in which the master cylinder and the control-pressure chamber are communicated with each other, and a closed state in which the master cylinder and the control-pressure chamber are isolated from each other.

In the braking system according to the above mode (3), the master-cylinder cut-off valve is disposed in the fluid passage connecting the master cylinder and the control-pressure chamber of the pressure-control cylinder. When the master-cylinder cut-off valve is placed in the open state, the master cylinder is communicated with the brake cylinder through the cut-off valve, so that the pressurized fluid delivered from the master cylinder is supplied to the brake cylinder, to operate the brake. When the master-cylinder cut-off valve is placed in the closed state, the control-pressure chamber is isolated from the master cylinder, and the fluid pressurized in the control-pressure chamber is delivered to the brake cylinder, to operate the brake.

(4) A braking system according to the above mode (2) o (3), wherein the braking-pressure control device includes an operation detecting portion operable to detect an operating state of the brake operating member, the braking-pressure control device controlling the power-operated drive device on the basis of the operating state detected by the operation detecting portion.

In the braking system according to the above mode (4), the power-operated drive device to operate the pressure-control cylinder is controlled on the basis of the detected operating state of the manually operable brake operating member.

The operation detecting portion may detect the operating state of the brake operating member, on the basis of an output signal of an operation detector or sensor, such as a sensor for detecting an operating amount of the brake operating member, such as an operating force or stroke, or a sensor for detecting a physical quantity corresponding to the operating amount of the brake operating member, such as the fluid pressure in the master cylinder, or any other fluid pressure equivalent to the master cylinder pressure. The physical quantity may be a deceleration value of an automotive vehicle which is equipped with the present braking system. The power-operated drive device, which is controlled on the basis of the detected operating state of the brake operating member, may be controlled according to the detected operating state of the brake operating member, or a state of change of the detected operating state.

(5) A braking system according to any one of the above modes (2)–(4), wherein the braking-pressure control device controls the power-operated drive device such that the pressure of the fluid in the control-pressure chamber is controlled to a level determined by the detected operating state of the brake operating member.

In the braking system according to the above mode (5), the fluid pressure in the control-pressure chamber is controlled to the level corresponding to the detected operating state of the brake operating member, so that the fluid pressure in the brake cylinder is controlled to that level.

(6) A braking system according to any one of the above modes (2)–(5), which is arranged such that a volume of the rear pressure chamber is changed as the manually operated brake operating member is operated, while the power-operated drive device is controlled to operate the control piston of the pressure-control cylinder.

(7) A braking system according to any one of the above modes (2)–(7), which is arranged such that the pressure of the fluid in the rear pressure chamber is controlled to a level corresponding to an operating force of the manually operable brake operating member, while the power-operated drive device is controlled to operate the control piston of the pressure-control cylinder.

Since the rear pressure chamber is communicated with the master cylinder, the fluid can flow between the rear pressure chamber and the master cylinder. Where the braking system is arranged such that the volume of the rear pressure chamber is changed as the brake operating member is operated and such that the fluid pressure in the rear pressure chamber is controlled to the level corresponding to the operating force of the brake operating member, the brake operating member may be given a reaction force corresponding to its operating force. In this case, the pressure-control cylinder is considered to function as a stroke simulator, and therefore the braking system does not require an exclusive stroke simulator.

(8) A braking system according to any one of the above modes (3)–(7), wherein the master-cylinder cut-off valve is an electromagnetic shut-off valve which is switched at least between the open and closed state depending upon an amount of electric current applied thereto, and the braking-pressure control device controls the power-operated drive device to control the fluid pressure in the brake cylinder, while the electromagnetic shut-off valve is placed in the closed state.

In the braking system according to the above mode (8), the fluid pressure in the control-pressure chamber is controlled while the control-pressure chamber of the pressure-control cylinder is isolated or disconnected from the master cylinder.

(9) A braking system according to any one of the above modes (2)–(8), wherein the control piston of the pressure-control cylinder has a rear pressure-receiving surface partially defining the rear pressure chamber and a rear pressure-receiving surface partially defining the control-pressure chamber, the pressure-receiving surface having a smaller area than the front pressure-receiving surface.

In the braking system according to the above mode (9) wherein the area of the rear pressure-receiving surface partially defining the rear pressure chamber of the pressure-control cylinder is made smaller than that of the front pressure-receiving surface partially defining the control-pressure chamber, the amount of the fluid supplied from the master cylinder to the rear pressure chamber is made smaller than the amount of the fluid delivered from the control-pressure chamber to the brake cylinder. This arrangement is effective to reduce an increase in the amount of the pressurized fluid required to be delivered to the rear pressure chamber of the pressure-control cylinder, so that the required operating stroke of the brake operating member to provide a given braking effect can be reduced. Since the required operating stroke can be reduced while the maser cylinder is isolated from the brake cylinder, the master cylinder need not be connected to a stroke simulator, because the pressure-control cylinder achieves substantially the same function as a stroke simulator connected to the master cylinder.

(10) A braking system according to any one of the above modes (2)–(9), wherein the master cylinder includes a pressurizing piston which is connected to the manually operable brake operating member and which includes a rear large-diameter portion on the side of the brake operating member, and a front small-diameter portion partially defining a pressurizing chamber in front of the small-diameter portion, the front small-diameter portion having a smaller diameter than the rear large-diameter portion, and wherein the pressurizing chamber of the master cylinder is connected to the rear pressure chamber of the pressure-control cylinder.

In the master cylinder of the braking system according to the above mode (10), the pressurizing chamber is partially defined by the front small-diameter portion of the pressurizing piston, which has a smaller diameter than the rear large-diameter portion on the side of the brake operating member. Accordingly, the fluid pressure in the pressurizing chamber when the brake operating member is operated at a given operating force can be made higher than in a master cylinder in which the pressurizing piston does not have the small-diameter and large-diameter portions. Thus, the present arrangement permits a relatively higher fluid pressure in the pressurizing chamber for a given operating force of the brake operating member, that is, a relatively high boosting ratio of the brake operating force.

The fluid pressure in the brake cylinder while the brake cylinder is communicated with the master cylinder can be made comparatively high for a give operating force of the brake operating member, so that the reduction of the fluid pressure in the brake cylinder while the pressure-control cylinder is not in operation.

(11) A braking system characterized comprising:
  a hydraulically operated brake cylinder for operating a brake;
  a master cylinder operable according to an operation of a manually operable brake operating member, to pressurize a working fluid;
  a power-operated drive device;
  a pressure-control cylinder having a control piston which is operable by the power-operated drive device and which partially defines a front control-pressure chamber and a rear pressure chamber on respective front and rear sides thereof, the front control-pressure chamber being connected to the brake cylinder while the rear pressure chamber being directly connected through a fluid passage to the master cylinder; and
  a braking-pressure control device operable to control the power-operated drive device, to thereby control the pressure of the fluid in the brake cylinder.

In the braking system according to the above mode (11) wherein the master cylinder and the rear pressure chamber of the pressure-control cylinder are directly communicated with each other through a fluid passage which is not provided with any valve or stroke simulator.

The technical feature according to any one of the above modes (1)–(10) is applicable to the braking system according to the above mode (11).

(12) A braking system according to the above mode (1), wherein the master cylinder includes a pressurizing piston which partially defines a pressurizing chamber and which is operable by the manually operable brake operating member, to pressurize the fluid in the pressurizing chamber, and the high-pressure source comprises a power-operated drive device, and a pressure-control cylinder having a control piston which is operable by the power-operated drive device and which partially defines a front control-pressure chamber and a rear pressure chamber on respective front and rear sides thereof, the front control-pressure chamber being connected to the brake cylinder, while the rear pressure chamber being connected to the pressurizing chamber such that a pressure of the fluid pressurized in the pressurizing chamber is applicable to the rear pressure chamber, the braking system further comprising a braking-pressure control device operable to control an electric energy to be applied to the power-operated drive device, for controlling the pressure of the fluid in the front control-pressure chamber, to thereby control the pressure of the fluid in the brake cylinder.

In the braking system according to the above mode (12) of this invention, the supply or application of an electric energy or power to the power-operated drive device is controlled to control a drive force which acts on the control piston of the pressure-control cylinder. As a result, the pressure of the fluid in the control-pressure chamber formed in front of the control piston is controlled to control the pressure of the fluid in the brake cylinder. During this control of the power-operated drive device, the fluid pressurized in the pressurizing chamber of the master cylinder is delivered to the rear pressure chamber of the pressure-control cylinder. Thus, the pressurized fluid delivered from the pressurizing chamber of the master cylinder is utilized by the pressure-control cylinder to control the fluid pressure in the brake cylinder. Accordingly, the required amount of electric energy to operate the power-operated drive device can be reduced.

In a braking system equipped with a pressure-control cylinder operated according to an operation of a power-operated drive device, the fluid pressure in the brake cylinder is usually controlled while the brake cylinder is isolated from the master cylinder. In the conventional braking system of this type, the fluid pressurized by the master cylinder is not utilized to control the fluid pressure in the brake cylinder. In the braking system according to the above mode (12), the pressurized fluid delivered from the master cylinder is utilized to control the fluid pressure in the brake cylinder.

For instance, the fluid pressurized by the master cylinder is delivered to the rear pressure chamber of the pressure-control cylinder, to increase the fluid pressure in the rear pressure chamber, for thereby assisting the power-operated drive device to drive the control piston. Where the fluid pressure in the brake cylinder cannot be controlled by the pressure-control cylinder due to a failure or defect of the power-operated drive device, the pressurized fluid may be delivered from the master cylinder to the rear pressure chamber of the pressure-control cylinder, so that the control piston is advanced with a force based on the fluid pressure in the rear pressure chamber, to thereby increase the fluid pressure in the control-pressure chamber. Conventionally, the pressurized fluid discharged from the master cylinder while the master cylinder is disconnected from the brake cylinder is absorbed or accommodated in a stroke simulator, but is not utilized to increase the fluid pressure in the brake cylinder. According to the above mode (12) of this invention, however, the pressurized fluid in the master cylinder is effectively used to control the brake cylinder pressure. Further, the reduction of the brake cylinder pressure due to a discharge flow of the pressurized fluid from the rear pressure chamber can be reduced by providing suitable means for restricting or inhibiting the discharge flow of the fluid from the rear pressure chamber.

The pressurized fluid may be delivered from the pressurizing chamber of the master cylinder either directly or indirectly to the rear pressure chamber of the pressure-control cylinder. For instance, the indirect delivery may be achieved via a stroke simulator disposed in a fluid passage connecting the pressurizing chamber and the rear pressure chamber, as described below. In this case, the pressurized fluid is delivered to one of two variable-volume chambers of the stroke simulator, so that the volume of the other variable-volume chamber is reduced to deliver the fluid to the rear pressure chamber. In this case, too, the pressure of the fluid pressurized in the pressurizing chamber of the master cylinder is substantially applied to the rear pressure chamber through the stroke simulator, although the pressure of the pressurized fluid applied to the rear pressure chamber and the rate of flow of the fluid into the rear pressure chamber are not necessarily exactly equal to the fluid pressure in the pressurizing chamber and the rate of delivery of the pressurized fluid from the pressurizing chamber.

The power-operated drive device may includes an operating portion such as an electric motor, and an energy source such as a battery.

(13) A braking system according to the above mode (12), further comprising a stroke simulator including:

a housing;

a simulator piston slidably received within the housing and cooperating with the housing to define a first variable-volume chamber and a second variable-volume chamber, the first variable-volume chamber being connected to the pressurizing chamber of the master cylinder, while the second variable-volume chamber being connected to the rear pressure chamber of the pressure-control cylinder; and biasing means for biasing the simulator piston in a direction that causes a volume of the first variable-volume chamber to be reduced.

In the braking system according to the above mode (13), the pressurized fluid is delivered from the pressurizing chamber of the master cylinder indirectly to the rear pressure chamber of the pressure-control cylinder through the stroke simulator. When the pressurized fluid is delivered from the master cylinder to the first variable-volume chamber, the fluid is delivered from the second variable-volume chamber to the rear pressure chamber of the pressure-control cylinder.

Where the fluid pressure in the brake cylinder is controlled while the master cylinder is isolated from the brake cylinder, the master cylinder is usually connected to a stroke simulator. In this case, the fluid pressurized in the second variable-volume chamber can be utilized for the pressure-control cylinder.

When the brake operating member is released, the pressurized fluid may be discharged from the rear pressure chamber to the second variable-volume chamber, so that the fluid can be returned from the first variable-volume chamber to the master cylinder.

(14) A braking system according to the above mode (13), which is arranged such that an amount of increase of the volume of the rear pressure chamber is larger than an amount of decrease of the second variable-volume chamber of the stroke simulator.

In the braking system according to the above mode (14), the entire amount of the fluid discharged from the second variable-volume chamber of the stroke simulator can be accommodated in the rear pressure chamber of the pressure-control cylinder. Thus, the fluid in the second variable-volume chamber can be effectively used to operate the control piston. Further, the delivery of the fluid from the second variable-volume chamber into the rear pressure chamber prevents an excessive rise of the fluid pressure in the second variable-volume chamber, thereby avoiding an excessive increase of the reaction force acting on the manually operable brake operating member being depressed by the operator.

(15) A braking system according to any one of the above modes (12)–(14), further comprising:

a low-pressure source which stores the working fluid under a pressure substantially equal to an atmospheric pressure; and a valve device disposed in a fluid passage connecting the low-pressure source and the rear pressure chamber of the pressure-control cylinder, and operable to control a flow of the fluid between the low-pressure source and the rear pressure chamber.

In the braking system according to the above mode (15), the valve device is disposed between the low-pressure-source and the rear pressure chamber of the pressure-control cylinder.

The valve device may be arranged to permit a flow of the fluid in a direction from the low-pressure source toward the rear pressure chamber when the fluid pressure in the low-pressure source is higher than that in the rear pressure chamber. This arrangement prevents the fluid pressure in the rear pressure chamber from being lowered below the atmospheric level, and is preferably employed in the braking system according to the above mode (14). Alternatively, the valve device may be arranged to permit a flow of the fluid from the low-pressure source to the rear pressure chamber when the amount of increase of the volume of the rear pressure chamber is larger than the amount of decrease of the volume of the second variable-volume chamber of the stroke simulator. This arrangement also prevents the fluid pressure in the rear pressure chamber from being lowered below the atmospheric level. In this case, the fluid passage provided with the valve device may be considered to serve as a passage for supplying the rear pressure chamber with an additional amount of the fluid which supplements the amount delivered from the second variable-volume chamber.

The valve device may also be arranged to prevent a flow of the fluid in a direction from the rear pressure chamber toward the low-pressure source when the fluid pressure in the rear pressure chamber is higher than that in the low-pressure source. This arrangement for preventing the fluid flow from the rear pressure chamber toward the low-pressure source prevents a drop of the fluid pressure in the rear pressure chamber. Further alternatively, the valve device may be operable between an open state for fluid communication between the rear pressure chamber and the low-pressure source, and a closed state for isolation of the rear pressure chamber and the low-pressure source from each other. In this case, the valve device permits a flow of the fluid from the rear pressure chamber back to the low-pressure source, and a supply of the fluid from the low-pressure source to the rear pressure chamber.

The valve device may be a solenoid-operated or electromagnetic control valve operable by application of an electric current to a solenoid coil, or may be a mechanically operated control valve. Where the valve device is an electromagnetic control valve, it may be an electromagnetic shut-off valve which is opened and closed by energization or de-energization of its solenoid coil. Alternatively, the valve device may be an electromagnetic flow control valve the opening of which is controllable depending upon an amount of an electric current applied to its solenoid coil. The electromagnetic control valve may be a normally open valve which is placed in its open state while its solenoid is in a de-energized state, or a normally closed valve which is placed in its open state while its solenoid is in the de-energized state. The mechanically operated control valve may be a check valve, a pressure-relief valve, a pilot-operated shut-off valve, a pressure regulating valve or a flow control valve.

(16) A braking system according to the above mode (15), wherein the valve device includes a check valve which permits a flow of the fluid in a first direction from the low-pressure source toward the rear pressure chamber and inhibits a flow of the fluid in a second direction opposite to the first direction.

The check valve, which permits the fluid flow from the low-pressure source toward the rear pressure chamber but inhibits the fluid flow from the rear pressure chamber toward the low-pressure source, prevents a drop of the fluid pressure in the rear pressure chamber below the atmospheric level. Further, this check valve does not require an electric energy, unlike an electromagnetic control valve described below with respect to the following mode (17).

(17) A braking system according to the above mode (15) or (16), wherein the valve device includes an electromagnetic control valve which is placed in an open state while the control piston is being advanced.

The fluid is supplied from the low-pressure source to the rear pressure chamber through the electromagnetic control valve placed in the open state during the advancing movement of the control piston, so that it is possible to prevent a drop of the fluid pressure in the rear pressure chamber below the atmospheric level.

If the electromagnetic control valve is placed in the open state also during a retracting movement of the control piston, that is, during reduction of the volume of the rear pressure chamber, the fluid can be returned from the rear pressure chamber back to the low-pressure source when the fluid pressure in the brake cylinder is reduced, or when the brake operating member is released. In this case, the rate or amount of reduction of the fluid pressure in the rear pressure chamber can be controlled by controlling the electromagnetic control valve. Accordingly, it is possible to control the rate or amount of reduction of the fluid pressure in the control-pressure chamber of the pressure-control cylinder, that is, the rate or amount of reduction of the fluid pressure in the brake cylinder.

If the electromagnetic control valve is placed in its closed state when it is required to hold the fluid pressure in the brake cylinder, the retracting movement of the control piston is restricted or prevented, as described below, so that the fluid pressure in the control-pressure chamber can be maintained at the present level, without applying an electric energy to the power-operated drive device.

The valve device may include both of the check valve according to the above mode (16) and the electromagnetic control valve according to the above mode (17). In this case, these check valve and electromagnetic valve are preferably disposed in parallel connection with each other.

(18) A braking system according to any one of the above modes (12)–(17), further comprising a flow-restricting device operable to restrict a discharge flow of the fluid from the rear pressure chamber when the fluid pressure in the brake cylinder is required to be held at a present level.

While the flow-restricting device is preferably a flow-inhibiting device operable to inhibit the fluid flow from the rear pressure chamber, the flow-restricting device may be arranged to assure slow reduction of the fluid pressure in the rear pressure chamber, or prevent rapid reduction of the fluid pressure down to the atmospheric level.

(19) A braking system characterized by comprising:
  a hydraulically operated brake cylinder for operating a brake;
  a master cylinder operable according to an operation of a manually operable brake operating member, to pressurize a working fluid;
  a power-operated drive device;
  a pressure-control cylinder having a control piston which is operable by the power-operated drive device and which partially defines a front control-pressure chamber and a rear pressure chamber on respective front and rear sides thereof, the front control-pressure chamber being connected to the brake cylinder;
  a braking-pressure control device operable to control an electric energy to be applied to the power-operated drive device, for controlling the pressure of the fluid in the front control-pressure chamber, to thereby control the pressure in the brake cylinder, while the brake cylinder is isolated from the master cylinder; and
  a flow-restricting device operable to restrict a discharge flow of the fluid from the rear pressure chamber when the fluid pressure in the brake cylinder is required to be held at a present level.

In the braking system according to the above mode (19), the supply or application of electric current to the power-operated drive device is controlled while the brake cylinder is isolated from the master cylinder. Accordingly, a drive force produced by the power-operated drive device and applied to the control piston is controlled to control the fluid pressure in the front control-pressure chamber. While the fluid pressure in the brake cylinder is required to be held at the present level, the discharge flow of the fluid from the rear pressure chamber is restricted to prevent rapid reduction of the fluid pressure in the rear pressure chamber down to the atmospheric level, for thereby restricting a retracting movement of the control piston, to restrict the fluid pressure reduction in the front control-pressure chamber. When the fluid pressure in the front control-pressure chamber is held at the present level, therefore, the power-operated drive device is not required to produce a drive device, or the required drive device can be reduced, so that the required amount of consumption of electric power by the power-operated drive device can be reduced to hold the fluid pressure in the brake cylinder.

Where the power-operated drive device includes an electric motor and a rotary motion of the electric motor is converted by a motion converting device into a linear motion of a ballscrew to move the control piston, for instance, the control piston is retracted after a force based on the fluid pressure in the control-pressure chamber becomes larger than the drive force acting on the control piston during operation of the electric motor. As a result, the fluid pressure in the control-pressure chamber is reduced with the retracting movement of the control piston. In this case, therefore, the electric energy is required to be kept applied to the electric motor, to prevent the retracting movement of the control piston, that is, to hold the fluid pressure in the control-pressure chamber.

In the above mode (19) of the invention, however, the discharge flow of the fluid from the rear pressure chamber is at least restricted by the flow-restricting device, so that the fluid pressure in the rear pressure chamber is increased to a level determined by the fluid pressure in the control-pressure chamber the configuration of the control piston, etc. Accordingly, the retracting movement of the control piston is prevented to prevent a drop of the fluid pressure in the control-pressure chamber. Since the fluid pressure in the rear pressure chamber is necessarily increased to the level resisting the pressure in the control-pressure chamber, without a drive force produced by the power-operated drive device, substantially no drive force is required to be produced by the power-operated drive device to maintain the fluid pressure in the control-pressure chamber, so that the required amount of consumption of electric energy by the power-operated drive device is reduced. Thus, it is not necessary apply an electric energy to the power-operated drive device, for the purpose of holding the fluid pressure in the control-pressure chamber, that is, unless the application of an electric energy to the drive device is required for any other purpose, for instance, for the purpose of preventing an uncontrolled movement of the ballscrew away from the control piston, to thereby prevent a retracting movement of the control piston, where the ballscrew and the control piston are not fixed to each other. To prevent this movement of the ballscrew, a relatively small amount of electric current is required to be applied to the power-operated drive device. The flow-restricting device has a particularly high effect of reducing the required electric power consumption by the drive device, when the braking system is held in the pressure hold mode for a relatively long time, for instance, where the vehicle equipped with the braking system is held stationary for a long time. The flow-restricting device also has an effect of reducing the operating noise and vibration of the braking system due to the operation of the electric motor.

Where the discharge flow of the fluid from the rear pressure chamber is not completely inhibited but is restricted, an abrupt drop of the fluid pressure in the rear pressure chamber down to the atmospheric level can be prevented, to restrict a retracting movement of the control piston, for reducing the amount of reduction of the fluid pressure in the control-pressure chamber. In this case, the power-operated drive device may be required to be operated to produce a relatively small drive force to hold the fluid pressure in the control-pressure chamber, so that the required electric power consumption by the drive device can be made smaller, than in the case where the fluid pressure in the rear pressure chamber is rapidly lowered to the atmospheric level.

As described above, the flow-restricting device is provided to prevent a rapid drop of the fluid pressure in the rear pressure chamber down to the atmospheric level, by at least restricting the discharge flow of the fluid from the rear pressure chamber. The flow-restricting device may be a flow-inhibiting device arranged to completely inhibit the discharge flow of the fluid from the rear pressure chamber. Usually, the rear pressure chamber of the pressure-control cylinder is connected to at least one of a reservoir, the master cylinder, and a brake cylinder portion of the braking system, which portion includes the control-pressure chamber and the brake cylinder. As described below with respect to the following modes (20)–(24) of the invention, the flow-restricting device may include at least one valve arranged to restrict the discharge flow of the fluid from the rear pressure chamber to the reservoir and master cylinder. The pressure-control cylinder may or may not be arranged to deliver the fluid from the rear pressure chamber to the brake cylinder portion of the braking system. Where the pressure-control cylinder is not so arranged, the flow-restricting device need not be arranged to restrict the discharge flow of the fluid from the rear pressure chamber to the brake cylinder portion. Even where the pressure-control cylinder is arranged to deliver the fluid from the rear pressure chamber to the brake cylinder portion, the flow-restricting device need not be arranged to prevent this fluid flow, since the fluid pressure in the control-pressure chamber is higher than that in the rear pressure chamber during operation of the pressure-control cylinder, so that the fluid is not freely discharged from the rear pressure chamber to the brake cylinder portion while the pressure-control cylinder is in operation. Although the fluid pressure in the rear pressure chamber may possibly be higher than that in the control-pressure chamber in some cases, the fluid pressure in the rear pressure chamber will not be made lower than that in the control-pressure chamber as a result of the discharge flow of the fluid from the rear pressure chamber. In this sense, the flow-restricting device is not necessary to prevent the discharge flow of the fluid from the rear pressure chamber to the brake cylinder portion. However, a fluid passage connecting the rear pressure chamber and the brake cylinder portion is desirably provided with a check valve which inhibits a flow of the fluid in a direction from the brake cylinder portion toward the rear pressure chamber but permits a flow of the fluid in the reverse direction.

The above mode (19) of the invention is applicable to the braking system according to any one of the above modes (12)–(18), and the following modes of the invention are also applicable to the braking systems of the above modes (12)–(18).

(20) A braking system according to the above mode (19), further comprising a reservoir system including a reservoir which stores the fluid at a pressure substantially equal to an atmospheric level, and wherein the flow-restricting device is disposed in a fluid passage connecting the reservoir system and the rear pressure chamber, the flow-restricting device restricting the discharge flow of the fluid from the rear pressure chamber to the reservoir system at least when the fluid pressure in the brake cylinder is required to be held at the present level.

The flow-restricting device may be an electromagnetically or mechanically operated control device, like the valve device as described above with respect to the above mode (15). Where the flow-restricting device is an electromagnetic control valve, it is preferably a normally closed valve since the normally closed valve requires a smaller amount of consumption of electric power than a normally open valve, to maintain the fluid pressure in the brake cylinder. The electromagnetic control valve provided as the flow-restricting device may serve as part of the valve device described above with respect to the above mode (15).

(21) A braking system according to the above mode (19) or (20), further comprising a master cylinder system including the master cylinder, and wherein the flow-restricting device restricts the discharge flow of the fluid from the rear pressure chamber to the master cylinder system at least when the fluid pressure in the brake cylinder is required to be held at the present level.

The fluid pressure in the rear pressure chamber can be made higher than that in the master cylinder, by restricting the discharge flow of the fluid from the rear pressure chamber to the master cylinder system.

(22) A braking system according to the above mode (21), wherein the master cylinder includes a pressurizing piston which partially defines a pressurizing chamber and which is advanced by an operation of the manually operable brake operating member, to pressurize the fluid in the pressurizing chamber, and the master cylinder system further includes a stroke simulator comprising (a) a housing, (b) a simulator piston slidably received within the housing and cooperating with the housing to define a first variable-volume chamber and a second variable-volume chamber, the first variable-volume chamber being connected to the pressurizing chamber of the master cylinder, while the second variable-volume chamber being connected to the rear pressure chamber of the pressure-control cylinder, and (c)

biasing means for biasing the simulator piston in a direction that causes a volume of the first variable-volume chamber to be reduced.

(23) A braking system according to the above mode (22), wherein the flow-restricting device is disposed on at least one of upstream and downstream sides of the stroke simulator which correspond to the first and second variable-volume chambers connected to the pressurizing chamber and the rear pressure chamber, respectively.

In the braking system according to the above mode (23), the discharge flow of the fluid from the rear pressure chamber to the master cylinder system is restricted by the flow-restricting device.

(24) A braking system according to the above mode (19), wherein the flow-restricting device restricts the discharge flow of the fluid from the rear pressure chamber to a portion of the braking system other than a brake cylinder portion which includes the brake cylinder.

In the braking system according to the above mode (24), the flow-restricting device restricts the discharge flow of the fluid to the reservoir system and/or the master cylinder system, which are other than the brake cylinder portion of the braking system.

The brake cylinder portion may be a portion of the braking system which is located between the rear pressure chamber and the brake cylinder and which includes the brake cylinder, a fluid passage connecting the pressure-control cylinder and the brake cylinder, and a portion of the pressure-control cylinder which is located between the rear pressure chamber and the brake cylinder.

(25) A braking system according to any one of the above modes (19)–(24), wherein the braking-pressure control device includes a pressure-hold-requirement detecting portion operable to detect a pressure-hold requirement for holding the fluid pressure in the brake cylinder, on the basis of an operating state of the manually operable brake operating member.

While various pressure control modes of the braking system in general will be described later, there will be described a pressure-hold requirement for controlling the braking system in a pressure hold mode to hold the brake cylinder pressure at the present level. The pressure-hold requirement may be detected or obtained on the basis of at least the operating state of the brake operating member by the operator. For instance, the pressure-hold requirement is detected when the operating state of the brake operating member is held substantially constant or steady.

Alternatively, the pressure-hold requirement can be detected on the basis of both the operating state of the brake operating member and a state of an automotive vehicle equipped with the present braking system. The state of the vehicle includes a running condition, and a braking effect produced by the braking system. For instance, the pressure-hold requirement is detected when the absolute value of a difference between a desired braking effect (determined by the operating state of the brake operating member) and an actual braking effect (braking force or deceleration value of the vehicle) is smaller than a predetermined threshold value.

The vehicle running condition may be taken into account in determining whether the pressure-hold requirement is present or not. For example, the absolute value of the threshold value indicated above may be changed depending upon whether the vehicle is running or stationary. The pressure-hold requirement while the vehicle is stationary may be handled as a long-pressure-hold requirement for holding the brake cylinder pressure for a relatively long time, as distinguished from a short-pressure-hold requirement while the vehicle is running.

(26) A braking system according to any one of the above modes (19)–(25), wherein the braking-pressure control device includes an electric-energy reducing portion operable to reduce an amount of electric energy applied to the power-operated drive device after initiation of restriction of the discharge flow of the fluid from the rear pressure chamber by the flow-restricting device, as compared with an amount of electric energy applied to the power-operated drive device before the initiation of restriction.

The fluid in the rear pressure chamber is pressurized while the discharge flow from this rear pressure chamber is restricted, so that the control piston receives a drive force corresponding to the amount of electric current applied to the power-operated drive device, and a force based on the fluid pressure in the rear pressure chamber. Accordingly, the amount of electric energy required to be applied to the drive device to maintain the fluid pressure in the control-pressure chamber at a given level can be reduced, by an amount corresponding to the force based on the fluid pressure in the rear pressure chamber.

(27) A braking system according to the above mode (25) or (26), wherein the braking-pressure control device includes a surface-area-based electric-energy reducing portion operable to reduce an amount of electric energy applied to the power-operated drive device, to a value determined by an amount of electric energy required to be applied to the power-operated drive device when the pressure-hold requirement is detected by the pressure-hold-requirement detecting portion, and a ratio of an area of a front pressure-receiving surface of the control piston which partially defines the front control-pressure chamber, to an area of a rear pressure-receiving surface of the control piston which partially defines the rear pressure chamber.

(28) A braking system according to the above mode (27), wherein the area of the rear pressure-receiving surface of the control piston is smaller than that of the front pressure-receiving surface.

As described above, the amount of electric current required to be applied to the drive device to maintain the fluid pressure in the control-pressure chamber at a given level is smaller when the fluid in the rear pressure chamber is pressurized than when it is not pressurized. In this case, the amount of electric energy can be reduced to a value corresponding to a ratio S2/S1, where "S1" and "S2" represent the areas of the front control-pressure chamber and the rear pressure chamber, respectively, as described in detail in DETAILED DESCRIPTION OF THE PREFERRED EMBODIMENTS.

(29) A braking system according to any one of the above modes (19)–(28), wherein the braking-pressure control device includes a stroke-based electric-energy control portion operable while the discharge flow of the fluid from the rear pressure chamber is restricted by the flow-restricting device, to control an amount of electric current to be applied to the power-operated drive device, on the basis of an operating stroke of the control piston, and a control-pressure-based electric-energy control portion operable when the discharge flow is not restricted by the flow-restricting device, to control the amount of electric current, on the basis of the fluid pressure in the control-pressure chamber.

In the braking system according to the above mode (29), the amount of electric current to be applied to the power-operated drive system is controlled on the basis of the operating stroke of the control piston when the discharge flow of the fluid from the rear pressure chamber is restricted by the flow-restricting device, and is controlled on the basis of the fluid pressure in the control-pressure chamber when the discharge flow is not restricted.

If the amount of electric current were controlled on the basis of the fluid pressure in the control-pressure chamber, for instance, the fluid pressure in the control-pressure chamber would vary, resulting in a variation in the amount of electric current applied to the drive device, when the flow-restricting device is switched from its non-flow-restricting state to its flow-restricting state. This variation of the fluid pressure would cause control hunting of the amount of the electric energy. Where the operating stroke of the control piston is detected on the basis of the number of revolution of an electric motor used as the power-operated drive device, the amount of variation of the operating stroke of the control piston upon switching of the flow-restricting device is relatively small, so that the control hunting of the amount of electric current is less likely to take place.

(30) A braking system according to any one of the above modes (25)–(29), wherein the braking-pressure control device reduces an amount of electric current to be applied to the power-operated drive device, to a predetermined value, when the pressure-hold-requirement detecting portion has detected the pressure-hold requirement.

The predetermined value may be zero, or a value larger than zero. Where the flow-restricting device is arranged to completely inhibit the discharge flow of the fluid from the rear pressure chamber, the fluid pressure in the control-pressure chamber can be maintained even if the amount of electric current to be applied to the drive device is zeroed. However, the amount of electric current may be zeroed even where the flow-restricting device is not arranged to inhibit the discharge flow but to restrict it, as described later in detail in the DETAILED DESCRIPTION. While the vehicle equipped with the braking system is stationary, the amount of electric current to be applied to the drive device may be reduced to a value at which the fluid pressure in the control-pressure chamber can be maintained. In this case, it is not required to accurately control the fluid pressure in the control-pressure chamber, since the requirement is merely holding the vehicle stationary.

(31) A braking system according to any one of the above modes (25)–(30), wherein the braking-pressure control device controls an amount of electric current to be applied to the power-operated drive device, to a value determined by an operating state of the manually operable brake operating member, when the pressure-hold-requirement detecting has detected the pressure-hold requirement.

Since the fluid pressure in the control-pressure chamber is usually controlled to a value determined by the operating state of the brake operating member, it is desirable to control the amount of electric energy to be applied to the drive device, to a value determined by the operating state of the brake operating member.

(32) A braking system according to any one of claims 19–31, wherein the flow-restricting device includes an electromagnetic control valve operable in response to a signal received from the braking-pressure control device, and the braking-pressure control device includes a valve and electric-energy control portion operable to control the electromagnetic control valve and an amount of electric energy to be applied to the power-operated drive device, on the basis of an operating state of the manually operable brake operating member, while the brake cylinder is isolated from the master cylinder.

In the braking system according to the above mode (32), the fluid pressure in the control-pressure chamber is controlled to control the fluid pressure in the brake cylinder, by controlling the amount of electric current to be applied to the power-operated drive device and the electromagnetic control valve (electromagnetic flow restricting valve) on the basis of the operating state of the brake operating member while the brake cylinder is isolated from the master cylinder. The operating state of the brake operating member may be detected by a suitable detecting device, which may be arranged to detect an operating amount such as an operating force or stroke of the brake operating member, or a physical quantity which varies with the operating amount of the brake operating member. The physical quantity may be the fluid pressure in the master cylinder or the brake cylinder, a deceleration value of the vehicle equipped with the braking system, or a deceleration value of a wheel of the vehicle. The fluid pressure in the control-pressure chamber may be controlled according to the operating state of the brake operating member, a state of change of the operating state, or both of the operating state and the state of change.

For instance, the amount of electric current and the electromagnetic flow-restricting valve may be controlled such that an actual value of a physical quantity relating to the braking state (such as an actual value of the brake cylinder pressure or an actual value of the vehicle or wheel deceleration value) coincides with a desired value (desired brake cylinder pressure or desired deceleration value) which is determined by the operating state of the brake operating member.

Described more specifically, one of pressure control modes of the braking system is selected on the basis of the operating state of the brake operating member, and the power-operated drive device and the electromagnetic flow-restricting valve are controlled in the selected pressure control mode. The pressure control mode is selected on the basis of a difference between the actual and desired values of the above-indicated physical quantity, or an amount of change of the operating state of the brake operating member (amount of change of the desired value determined by the brake operating state.

Where a pressure increase mode for increasing the brake cylinder pressure is selected, the power-operated drive device is operated in the forward direction to advance the control piston, by controlling the electric energy applied to the drive device. Then, the electromagnetic flow-restricting valve is preferably placed in its non-flow-restricting state permitting the supply flow of the fluid from the reservoir system or master cylinder system into the rear pressure chamber. If the electromagnetic flow-restricting valve were placed in the non-flow-restricting state before the control piston is advanced, the fluid pressure in the rear pressure chamber would be rapidly lowered, causing a rapid drop of the fluid pressure in the control-pressure chamber.

Where a pressure hold mode for holding the brake cylinder pressure is selected, the electromagnetic flow-restricting valve is placed in its flow-restricting state for restricting the discharge flow of the fluid from the rear pressure chamber, and the amount of electric current to be applied to the drive device is reduced.

Where a pressure decrease mode for reducing the brake cylinder pressure is selected, the power-operated drive device is operated in the reverse direction to retract the control piston, by controlling the electric energy applied to the drive device. Then, the electromagnetic flow-restricting valve is placed in its non-flow-restricting state permitting the discharge flow of the fluid from the rear pressure chamber to the reservoir system or master cylinder system. In the pressure decrease mode, it is not essential to positively retract the control piston, since the control piston is retracted with a force based on the fluid pressure in the control-pressure chamber, which force is larger than the drive force produced by the drive device. The fluid pressure in the control-pressure chamber is reduced with the retracting movement of the control piston. When the pressure hold mode is followed by the pressure decrease mode, the fluid pressure in the rear pressure chamber may be reduced by utilizing the flow-restricting device. The fluid pressure in the control-pressure chamber is reduced as the fluid pressure in the rear pressure chamber is reduced by controlling the flow-restricting device.

The power-operated drive device need not be operable in the opposite directions, and may be operable in only the forward direction, since the fluid pressure in the control-pressure chamber can be reduced by reducing the drive force produced by the drive device.

The braking-pressure control device in the braking system according to the above mode (32) is preferably arranged to be operable to control the fluid pressure in the brake cylinder connected to the control-pressure chamber of the pressure-control cylinder, during a normal operation of the brake operating member.

While the flow-restricting device in the above mode (32) includes at least one electromagnetic control valve, it may include two or more electromagnetic control valves, and/or at least one mechanically operated control valve such as a check valve.

(33) A braking system according to the above mode (32), further comprising a check valve device which permits a flow of the fluid in a first direction from the rear pressure chamber toward the brake cylinder and inhibits a flow of the fluid in a second direction opposite to the first direction, and wherein the valve and electric-energy control portion includes an electric-energy increasing and reducing portion operable to first increase the above-indicated amount of electric energy and place the electromagnetic control valve in a flow-inhibiting state for inhibiting the discharge flow of the fluid from the rear pressure chamber, when the pressure-hold-requirement detecting portion has detected the pressure-hold requirement, the electric-energy increasing and reducing portion then reducing the amount of electric energy after the amount of electric energy has been once increased and the electromagnetic control valve has been placed in the flow-inhibiting state.

In the braking system according to the above mode (33), the check valve device is disposed between the rear pressure chamber and the brake cylinder, so that a flow of the fluid in the from the brake cylinder to the rear pressure chamber is prevented to prevent a drop of the fluid pressure in the brake cylinder, even when the fluid pressure in the brake cylinder is higher than that in the rear pressure chamber. When the fluid pressure in the rear pressure chamber is higher than that in the brake cylinder, on the other hand, the fluid is delivered from the rear pressure chamber to the brake cylinder.

When the amount of electric energy to be applied to the drive device is zeroed in the pressure hold mode, the control piston is retracted with the fluid pressure in the control-pressure chamber. Accordingly, the volume of the control-pressure chamber is increased with a result of reduction of its fluid pressure, and the volume of the rear pressure chamber is reduced to increase its fluid pressure. While the fluid pressure in the rear pressure chamber is lower than that in the control-pressure chamber, the pressurized fluid is not discharged from the rear pressure chamber toward the brake cylinder. When the fluid pressure in the rear pressure chamber becomes higher than that in the brake cylinder, the pressurized fluid is discharged from the rear pressure chamber toward the brake cylinder. Where the area of the front pressure-receiving surface of the control piston which partially defines the control-pressure chamber is larger than that of the rear pressure-receiving surface which partially defines the rear pressure chamber, the control piston is moved to its fully retracted position at which the fluid pressure in the rear pressure chamber is equal to that in the brake cylinder, and is kept at that level. In this case, the fluid pressure in the control-pressure chamber is lower than the level at which the pressure-hold requirement was detected, since the volume of the control-pressure chamber has been increased as a result of the retracting movement of the control piston. In view of this, the amount of electric energy is increased to increase the fluid pressure in the control-pressure chamber before the amount of electric energy is zeroed. This arrangement is effective to reduce the amount of reduction of the fluid pressure in the control-pressure chamber when the amount of electric current is zeroed. The fluid pressure in the control-pressure chamber upon zeroing of the amount of electric current can be made higher than the level upon detection of the pressure-hold requirement, if the amount of electric current has been increased to a relatively large value before zeroing of the amount of electric energy.

The amount of electric current to be applied to the drive device may be reduced to zero, or to a predetermined value larger than zero. The amount of electric current is desirably zeroed, to reduce the amount of consumption of the electric energy by the drive device.

(34) A braking system according to the above mode (33), wherein the electric-energy increasing and reducing portion includes a stroke-based electric-energy increasing portion operable to increase the amount of electric energy to be applied to the drive device, on the basis of an amount of increase of a volume of the front control-pressure chamber which takes place due to a retracting movement of the control piston.

(35) A braking system according to the above mode (33) or (34), wherein said electric-energy increasing and reducing portion includes a control-pressure-based electric-energy increasing portion operable to increase the amount of electric energy to be applied to the drive device, on the basis of an amount of reduction of a volume of the front control-pressure chamber which takes place due to a retracting movement of the control piston.

When the amount of electric current to be applied to the drive device is reduced, the control piston is retracted, and the volume of the control-pressure chamber is increased with a result of reduction of its fluid pressure. Therefore, the amount of reduction of the fluid pressure in the control pressure chamber upon reduction of the amount of electric energy can be reduced, by advancing the control piston in advance, by an amount corresponding to the amount of increase of the volume of the control-pressure chamber, that is, by an amount corresponding to the amount of reduction of the fluid pressure in the control-pressure chamber.

(36) A braking system according to any one of the above mode (33)–(35), wherein the electric-energy increasing and reducing portion includes a preset-amount increasing portion operable to increase the amount of electric energy by a predetermined amount.

Where the amount of electric energy to be applied to the power-operated drive device is increased before the amount is reduced, the amount of reduction of the control-pressure chamber upon reduction of the amount can be made smaller than where the amount is not initially increased.

(37) A braking system according to any one of the above modes (33)–(36), wherein the electric-energy increasing and reducing portion includes a holding portion operable to hold the amount of electric energy for a predetermined time after the amount of electric energy is increased and before the amount of electric energy is reduced.

When the volume of the rear pressure chamber is increased as a result of an advancing movement of the control piston, the fluid is supplied from the reservoir system or the master cylinder system into the rear pressure chamber. In this case, the amount of electric energy applied to the drive device is preferably held at the present value until the rear pressure chamber becomes fluid-tight with respect to the control-pressure chamber.

While the predetermined time may be a suitably determined constant time, or a time which varies with a distance of the advancing movement of the control piston, namely, with the amount of increase of the volume of the rear pressure chamber.

(38) A braking system according to any one of the above modes (19)–(37), wherein the flow-restricting device is a flow-inhibiting device operable to inhibit the discharge flow of the fluid from the rear pressure chamber. The flow-restricting device may include a flow-restricting valve, which may be a flow-inhibiting valve.

(39) A braking system according to any one of the above modes (19)–(37), wherein the braking-pressure control device includes:

a leakage detecting portion operable to detect an actual leakage of the fluid from the flow-restricting device or a possibility of the leakage; and an electric-energy applying portion operable to apply the electric energy to the power-operated drive device when the leakage detecting portion has detected the actual leakage or the possibility.

The leakage detecting portion is arranged to detect an actual leakage of the fluid or a possibility of the fluid leakage. For instance, the actual leakage can be detected when the fluid pressure in the master cylinder after detection of the pressure-hold requirement is reduced by more than a predetermined amount, and the possibility of the leakage can be detected when the pressure-hold requirement is present for more than a predetermined time.

(40) A braking system according to the above mode (39), wherein the leakage detecting portion includes a portion operable to detect the actual leakage or the possibility of the leakage on the basis of at lest one of an operating state of the braking system and a running state of a vehicle equipped with the braking system.

The degree of the actual leakage of the fluid from the flow-restricting device or the possibility of the leakage can be obtained on the basis of the operating state of the braking system per se, and the amount of reduction of the brake cylinder pressure due to the fluid leakage can be obtained on the basis of the running state of the vehicle.

(41) A braking system according to the above mode (39) or (40), wherein the electric-energy applying portion controls application of the electric energy to the power-operated drive device, on the basis of at least one of an operating state of the braking system and a running state of a vehicle equipped with the braking system.

The operating state of the braking system includes the voltage and temperature of a battery provided as a power source for the power-operated drive device, a time duration of the pressure-hold requirement, and a cumulative time of the pressure-hold requirements. The battery provided to supply the power-operated drive device with an electric energy may be considered as a part of the braking system. The running state of the vehicle includes a deceleration value and a running speed of the vehicle.

On the basis of at least one of the operating state of the braking system and the running state of the vehicle, the power-operated drive device can be operated with an amount of electric energy which corresponds to the degree of the actual fluid leakage or the degree of the possibility of the fluid leakage. Accordingly, the electric-energy applying portion provided in the above mode (41) is effective to reduce the amount of reduction of the fluid pressure in the control-pressure chamber due to the fluid leakage, a minimum amount of electric energy applied to the drive device. While the vehicle is running, the electric-energy applying portion is effective to reduce the amount of reduction of the vehicle braking effect as represented by the deceleration value or rate of reduction of the running speed of the vehicle, which reduction takes place due to the fluid leakage.

(42) A braking system according to any one of the above modes (39)–(41), wherein the electric-energy applying portion determines at least one of an amount of electric energy to be applied to the power-operated drive device and a time duration for which the electric energy is applied to the power-operated drive device, on the basis of at least one of an operating state of the braking system and a running state of a vehicle equipped with the braking system.

(43) A braking system according to any one of the above modes (12)–(42), wherein the braking-pressure control device is operable in a selected one of (a) a first control state in which the fluid pressure in said brake cylinder is controlled by applying the electric current to the power-operated drive device while the brake cylinder is isolated from the master cylinder; and (b) a second control state in which said brake cylinder is held in communication with the master cylinder, for operating the brake cylinder with the pressurized fluid received from the master cylinder.

While the brake cylinder is isolated from the master cylinder, the master cylinder is preferably communication with a stroke simulator.

(44) A braking system according to any one of the above modes (12)–(43), further comprising a stroke simulator and a simulator-switching device, and wherein the stroke simulator includes (a) a housing, (b) a simulator piston slidably received within the housing and cooperating with the housing to define a first variable-volume chamber and a second variable-volume chamber, the first variable-volume chamber being connected to a pressurizing chamber of the master cylinder, while the second variable-volume chamber being connected to the rear pressure chamber of the pressure-control cylinder, and (c) biasing means for biasing the simulator piston in a direction that causes a volume of the first variable-volume chamber to be reduced, and wherein the simulator-switching device is operable to switch the stroke simulator between an operable state which permits a change of a volume of the first variable-volume chamber according to the operation of the manually operable brake operating member, and an inoperable state which inhibits the change of the volume of the first variable-volume chamber.

The simulator-switching device may be arranged to permit and inhibit the change of the volume of the first variable-volume chamber or the second variable-volume chamber. The simulator-switching device may be disposed upstream or downstream of the stroke simulator (on the side of the first variable-volume chamber or the second variable-volume chamber). The simulator-switching device may be a device operable to isolate the second variable-volume chamber from a low-pressure source such as a reservoir. In the braking system according to the above mode (43), the stroke simulator is preferably placed in the operable state when the braking-pressure control device is in the first state, and in the inoperable state when the braking-pressure control device is in the second state. Further, the flow-restricting device described above may function as the simulator-switching device.

(45) A braking system according to any one of the above modes (12)–(44), further comprising a check valve device which permits a flow of the fluid in a first direction from the rear pressure chamber toward the brake cylinder and inhibits a flow of the fluid in a second direction opposite to the first direction.

In a normal operation of the braking system, the braking-pressure control device is placed in the first state in which the fluid pressure in the brake cylinder is controlled by controlling the pressure-control cylinder. In this first state, the fluid pressure in the brake cylinder is higher than that in the rear pressure chamber. However, the discharge flow of the fluid from the brake cylinder to the rear pressure chamber is inhibited by the check valve device, to prevent reduction of the fluid pressure in the brake cylinder. On the other hand, a defect of the flow-restricting device or a failure of the electric system of the braking system may prevent a discharge flow of the fluid from the rear pressure chamber, causing the fluid to be kept within the rear pressure chamber. In this case, the brake cylinder is communicated with the master cylinder, and the fluid is discharged from the rear pressure chamber to the brake cylinder through the check valve device when the fluid pressure in the brake cylinder is lowered upon releasing of the brake operating member. Thus, the fluid can be returned to the master cylinder, so that the master cylinder is returned to its original position in which the pressurizing chamber is filled with the fluid.

The check valve device may be provided in a braking system which does not include the flow-restricting device. In this case, too, the check valve device permits the fluid to be discharged from the rear pressure chamber and returned to the master cylinder.

(47) A braking system characterized by comprising:
a hydraulically operated brake cylinder for operating a brake;
a master cylinder including a pressurizing piston which partially defines a pressurizing chamber and which is operable according to an operation of a manually operable brake operating member, to pressurize a working fluid in the pressurizing chamber;
a power-operated drive device;
a pressure-control cylinder having a control piston which is operable by the power-operated drive device and which partially defines a front control-pressure chamber and a rear pressure chamber on respective front and rear sides thereof, the front pressure-control chamber being connected to the brake cylinder;
a stroke simulator includes (a) a housing, (b) a simulator piston slidably received within the housing and cooperating with the housing to define a first variable-volume chamber and a second variable-volume chamber, the first variable-volume chamber being connected to the pressurizing chamber of the master cylinder, while the second variable-volume chamber being connected to the rear pressure chamber of the pressure-control cylinder, and (c) biasing means for biasing the simulator piston in a direction that causes a volume of the first variable-volume chamber to be reduced; and
a braking-pressure control device operable in a selected one of (i) a first control state in which the fluid pressure in the brake cylinder is controlled by applying an electric current to the power-operated drive device while the brake cylinder is isolated from the master cylinder and while the stroke simulator is placed in an operable state which permits a change of a volume of the first variable-volume chamber according to the operation of the manually operable brake operating member; and (ii) a second control state in which the brake cylinder is held in communication with the master cylinder, while permitting a flow of the fluid from the rear pressure chamber to the second variable-volume chamber.

In the braking system according to the above mode (46), the braking-pressure control device is operated in the second control state upon releasing of the brake operating member. In this second control state, the brake cylinder is communicated with the master cylinder, and the fluid is permitted to be discharged from the rear pressure chamber to the second variable-volume chamber of the stroke simulator, so that the fluid is returned from the first variable-volume chamber to the master cylinder as the fluid is returned from the rear pressure chamber to the second variable-volume chamber.

The technical feature according to any one of the above modes (12)–(45) is applicable to the braking system according to the above mode (46).

(47) A braking system comprising:
a hydraulically operated brake cylinder for operating a brake;
a power-operated drive device;
a pressure-control cylinder having a control piston which is operable by the power-operated drive device and which partially defines a front control-pressure chamber and a rear pressure chamber on respective front and rear sides thereof, the front pressure-control chamber being connected to the brake cylinder;
a braking-pressure control device operable to control application of an electric energy to the power-operated drive device, to control a pressure of a working fluid in the brake cylinder; and
a flow-restricting device operable to restrict a discharge flow of the fluid from the rear pressure chamber when a predetermined condition is satisfied.

The predetermined condition may be satisfied when the brake cylinder pressure is required to be held at the present level, when the braking system becomes defective, or when a vehicle equipped with the braking system is stationary.

The flow-restricting device preferably includes at least one electromagnetic control valve. The electromagnetic control valve may be switched to a flow-restricting state when the predetermined condition is satisfied.

The technical feature according to any one of the above modes (12)–(46) is applicable to the braking system according to the above mode (47).

(48) A braking system comprising:
a hydraulically operated brake cylinder for operating a brake;
a power-operated drive device;
a pressure-control cylinder having a control piston which is operable by the power-operated drive device and which partially defines a front control-pressure chamber and a rear pressure chamber on respective front and rear sides thereof, the front pressure-control chamber being connected to the brake cylinder;
a braking-pressure control device operable to control application of an electric energy to the power-operated drive device, to control a pressure of a working fluid in the brake cylinder; and
a flow-restricting device operable to restrict a discharge flow of the fluid from the rear pressure chamber when the pressure of the fluid in the brake cylinder is required to be held at a present level.

The technical feature according to any one of the above modes (12)–(47) is applicable to the braking system according to the above mode (48).

(49) A braking system comprising:
a hydraulically operated brake cylinder for operating a brake;
a master cylinder including a pressurizing piston which partially defines a pressurizing chamber and which is operable according to an operation of a manually operable brake operating member (34), to pressurize a working fluid;
a power-operated drive device;
a pressure-control cylinder having a control piston which is operable by the power-operated drive device and which partially defines a front control-pressure chamber and a rear pressure chamber on respective front and rear sides thereof, the front pressure-control chamber being connected to the brake cylinder;
a fluid passage connecting the rear pressure chamber and the pressurizing chamber of the master cylinder;
a stroke simulator disposed in the fluid passage and includes (a) a housing, (b) a simulator piston slidably received within the housing and cooperating with the housing to define a first variable-volume chamber and a second variable-volume chamber, the first variable-volume chamber being connected to the pressurizing chamber of the master cylinder, while the second variable-volume chamber being connected to the rear pressure chamber of the pressure-control cylinder, and (c) biasing means for biasing the simulator piston in a direction that causes a volume of the first variable-volume chamber to be reduced; and
a braking-pressure control device operable to control an electric energy to be applied to the power-operated drive device, for controlling the pressure of the fluid in the front control-pressure chamber, to thereby control the pressure in the brake cylinder.

The technical feature according to any one of the above modes (12)–(48) is applicable to the braking system according to the above mode (49).

(50) A braking system comprising:
a hydraulically operated brake cylinder for operating a brake;
a master cylinder including a pressurizing piston which partially defines a pressurizing chamber and which is operable according to an operation of a manually operable brake operating member, to pressurize a working fluid;
a power-operated drive device;
a pressure-control cylinder having a control piston which is operable by the power-operated drive device and which partially defines a front control-pressure chamber and a rear pressure chamber on respective front and rear sides thereof, the front pressure-control chamber being connected to the brake cylinder;
a master-cylinder passage connecting the rear pressure chamber and the pressurizing chamber of the master cylinder;
a reservoir which stores the working fluid under a pressure substantially equal to an atmospheric level;
a reservoir passage connecting the rear pressure chamber and the reservoir; and
a braking-pressure control device operable to control application of an electric energy to the power-operated drive device, to control a pressure of a working fluid in the brake cylinder.

The technical feature according to any one of the above modes (12)–(49) is applicable to the braking system according to the above mode (50).

(51) A braking system according to the above mode (50), wherein the master-cylinder passage is provided with a stroke simulator and a simulator control valve which are connected in series with each other.

The simulator control valve may be an electromagnetic shut-off valve which is opened and closed by energization and de-energization of its coil, or a linear control valve the opening of which is variable with an amount of electric current applied to its coil. The simulator control valve may be disposed between the stroke simulator and the master cylinder, or between the stroke simulator and the rear pressure chamber of the pressure-control cylinder.

A check valve may be disposed in parallel connection with the stroke simulator, such that the check valve permits a flow of the fluid in a direction from the rear pressure chamber toward the master cylinder and inhibits a flow of the fluid in the reverse direction. The check valve permits the fluid to be rapidly returned from the rear pressure chamber to the master cylinder.

(52) A braking system according to the above mode (50), wherein the master-cylinder passage is provided with a stroke simulator and a check valve which are connected in series with each other such that the check valve is disposed between the stroke simulator and the rear pressure chamber.

The check valve in the above mode (52) is arranged to permit a flow of the fluid in a direction from the stroke simulator toward the rear pressure chamber and inhibit a flow of the fluid in the reverse direction.

(53) A braking system according to the above mode (50) or (52), wherein the reservoir passage is provided with at least one of (a) a reservoir communication valve which is operable switched at least between an open state and a closed state, and (b) a check valve which permits a flow of the fluid in a first direction from the reservoir toward the rear pressure chamber and inhibits a flow of the fluid in a second direction opposite to the first direction.

Since the check valve in the above mode (53) permits the fluid flow from the reservoir into the rear pressure chamber as the volume of the rear pressure chamber is increased, an advancing movement of the control piston is permitted so that the fluid pressure in the rear pressure chamber is prevented from being lowered below the atmospheric level.

Where the reservoir communication valve and the check valve are disposed in parallel connection with each other, the control piston can be advanced even while the reservoir communication valve is in the closed state. The reservoir communication valve and the check vale may function as the valve device described above with respect to the above mode (15).

(54) A braking system according to the above mode (51) or (52), wherein the reservoir passage is connected to a portion of the master-cylinder passage between the simulator control valve and the stroke simulator.

In the braking system according to the above mode (54), the simulator control valve is disposed between the stroke simulator and the rear pressure chamber, and the reservoir passage is connected to a portion of the master-cylinder passage between the simulator control vale and the stroke simulator. When the simulator control valve is placed in the closed state, this simulator control valve inhibits flows of the fluid from the rear pressure chamber to both the stroke simulator and the reservoir. In this case, the stroke simulator may be placed in its operable state while the reservoir communication valve is held in the open state and while the rear pressure chamber is isolated from the stroke simulator. Thus, the operable state of the stroke simulator can be established while at the same time the discharge flow of the fluid from the rear pressure chamber can be inhibited by the simulator control valve.

(55) A braking system according to the above mode (54), wherein the portion of the master-cylinder passage is connected by a connecting passage to the front control-pressure chamber, and the connecting passage is provided with a check valve which permits a flow of the fluid in a first direction from the portion toward the rear pressure chamber and inhibits a flow of the fluid in a second direction opposite to the first direction.

In the braking system according to the above mode (55), the fluid can be delivered from the rear pressure chamber to the control-pressure chamber while the simulator control valve also functioning as a flow-inhibiting valve is placed in the open state. Further, the fluid can be returned from the rear pressure chamber to the master cylinder through the simulator control valve placed in the open state when the brake operating member is released. The connecting passage, check valve and the flow-inhibiting valve (simulator control valve) may be considered to constitute a check valve device. The flow-inhibiting valve is preferably a normally open valve.

(56) A braking system according to the above mode (52), wherein the reservoir passage is provided with a reservoir communication valve, and a portion of the reservoir passage between the reservoir communication valve and the reservoir is connected by a connecting passage to a portion of the master-cylinder passage between the stroke simulator and the check valve, the connecting passage being provided with a check valve.

The check valve disposed in the connecting passage provided in the above mode (56) may be arranged to permits a flow of the fluid in a direction from the reservoir passage toward the master cylinder passage, and inhibit a flow of the fluid in the reverse direction. In the braking system according to the above mode (56), the stroke simulator can be placed in its operable state even where the reservoir communication valve is placed in the closed state, as described in the DETAILED DESCRIPTION. When the reservoir communication valve is in the closed state, this valve and the check valve provided in the master-cylinder passage inhibit the discharge flows of the fluid from the rear pressure chamber to the reservoir and the stroke simulator, respectively.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
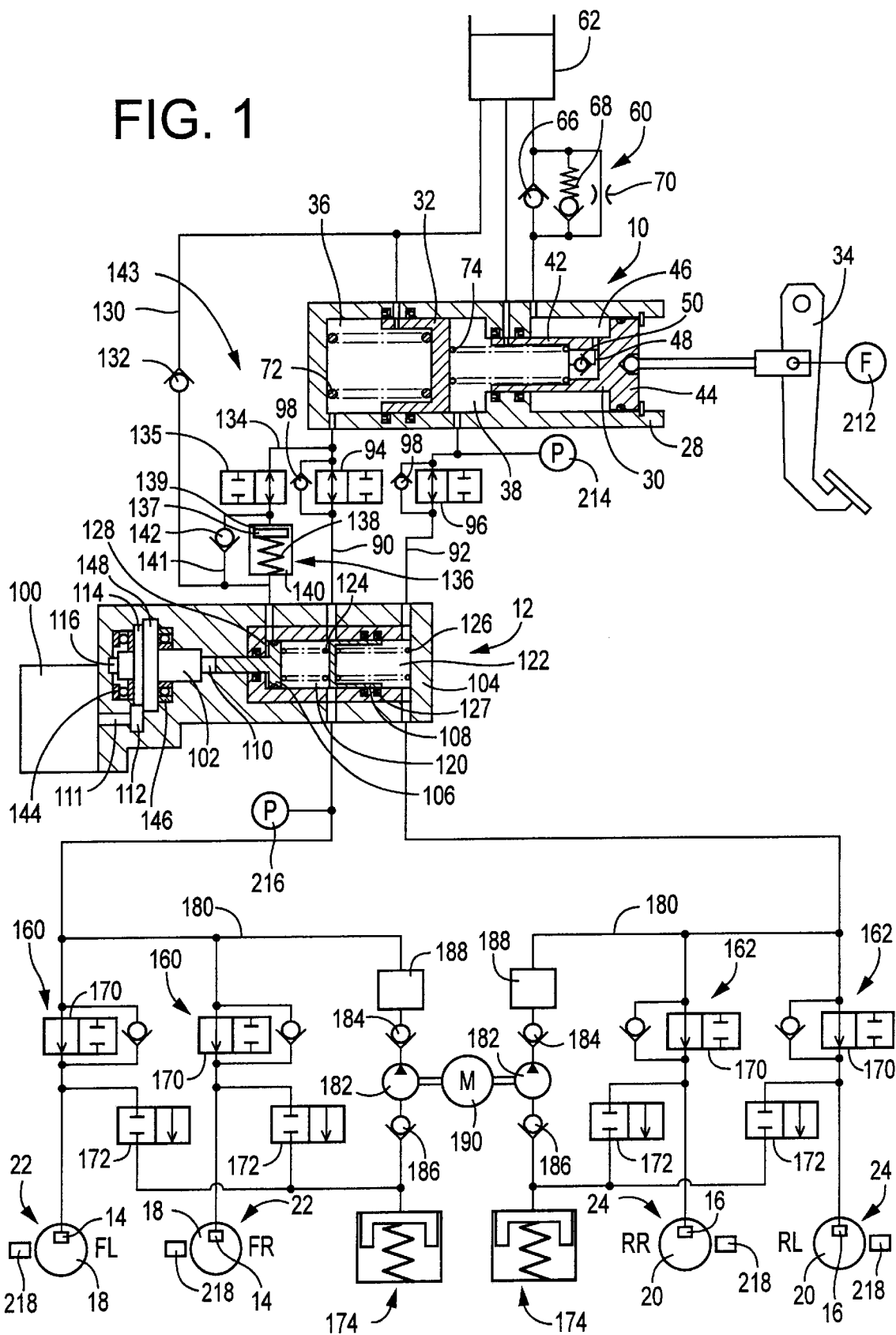
FIG. 1 is a hydraulic circuit diagram (partly in cross section) of a braking system according to one embodiment of this invention.

Referring to first to FIG. 1, there is shown a braking system for an automotive vehicle, which braking system is constructed according to a first embodiment of the present invention. In FIG. 1, reference sign 10 denotes a master cylinder, while reference sign 12 denotes a pressure-control cylinder. Reference signals 14 and 16 respectively denote front and rear wheel brake cylinders of front and rear wheel brakes 22, 24 arranged to brake respective front and rear wheels 18, 20. The wheel brake cylinders 14, 16 are connected to the master cylinder 10 through the pressure-control cylinder 12.

The master cylinder 10 includes a housing 28, and two pressurizing pistons 30, 32 fluid-tightly and slidably received within the housing 28. The pressurizing piston 30 is connected to a manually operable brake operating member in the form of a brake pedal 34. The pressurizing piston 32 partially defines a pressurizing chamber 36 in front of it, while the pressurizing piston 30 partially defines a pressurizing chamber 38 in front of it. The front wheel brake cylinders 14 for the front wheels 18 are connected to the pressurizing chamber 36, while the rear wheel brake cylinders 16 for the rear wheels 20 are connected to the pressurizing chamber 38. Upon operation of the master cylinder 10, masses of a working fluid in the two pressurizing chambers 36, 38 are pressurized to the same level.

The pressurizing piston 30 is a stepped cylinder member including a front small-diameter portion 42 and a rear large-diameter portion 44 having a large diameter than the small-diameter portion 42. The small-diameter portion 42 partially defines the pressurizing chamber 38, while the small-diameter and large-diameter portions 42, 44 cooperate with the housing 28 to define an annular chamber 46. The small-diameter portion 42 has a communication passage 48 formed therethrough for fluid communication between the pressurizing chamber 38 and the annular chamber 46. The communication passage 48 is provided with a check valve 50 which permits a flow of the fluid in a direction from the annular chamber 46 toward the pressurizing chamber 38 but inhibits a flow of the fluid in the reverse direction.

The annular chamber 46 is connected to a reservoir 62 through a flow restrictor device 60. The reservoir 62 stores the working fluid under a pressure almost equal to the atmospheric pressure. The flow restrictor device 60 includes a check valve 66, a pressure-relief 68 and an orifice 70, which are connected in parallel to each other. The check valve 66 permits a flow of the fluid in a direction from the reservoir 62 toward the annular chamber 46 buts inhibits a flow of the fluid in the reverse direction. The pressure-relief valve 68 permits a flow of the fluid in the direction from the annular chamber 46 toward the reservoir 62 when the fluid pressure in the annular chamber 46 is higher than that in the reservoir 62 by more than a predetermined amount, that is, higher than a predetermined relief pressure.

As the pressurizing piston 30 is advanced (moved in the left direction as seen in FIG. 1), the fluid pressure in the annular chamber 46 and the pressurizing chamber 38 is increased. The fluid pressure in the annular chamber 46 is increased to the relief pressure of the pressure-relief valve 60. While the fluid pressure in the annular chamber 46 is higher than that in the pressurizing chamber 38, the pressurized fluid is fed from the annular chamber 46 into the pressurizing chamber 38 through the check vale 50, and is eventually supplied to the rear wheel brake cylinders 16. In the present embodiment, the relief pressure of the pressure-relief valve 68 is determined to be a pressure at which the rear wheel brake cylinders 16 are fast-filled with the pressurized fluid, that is, at which the fast filling of the rear wheel brake cylinder 16 is completed. In other words, the pressurized fluid is supplied from both of the annular chamber 46 and the pressurizing chamber 38 to the wheel brake cylinders 16 until the fast filling of the brake cylinders 16 is completed. Accordingly, the fast filling can be completed in a relatively short time.

When the fluid pressure in the annular chamber 46 has reached the relief pressure, the pressurized fluid is discharged from the annular chamber 46 to the reservoir 46 through the pressure-relief valve 68. In this state, the fluid pressure in the pressurizing chamber 38 is higher than that in the annular chamber 46, but the check valve 50 prevents a flow of the pressurized fluid from the pressurizing chamber 38 into the annular chamber 46. Thus, the present braking system is arranged such that the wheel brake cylinders 14, 16 are supplied with the pressurized fluid delivered from the pressurizing chambers 36, 38, but not supplied with the pressurized fluid delivered from the annular chamber 36, after the fast filling of the wheel brake cylinders 14, 16 is completed. The flow restrictor device 60 cooperates with the annular chamber 46 to effect the fast filling of the wheel brake cylinders 14, 16.

As the pressurizing piston 30 is further advanced after the fast filling is completed, the fluid pressure in the pressurizing chamber 38 is further increased. Since the pressurizing chamber 38 is partially defined by the small-diameter portion 42 of the pressurizing piston 30, the fluid pressure in the pressurizing chamber 38 when the brake pedal 34 is operated with a certain depression force is higher than the fluid pressure which would be generated in a pressurizing chamber partially defined by the large-diameter portion 44. Accordingly, the ratio at which the operating force acting on the brake pedal 34 is boosted by the master cylinder 10 is increased after the fast filling of the wheel brake cylinders 14, 16 is completed. Since the annular chamber 46 and the reservoir 62 are connected toe ach other through the orifice 70, the fluid pressure in the annular chamber 46 is kept at a level substantially equal to the atmospheric pressure, while the pressurizing piston 30 is held at a given position with the brake pedal 34 depressed with a constant force.

When the pressurizing piston 30 is retracted toward the brake pedal 34, the fluid is supplied from the reservoir 62 into the annular chamber 46 through the check valve 66 as the volume of the annular chamber 46 is increased. Accordingly, the fluid pressure in the annular chamber 46 is prevented from being lowered below the atmospheric level during the retracting movement of the pressurizing piston 30.

An amount q of the fluid which is delivered from the pressurizing chamber 38 is equal to (Am1·ΔL) before the completion of the fast filling, and is equal to (Am3·ΔL) after the completion of the fast filling, where "Am1" and "Am3" represent cross sectional areas of the large-diameter portion 44 and small-diameter portion 42, respectively, and "ΔL" represents an operating stroke of the pressurizing piston 30 while the wheel brake cylinders 16 are held in communication with the master cylinder 10.

Where the fluid pressure in the pressurizing chamber 38 is increased by an amount ΔPF when the operating force of the brake pedal 34 is increased, a rate ΔPM at which the fluid pressure in the chamber 38 is increased is equal to ΔPF before the completion of the fast filling, and is equal to (ΔPF·Am1/Am3) after the completion of the fast filling.

As described above, the pressurized fluid is delivered from the master cylinder 10 to the wheel brake cylinders 14, 16 at a comparatively high rate before the completion of the fast filling, and the fluid pressure in the wheel brake cylinders 14, 16 is increased at a comparatively high rate after the completion of the fast filling.

The master cylinder 10 is provided with a pair of cup seals through which the fluid passages extending from the reservoir 62 are fluid-tightly connected to the master cylinder 10, and further provided with two return springs 72, 74 one of which is interposed between the bottom wall of the housing 28 and the pressurizing piston 32, and the other of which is interposed between the two pressurizing pistons 30, 32.

The pressurizing chamber 36 is connected through a fluid passage 90 to the brake cylinders 14 for the front wheels 18, while the pressurizing chamber 38 is connected through a fluid passage 92 to the brake cylinders 16 for the rear wheels 20. The fluid passages 90, 92 are provided with respective master-cylinder cut-off valves 94, 96, which are solenoid-operated shut-off valves. The wheel brake cylinders 14, 16 are selectively connected and disconnected to and from the master cylinder 10, by selectively opening and closing the respective master-cylinder cut-off valves 94, 96. These cut-off valves 94, 96 are normally open valves that are placed in an open state when their solenoid coils are not energized.

In the present embodiment, the master-cylinder cut-off valves 94, 96 are switched from the open state to the closed state when the fast filling of the wheel brake cylinders 14, 16 is completed. Namely, the pressurized fluid delivered from the master cylinder 10 is supplied to the wheel brake cylinders 14, 16 in an initial period of an operation of the brake pedal 34, and the pressurized fluid delivered from the pressure-control cylinder 12 is supplied to the wheel brake cylinders 14, 16 in a subsequent period of the operation of the brake pedal 34. When the electric system of the braking system becomes defective, the master-cylinder cut-off valves 94, 96 are switched to their open state, so that the wheel brake cylinders 14, 16 are operated with the pressurized fluid delivered from the master cylinder 10, to activate the front and rear wheel brakes 22, 24.

Two check valves 98 are disposed in parallel connection with the respective master-cylinder cut-off valves 94, 96. The check valves 98 permit flows of the fluid in a direction from the master cylinder 10 toward the wheel brake cylinders 14, 16, but inhibits flows of the fluid in the reverse direction. Even when the master-cylinder cut-off valves 94, 96 are placed in the closed state, the pressurized fluid can be delivered from the master cylinder 10 to the wheel brake cylinders 14, 16 through the check valves 98 as long as the fluid pressure in the master cylinder 10 is higher than that in the wheel brake cylinders 14, 16.

The fluid passages 90, 92 are connected to the pressure-control cylinder 12 disposed downstream of the master-cylinder cut-off valves 94, 96. The pressure-control cylinder 12 is operated according to an operation of an electrically operated pressure-control motor 100, which is operable in the opposite directions. The motor 100 is operated with an electric energy supplied from a battery 220 (FIG. 2), and cooperates with this battery to constitute a power-operated drive device, which cooperates with the pressure-control cylinder 12 to constitute a high-pressure source operable to pressurize the fluid to a level higher than that of the fluid pressurized by the master cylinder 10, as described below in detail. A rotary motion of the pressure-control motor 100 is converted by a motion converting device 102 into a linear motion. The pressure-control cylinder 12 includes a housing 104, and two control pistons 106, 108 fluid-tightly and slidably received in the housing 104. An O-ring is mounted on the outer circumferential surface of the control piston 106, to maintain fluid tightness between the control piston 106 and the housing 104. The control piston 106 is axially moved with a drive shaft 110 which is an output shaft of the motion converting device 102. More specifically described, the control piston 106 is advanced and retracted depending upon whether the pressure-control motor 100 is operated in the forward or reverse direction.

As shown in FIG. 1, a rotary motion of an output shaft 111 of the pressure-control motor 100 is transmitted through a pair of gears 112, 114 to a rotary shaft 116. A rotary motion of this rotary shaft 116 is converted by the motion converting device 102 into a linear motion of the drive shaft 110 connected to the control piston 106.

The control pistons 106, 108 partially define respective control-pressure chambers 120, 122 on their front sides (on their right sides as seen in FIG. 1). To these control-pressure chambers 120, 122, there are connected the respective brake cylinders 14, 16 for the front and rear wheels 18, 20, and the respective pressurizing chambers 36, 38. Thus, the master cylinder 10 and the wheel brake cylinders 14, 16 are connected to each other through the control-pressure chambers 120, 122.

The two control pistons 106, 108 are disposed coaxially and in series with each other. A return spring 124 is interposed between the two control pistons 106, 108, while a return spring 126 is interposed between the control piston 108 and the housing 104. The control piston 108 is moved on the basis of the fluid pressures in the control-pressure chambers 120, 122. In this sense, the control piston 108 may be referred to as a "floating piston". The control piston 108 has opposite pressure-receiving surfaces which partially define the respective control-pressure chambers 120, 122 and which have the same area, and the two return springs 124, 126 have substantially the same biasing force, so that the fluid pressures in the two control-pressure chambers 120, 122 are controlled to be substantially equal to each other. Accordingly, the fluid pressures in the brake cylinders 14, 16 for the front and rear wheels 18, 20 are controlled in the same manner by the pressure-control cylinder 12, so as to be substantially equal to each other. The control piston 108 is fluid-tightly and slidably received in the housing 104 through a sealing member or O-ring 127, which maintains the two control-pressure chambers 120, 122 to be independent of each other so that the front wheel brake cylinders 14 and the rear wheel brake cylinders 16 are held independent of each other. While the sealing member 127 is fitted in a groove formed in the housing 104, the sealing member 127 may be fitted in a groove formed in the control piston 108.

The control piston 106 partially defines a rear pressure chamber 128 formed on its rear side (its left side as seen in FIG. 1) remote from the control piston 108. The rear pressure chamber 128 is connected through a reservoir passage 130 to the reservoir 62. The reservoir passage 130 is provided with a check valve 132, which permits a flow of the fluid in a direction from the reservoir 62 toward the rear pressure chamber 128 but inhibits a flow of the fluid in the reverse direction.

In the present embodiment, the check valve 132 functions as a flow-restricting device in the form of a flow-inhibiting valve device for inhibiting a discharge flow of the pressurizing fluid from the rear pressure chamber 128 to the reservoir 62.

The rear pressure chamber 128 is also connected to the pressurizing chamber 36 of the master cylinder 10 through a by-pass fluid passage 134, which is provided with a simulator control valve 135 and a stroke simulator 136. The simulator control valve 135 is a normally open valve which is held open while a solenoid coil of the valve 135 is in a de-energized state.

The stroke simulator 136 includes a housing, a simulator piston 137 whose opposite surfaces cooperate with the housing to define a first variable-volume chamber 139 and a second variable-volume chamber 140, and a spring 138 which biases the simulator piston 137 in a direction that causes the volume of the first volume chamber 139 to be reduced. The first variable-volume chamber 139 is connected through the simulator control valve 135 to the pressurizing chamber 36, while the second variable-volume chamber 140 is connected to the rear pressure chamber 128 of the pressure-control cylinder 12. The spring 138 indicated above is disposed in the second variable-volume chamber 140 to bias the simulator piston 137 in the direction to reduce the volume of the first variable-volume chamber 139.

While the stroke simulator 136 is placed in its operable state with the simulator control valve 135 being held in its open state, the pressurizing chamber 36 is held in fluid communication with the first variable-volume chamber 139, so that the volume of the first variable-volume chamber 139 is changed with a change of the operating stroke of the brake pedal 34. As the volume of the first variable-volume chamber 139 is increased, the spring 138 is elastically compressed, and the biasing force of the spring 138 is increased, so that a reaction force to be applied to the brake pedal 34 is increased with an increase of the operating stroke of the brake pedal 34. While the simulator control valve 135 is placed in its closed state, the pressurizing chamber 36 is disconnected from the first variable-volume chamber 139, to inhibit a flow of the fluid from the pressurizing chamber 36 into the first variable-volume chamber 139, so that the stroke simulator 136 is placed in its inoperable state.

Thus, the fluid pressure in the stroke simulator 136 is increased with an increase in the operating stroke of the brake pedal 34. In the present embodiment, the stroke simulator 136 and the simulator control valve 135 cooperate with the master cylinder 10 to constitute a master cylinder system 143.

A by-pass passage 141 is connected to the fluid passage 134, so as to by-pass the stroke simulator 136, and is provided with a check valve 142 which permits a flow of the fluid in a direction from the rear pressure chamber 128 toward the master cylinder 10 but inhibits a flow of the fluid in the reverse direction. As shown in FIG. 1, the check valve 142 and the stroke simulator 136 are disposed in parallel connection with each other.

As shown in FIG. 1, the simulator control valve 135 is disposed in a portion of the fluid passage 134 between the stroke simulator 136 and the master cylinder 10, more precisely, in a portion of the fluid passage 134 between the master cylinder 10 and a point of connection of the by-pass passage 141 to the fluid passage 134.

Since the simulator control valve 135 placed in the closed state inhibits a flow of the fluid from the rear pressure chamber 128 to the master cylinder system 143, the simulator control valve 135 also functions as a flow-restricting device in the form of a flow-inhibiting valve device for inhibiting the discharge flow of the fluid from the rear pressure chamber 128 to the master cylinder system 143.

The stroke simulator 136 is placed in its inoperable state not only while the simulator control valve 135 is placed in the closed state, but also while the pressure-control cylinder 12 is placed in the non-operated state, that is, while the volume of the rear pressure chamber 128 of the pressure-control cylinder 12 is held constant so that a change of the volume of the second variable-volume chamber 140 is prevented to inhibit a movement of the simulator piston 137. In this sense, both of the simulator control valve 135 and the pressure-control cylinder 12 may be considered to function as switching devices operable to switching the stroke simulator 136 between the operable and inoperable states.

As described above, the control piston 106 is advanced by a rotary motion of the pressure-control motor 100, and the volume of the rear pressure chamber 128 is increased as the control piston 106 is advanced. The present braking system is designed such that, when the fluid pressures in the wheel brake cylinders 14, 16 are controlled according to an operating force of the brake pedal 34, the amount of increase of the volume of the rear pressure chamber 128 is larger than the amount of decrease of the volume of the second variable-volume chamber 140 from which the fluid is supplied to the rear pressure chamber 128. In this case, therefore, the rear pressure chamber 128 is supplied with not only the fluid received from the second variable-volume chamber 140 of the stroke simulator 136, but also the fluid received from the reservoir 62 through the check valve 132.

The control piston 106 receives a drive force corresponding to a drive torque of the pressure-control motor 100, and the fluid pressure in the control-pressure chambers 120, 122 is controlled to a level corresponding to the drive force acting on the control piston 106. In other words, the drive force of the control piston 106 is controlled so that the fluid pressure in the control chambers 120, 122 coincides with a desired value determined by the operating force of the brake pedal 34.

When the operating force of the brake pedal 34 is increased, an amount of increase of the fluid pressure in the control-pressure chambers 120, 122, and an amount of the fluid delivered from the second variable-volume chamber 140 to the rear pressure chamber 128 (that is, an amount of decrease of the volume of the second variable-volume chamber 140) both correspond to an amount of increase $\Delta F$ of the operating force of the brake pedal 34. On the other hand, a relationship between the drive torque and operating speed of the pressure-control motor 100 is determined by the characteristics of the motor 100 per se. The drive force applied to the control piston 106 and the speed of movement of the control piston 106 when the motor 100 is operated are determined by the amount of electric current applied to the motor 100, the specifications of the motion converting device 102 and the pressure-control cylinder 12, the fluid pressure in the control-pressure chambers 120, 122, etc.

In the braking system according to the present embodiment, the characteristics of the pressure-control motor 100, and the specifications of the motion converting device 102 and pressure-control cylinder 12, and the control gain are determined so that the amount of increase of the volume of the rear pressure chamber 128 is larger than the amount of the fluid delivered from the stroke simulator 136 to the rear pressure chamber 128 due to an increase of the operating force of the brake pedal 34, when the amount of electric current applied to the motor 100 is controlled such that the fluid pressure in the control-pressure chambers 120, 122 is increased by an amount corresponding to the amount of increase AF of the operating force of the brake pedal 34.

When the brake pedal 34 is released, the fluid is returned from the rear pressure chamber 128 to the pressurizing chamber 36 of the master cylinder 10 through the check valve 142 and the simulator control valve 135, if the simulator control valve 135 placed in the open state.

In the present embodiment wherein the motion converting device 102 includes a ballscrew-ballnut mechanism, a force based on the fluid pressure in the control-pressure chamber 120 which acts on the control piston 106 may cause the control piston 106 to be moved in the retracting direction while no drive torque is applied to the pressure-control motor 100. Namely, the ballscrw-ballnut mechanism may permit the retracting movement of the control piston 106 while the motor 100 is at rest. This retracting movement may be prevented by holding a certain amount of drive torque applied to the motor 100. However, this arrangement undesirably results in an increased amount of consumption of electric power.

In view of the above drawback, the present embodiment is arranged to close the simulator control valve 135 when the braking system is placed in a pressure hold mode in which the fluid pressures in the wheel brake cylinders 14, 16 are held constant. In the pressure hold more, therefore, the fluid in the rear pressure chamber 128 is prevented from being returned to the master cylinder 10 through the check valve 142 and the simulator control valve 135. When the pressure hold mode is selected, the control piston 106 is retracted to a position of equilibrium at which the fluid pressure in the rear pressure chamber 128 is equal to that in the control-pressure chamber 120. In this position of equilibrium, the fluid pressure in the control-pressure chambers 120, 122 can be held constant, without applying an electric current to the pressure-control motor 100. This arrangement requires a reduced amount of electric power, as compared with an arrangement in which the simulator control valve 135 is placed in the open state permitting the fluid to be discharged from the rear pressure chamber 128 in the pressure hold mode.

It is noted that reference signs 144 and 146 in FIG. 1 denote a thrust bearing and a radial bearing, respectively. These bearings receive axial and radial forces. The motion converting device 102 has a flange 148, which receives an axial force from the control piston 106.

The fluid passages 90, 92 are provided, at portions thereof downstream of the pressure-control cylinder 12, with respective pairs of pressure control valve devices 160, 162, which correspond to the respective front and rear pairs of wheel brake cylinders 14, 16. Each of the pressure control valve devices 160, 162 includes a pressure holding valve 170 and a pressure reducing valve 172. The pressure holding valve 170 is disposed between the pressure-control cylinder 12 and the corresponding wheel brake cylinder 14, 16, while the pressure reducing valve 172 is disposed between the corresponding wheel brake cylinder 14, 16 and a reservoir 174. By controlling the four sets of the pressure holding and reducing valves 170, 172, the fluid pressures in the corresponding four wheel brake cylinders 14, 16 of the front and rear wheels 18, 20 can be controlled independently of each other. The present braking system is capable of effecting an anti-lock braking pressure control for each wheel 18, 20 by controlling the corresponding pressure control valve device 160, 162, such that the state of slipping of each wheel 18, 20 on the road surface is controlled to be held within an optimum range depending upon the friction coefficient of the road surface, as well known in the art.

Each of two pump passages 180 is connected, at its one end to the corresponding one of the two reservoirs 174, and at its other end to a portion of the fluid passage 90, 92 which is located between the pressure holding valve 170 and the pressure-control cylinder 12. The pump passage 180 is provided with a pump 182, two check valves 184, 186 and a damper 188. The two pumps 182 connected to the respective two reservoirs 174 are driven by a common pump drive motor 190.

Figure 2:
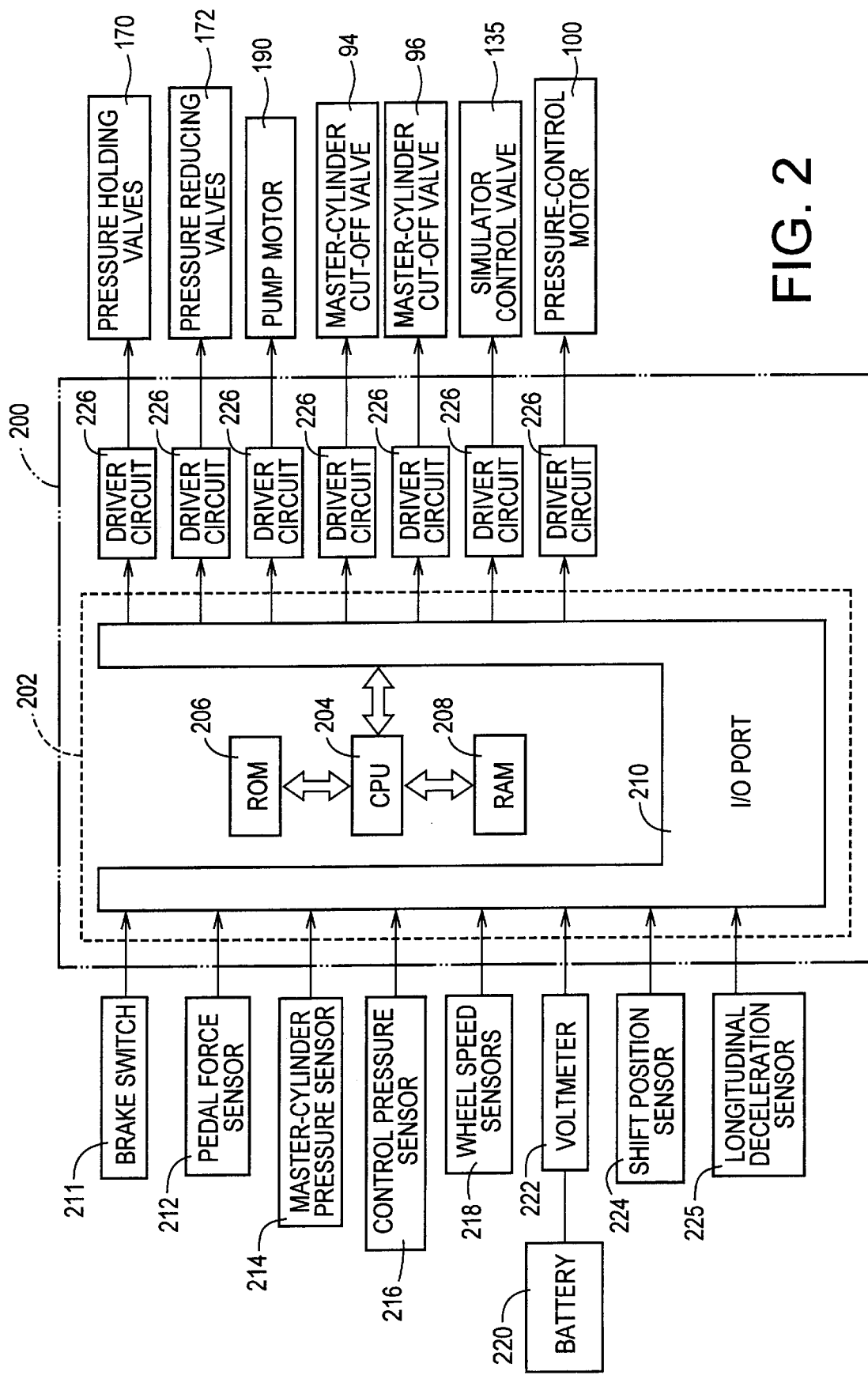
FIG. 2 is a block diagram showing a braking-pressure control device included in the braking system of FIG. 1.

The present braking system is provided with an electronic braking control unit (ECU) 200, which is arranged as shown in FIG. 2. The ECU 200 includes a control portion 202 principally constituted by a computer, and a plurality of driver circuits 226. The control portion 202 incorporates a central processing unit (CPU) 204, a read-only memory (ROM) 206, a random-access memory (RAM) 208, and an input-output portion 210. To the input-output portion 210, there are connected: a brake switch 211 for detecting an operation of the brake pedal 34; a pedal force sensor 212 for detecting the operating force acting on the brake pedal 34; a master-cylinder pressure sensor 214 for detecting the fluid pressure in the pressurizing chamber 38 of the master cylinder 10; a control pressure sensor 216 for detecting the fluid pressure in the control-pressure chamber 120 of the pressure-control cylinder 12; wheel speed sensors 218 for detecting rotating speeds of the respective wheels 18, 20; a voltmeter 222 for detecting a voltage of the battery 220 provided to drive the pressure-control motor 100; a shift position sensor 222 for detecting a presently selected operating position of a shift lever (not shown) provided on the vehicle; and a longitudinal deceleration sensor 225 for detecting a longitudinal acceleration value G of the vehicle. The master-cylinder pressure sensor 214 is connected to the fluid passage 92 connected to the pressurizing chamber 38. The fluid pressure detected by the control pressure sensor 216 represents the fluid pressure in the wheel brake cylinders 14, 16 when the pressure control valve devices 160, 162 are placed in their original positions of FIG. 1. In the present embodiment, the battery 220 and the pressure-control motor 100 constitute a major part of the power-operated drive device in the form of an electrically operated drive device for operating the pressure-control cylinder 12. The battery 220, which is provided to apply an electric current to the pressure-control motor 100, is considered to be a part of the present braking system.

To the input-output portion 210, there are also connected through respective driver circuits 226 the solenoid coils of the pressure holding valves 170, pressure reducing valves 172, master-cylinder cut-off valves 94, 96 and simulator control valve 135, and the pump motor 190 and pressure-control motor 100.

Figure 3:
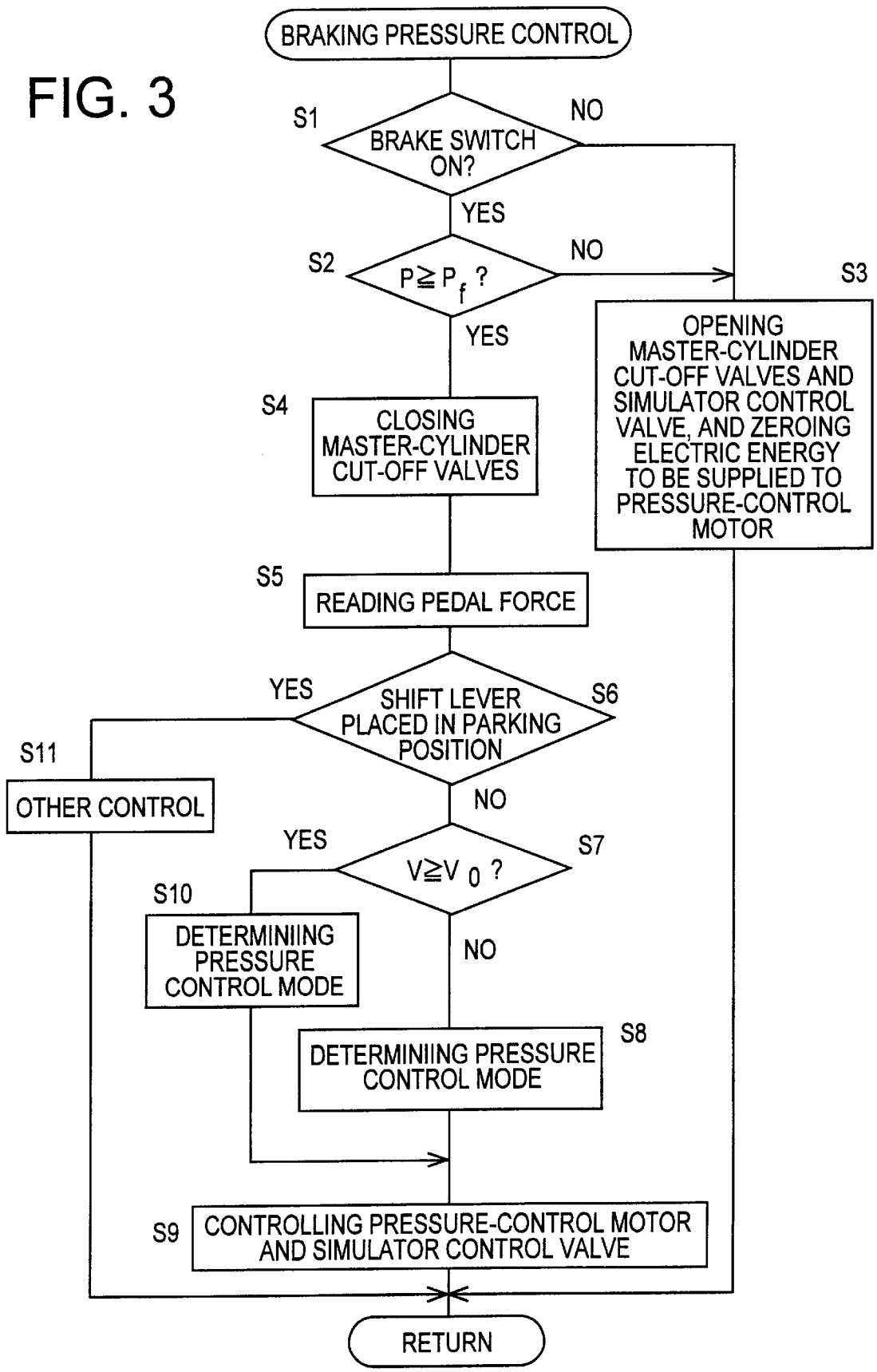
FIG. 3 is a flow chart illustrating a brake control routine executed according to a control program stored in a ROM of the braking-pressure control device of FIG. 2.

The ROM 206 stores various control programs and data tables, such as a program for executing a normal braking control routine illustrated in the flow chart of FIG. 3 and a program for executing an anti-lock braking pressure control routine (not shown).

Then, an operation of the present braking system will be described. While the braking system is normal, the fluid pressures in the wheel brake cylinders 14, 16 (hereinafter referred to as "braking pressure") are controlled by controlling the pressure-control motor 100 to control the pressure-control cylinder 12, with the master cylinder 10 being disconnected from the wheel brake cylinders 14, 16. In this normal braking operation, the stroke simulator 136 is placed in the operable state in which the master cylinder 10 is held in communication with the stroke simulator 136 through the simulator control valve 135 placed in the open state. As the brake pedal 34 is depressed, the pressurized fluid is delivered from the pressurizing chamber 36 into the stroke simulator 136, and the reaction force corresponding to the fluid pressure in the pressurizing chamber 36 is applied to the brake pedal 34. As the volume of the first variable-volume chamber 139 is increased, the volume of the second variable-volume chamber 140 is accordingly reduced, and the pressurized fluid is delivered from the second variable-volume chamber 140 into the rear pressure chamber 128.

The pressure-control motor 100 for controlling the pressure-control cylinder 12 is controlled according to the operating state of the brake pedal 34. Described in detail, a desired value of the braking pressure or the deceleration value of the vehicle) is determined on the basis of the operating state of the brake pedal 34, and the pressure-control cylinder 12 is controlled such that the actual value of the braking pressure the deceleration value G of the vehicle coincides with the determined desired value. On the basis of a difference between the actual and desired values and a rate of change of the desired value, a pressure control mode of the braking system is determined, and the electric current to be applied to the pressure-control motor 100 and the simulator control valve 135 are controlled to control the braking pressure in the determined pressure control mode.

In the present embodiment, the desired value of the braking pressure is determined on the basis of the operating force of the brake pedal 34 while the vehicle is stationary (while the vehicle running speed is not higher than a predetermined threshold). While the vehicle is running (while the vehicle running speed is higher than the predetermined threshold), the desired value of the vehicle deceleration value is determined on the basis of the operating force of the brake pedal 34. Since the vehicle operator usually operates the brake pedal 34 for obtaining a desired deceleration value of the vehicle, it is desirable to control the braking pressure on the basis of the desired deceleration value of the vehicle. This control arrangement permits the vehicle to be decelerated according to the operating force of the brake pedal 34, irrespective of a gradient of the road surface, even while the vehicle is running on a slope.

While the vehicle is stationary, the braking system is placed in a pressure increase mode when the desired braking pressure is higher than the actual value by more than a predetermined amount and when the rate of increase of the desired braking pressure is higher than a predetermined positive value. The braking system is placed in a pressure hold mode when the absolute value of a difference between the desired and actual braking pressure values is equal to or smaller than a predetermined value and when the absolute value of the rate of change of the desired braking pressure is equal to or lower than a predetermined value. The braking system is placed in a pressure decrease mode when the actual braking pressure is higher than the desired value by more than a predetermined amount and when the rate of change of the desired braking pressure is equal to or lower than a predetermined negative value. The pressure control mode may be determined on the basis of at least one of the above-indicated difference and the rate of change of the desired braking pressure.

During running of the vehicle, the pressure control mode is determined or selected in substantially the same manner as described above, on the basis of the desired vehicle deceleration in place of the desired braking pressure, and the actual vehicle deceleration value detected by the longitudinal deceleration sensor 226, in place of the actual braking pressure. That is, the pressure control mode during the vehicle running is determined on the basis of a difference between the desired and actual deceleration values and the rate of change of the desired deceleration value.

In the present increase mode, the control piston 106 of the pressure-control cylinder 106 is advanced by a forward operation of the pressure-control motor 100. Accordingly, the fluid pressure in the control-pressure chamber 120 is increased, and the control piston 108 is also advanced. The control piston 108 is stopped at a position of equilibrium at which the fluid pressures in the two control-pressure chambers 120, 122 are substantially equal to each other. The pressurized fluid masses are delivered from the control-pressure chambers 120, 122 to the brake cylinders 14 for the front wheels 18 and the brake cylinders 16 for the rear wheels 20, respectively, and the front and rear wheel brake cylinders 14, 16 are operated with the same fluid pressure.

When the pressure control mode is changed from the pressure hold mode to the pressure increase mode, the simulator control valve 135 is commanded to be brought to the open state after the pressure-control motor 100 is commanded to be operated. Accordingly, the simulator control valve 135 is switched to the open state after the advancing movement of the control pistons 106, 108 is initiated. If the simulator control valve 135 were opened before the advancing movement is initiated, the fluid pressure in the rear pressure chamber 128 would be abruptly lowered, and the fluid pressures in the control-pressure chambers 120, 122 may be abruptly lowered.

In the pressure hold mode, the amount of electric current to be applied to the pressure-control motor 100 is zeroed, and the simulator control valve 135 is switched to the closed state, as described below. Accordingly, the pressurized fluid in the rear pressure chamber 128 is prevented from being discharged to the master cylinder 10, and the fluid pressure in the rear pressure chamber 128 is increased to the level of the fluid pressures in the control-pressure chambers 120, 122, so that the retracting movement of the control piston 106 is prevented. Thus, the braking pressure can be maintained even after the amount of electric current to be applied to the pressure-control motor 100 is zeroed.

When the pressure decrease mode is selected, the pressure-control motor is operated in the reverse direction, and the control pistons 106, 108 are retracted. Accordingly, the volumes of the control-pressure chambers 120, 122 are increased, and the fluid pressures in these chambers 120, 122 are lowered. The pressurized fluid in the rear pressure chamber 128 is returned to the master cylinder 10 through the check valve 142 and the simulator control valve 135 placed in the open state. Further, the second variable-volume chamber 140 accommodates the pressurized fluid, as a result of a decrease of the operating force of the brake pedal 34. When the pressure control mode is changed from the pressure hold mode to the pressure decrease mode, the pressure-control motor 100 is first commanded to be operated in the reverse direction, before the simulator control valve 135 is commanded to be opened. If the simulator control valve 135 were opened before the retracting movements of the control pistons 106, 108 is initiated, the fluid pressure in the rear pressure chamber 128 would be abruptly lowered, and the fluid pressures in the control-pressure chambers 120, 122 may be abruptly lowered.

When the pressure hold mode is changed to the pressure decrease mode, the braking pressure may be lowered by controlling the simulator control valve 135, without applying an electric current to the pressure-control motor 100. Namely, the simulator control valve 135 is switched to the open state to permit the pressurized fluid to be discharged from the rear pressure chamber 128 to the master cylinder 10, so that the fluid pressures in the control-pressure chambers 120, 122 are lowered to lower the braking pressure. In this case, the braking pressure can be lowered at a controlled rate by controlling the duty ratio of the simulator control valve 135, that is, by alternately opening and closing the simulator control valve 135 at a desired duty ratio.

When the brake pedal 34 is released, the solenoid coils of the master-cylinder cut-off valves 94, 96 and the simulator control valve 135 are de-energized, to restore these valves 94, 96, 135 to their original states of FIG. 1. The fluid masses are returned from the wheel brake cylinders 14, 16 to the master cylinder 10 through the master-cylinder cut-off valves 94, 96 placed in the open state, and are partly accommodated in the stroke simulator 136. Since the pressurized fluid is returned to the second variable-volume chamber 140, the fluid in the first variable-volume chamber 139 is returned to the master cylinder 10. In the present embodiment wherein the simulator control valve 135 is a normally open valve, the pressurized fluid can be returned from the rear pressure chamber 128 to the master cylinder 10 even when the electric system of the present braking system fails.

In the pressure increase mode with the brake pedal 34 being operated, the amount of increase of the volume of the rear pressure chamber 128 due to the advancing movement of the control piston 106 is larger than the amount of decrease of the volume of the second variable-volume chamber 140 due to the operation of the brake pedal 34. As a result, the fluid delivered from the second variable-volume chamber 140 can be entirely accommodated in the rear pressure chamber 128, making it possible to avoid a sudden increase of the reaction force acting on the brake pedal 34. Further, the fluid is supplied from the reservoir 62 to the rear pressure chamber 128 through the check valve 132, by an amount corresponding to a difference between the amount of decrease of the volume of the second variable-volume chamber 140 and the amount of increase of the volume of the rear pressure chamber 128.

Referring next to the flow chart of FIG. 3, there will be described the braking control routine. This routine is initiated with step S1 to determine whether the brake pedal 34 is in operation, that is, whether the brake switch 211 is in an ON state. If an affirmative decision (YES) is obtained in step S1, the control flow goes to step S2 to determine whether the fluid pressure P detected by the control pressure sensor 216 has increased to a predetermined value Pf at which the fast filling of the wheel brake cylinders 14, 16 is completed. If a negative decision (NO) is obtained in step S2, that is, before the fast filling is completed, step S3 is implemented to hold the master-cylinder cut-off valves 94, 96 and the simulator control valve 135 in the open state, so that the pressurized fluid is supplied from the master cylinder 10 to the wheel brake cylinders 14, 16 at a comparatively high rate, whereby the fast filling of the brake cylinders 14, 16 can be completed in a relatively short time. On the other hand, the pressure-control motor 100 is held off to hold the pressure-control cylinder 12 in the non-operated state, so that the stroke simulator 136 is placed in its inoperable state, even while the simulator control valve 135 is held in the open state. In this state, therefore, the pressurized fluid in the pressurizing chamber 36 is prevented from being delivered to the stroke simulator 136, so that the pressurized fluid delivered from the master cylinder 10 can be effectively used to fast-fill the brake cylinders 14, 16.

Upon completion of the fast filling of the wheel brake cylinders 14, 16, an affirmative decision (YES) is obtained in step S2, and the control flow goes to step S4 to close the master-cylinder cut-off valves 94, 96, and then to step S5 to read the operating force of the brake pedal 34. Step S5 is followed by step S6 to determine whether the shift level is placed in PARKING position. If a negative decision (NO) is obtained in step S6, the control flow goes to step S7 to determine whether the vehicle running speed V is equal to or higher than a predetermined threshold $V_0$ close to zero, that is, whether the vehicle is running. If the vehicle running speed V is lower than the threshold $V_0$, it means that the vehicle is stationary or at a stop. Where the shift lever is placed in a position other than the PARKING position while the vehicle is stationary (with a negative decision obtained in step S7), the control flow goes to step S8 to determine the desired braking pressure on the basis of the operating force of the brake pedal 34, and determine or select the pressure control mode on the basis of the determined desired braking pressure. Step S8 is followed by step S9 to control the pressure-control motor 100 and the simulator control valve 135 in the determined pressure control mode.

Where the shift lever is placed in a position other than the PARKING position while the vehicle is running, the control flow goes to step S10 to determine the desired vehicle deceleration value, and determine or select the pressure control mode on the basis of the determined desired vehicle deceleration value.

Where the shift lever is placed in the PARKING position, the control flow goes to step S11 to effect a control of the braking system, which is different from the control when the vehicle is stationary with the shift lever placed in the position other than the PARKING position, and the control when the vehicle is running. Where the shift lever is placed in the PARKING position, the need of controlling the braking pressure is comparatively low. In the PARKING position of the shift lever, the simulator control valve 135 may be held in the closed state, to prevent the discharge flow of the fluid from the rear pressure chamber 128 to the master cylinder 10, for thereby holding the fluid pressures in the control-pressure chambers 120, 122 constant. This arrangement makes it possible to hold the vehicle stationary while reducing the required amount of electric power consumption.

In the present embodiment, the stroke simulator 136 is selectively placed in the operable state and the inoperable state depending upon whether the pressure-control cylinder 12 is placed in the operated state or the non-operated state, while the simulator control valve 135 is placed in the open state. This arrangement permits the stroke simulator 136 to be switched between the operable and inoperable states, as needed, while reducing the required frequency of switching of the simulator control valve 135 between the closed and open states, and thereby increasing the expected life expectancy of the simulator control valve 135.

When the brake pedal 34 is released, a negative decision (NO) is obtained in step S1, and the control flow goes to step S3 to hold the master-cylinder cut-off valves 94, 96 and the simulator control valve 135 in the original states of FIG. 1, that is, in the open states.

Figure 4:
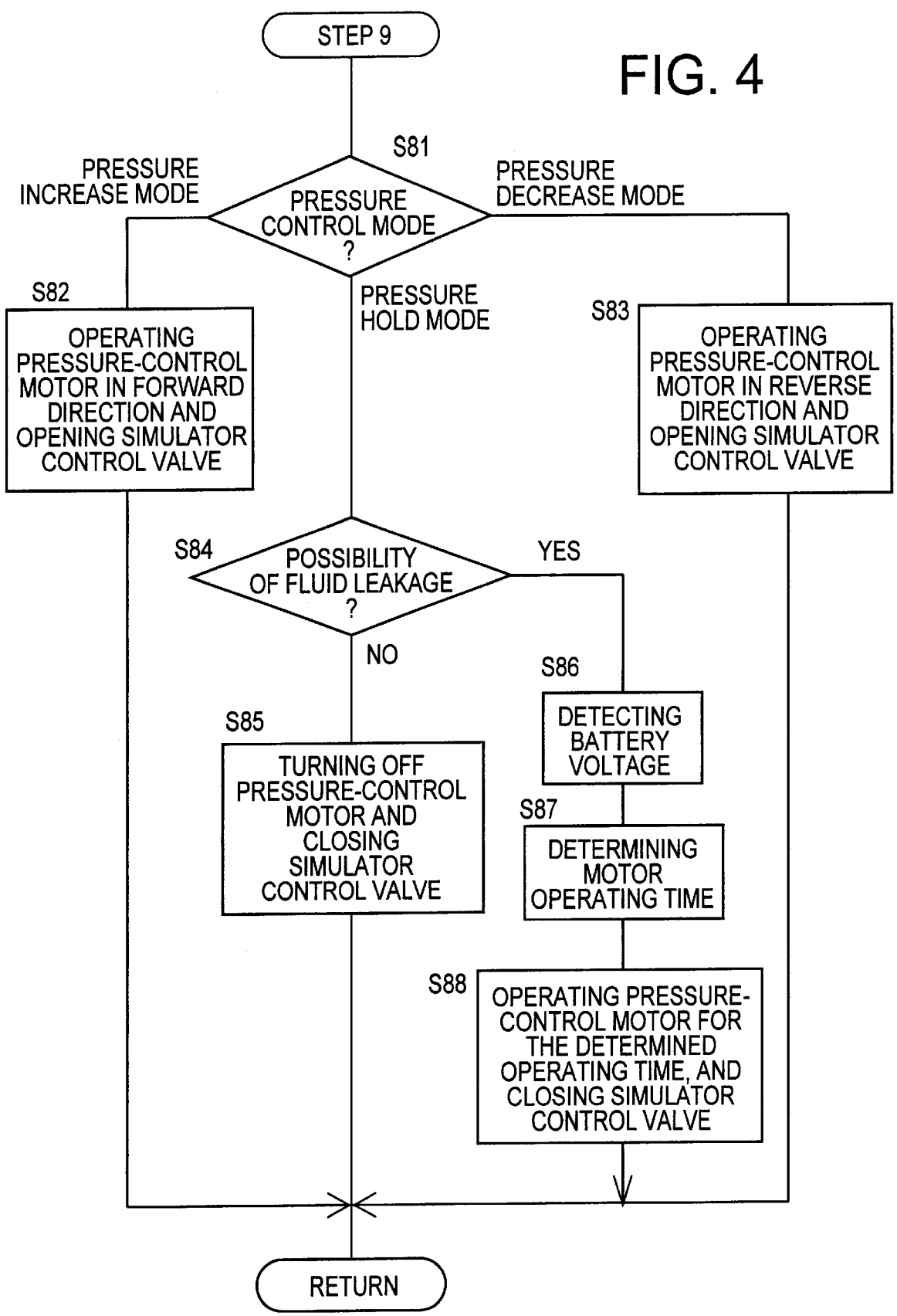
FIG. 4 is a flow chart illustrating a portion of the brake control routine of FIG. 3.

There will be described the operations of the braking system in step S9 in the different pressure control modes, referring to the flow chart of FIG. 4. The routine of FIG. 4 is initiated with step S81 to read the presently selected or determined pressure control mode. When the selected pressure control mode is the pressure increase mode, that is, when a pressure-hold requirement is detected, the control flow goes to step S82 in which the braking system is controlled in the pressure increase mode, as described above. When the selected pressure control mode is the pressure decrease mode, the control flow goes to step S83 in which the braking system is controlled in the pressure decrease mode, as described above. That is, the control pistons 106, 108 are advanced in the pressure increase mode or retracted in the pressure decrease mode, by controlling the electric current to be applied to the pressure-control motor 100, so that the fluid pressures in the control-pressure chambers 102, 122 are increased or reduced. In both of the pressure increase and decrease modes, the simulator control valve 135 is held in the open state.

When the selected pressure control mode is the pressure hold mode, the control flow goes to step S84 to determine whether there is a possibility of the fluid leakage from the wheel brake cylinders 14, 16. In the present embodiment, it is determined that there is a possibility of the fluid leakage, after the braking system has been held in the pressure hold mode for more than a predetermined time. If a negative decision (NO) is obtained in step S84, the control flow goes to step S85 to close the simulator control valve 135, and zero the amount of electric current applied to the pressure-control mode 100, that is, to turn off the motor 100. With the simulator control valve 135 placed in the closed state, the retracting movement of the control piston 106 is prevented to hold the fluid pressures in the control-pressure chambers 120, 122 constant, without applying an electric current to the motor 100. In this case, the fluid pressure in the rear pressure chamber 128 may be higher than that in the pressurizing chamber 36 of the master cylinder 10.

Where it is determined in step S84 that there is a possibility of the fluid leakage from the wheel brake cylinders 14, 16, the control flow goes to step S86 to detect the voltage of the battery 220, and to step S87 to determine the operating time of the pressure-control motor 100 on the basis of the detected voltage of the battery 220. Step S87 is followed by step S88 to operate the pressure-control motor 100 for the determined operating time, and close the simulator control valve 135. After the motor 100 is turned off, a timer for measuring the operating time of the motor 100 is reset. For instance, the operating time is increased with a decrease of the voltage of the battery 220. With steps S86–S88 being implemented, the braking system is controlled to compensate for a drop of the braking pressure due to the fluid leakage from the wheel brake cylinders 14, 16.

The present braking system placed in the pressure hold mode is controlled, as a rule, to prevent the discharge flow of the fluid from the rear pressure chamber 128 toward the master cylinder 10 and hold the pressure-control motor 100 in the off state. In the pressure hold mode, therefore, the required amount of consumption of electric power by the motor 100 is reduced, and the operating noise of the motor 100 or the vibration due to the operation of the motor 100 are reduced. Further, the braking pressure can be held at the value desired by the vehicle operator, by controlling the braking system in the pressure hold mode as described above.

Where the possibility of the fluid leakage from the wheel brake cylinders 14, 16 is detected in the pressure hold mode, however, the pressure-control mode 100 is operated to control the fluid pressures in the control-pressure chambers 120, 122, in order to prevent a drop of the braking pressure due to the fluid leakage from the wheel brake cylinders 14, 16.

Where the pressure-control cylinder 12 cannot be controlled due to abnormality of the pressure-control motor 100, the simulator control valve 135 is closed to prevent the discharge flow of the fluid from the rear pressure chamber 128, for preventing the retracting movement of the control piston 106, so as to prevent a drop of the braking pressure in the wheel brake cylinders 14, 16.

Figure 5:
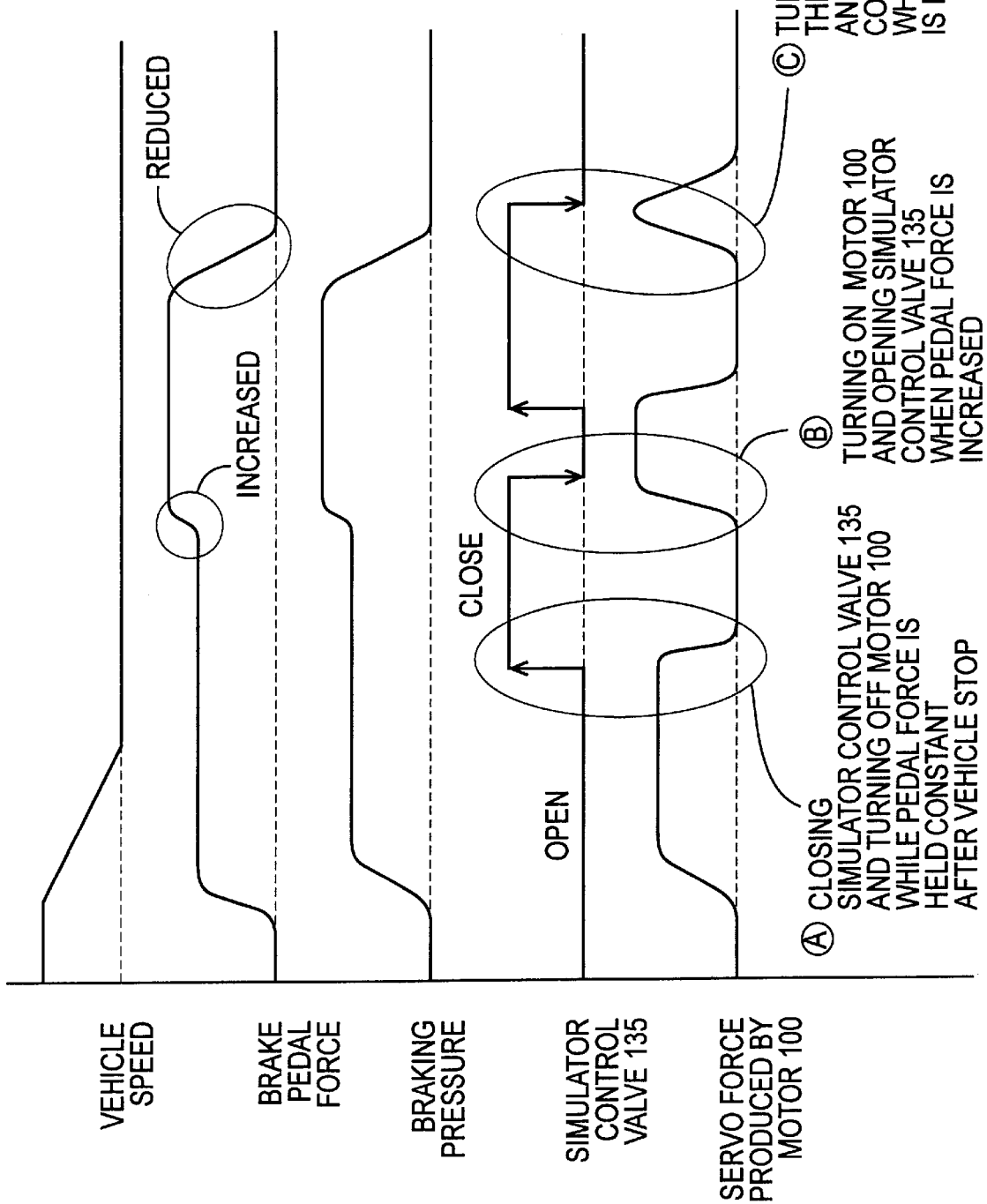
FIG. 5 is a view indicating an example of a control operation of the braking-pressure control device.

While the vehicle is stationary, the operating force of the brake pedal 34 is usually held constant, and the pressure hold mode is usually selected. In this case, the pressure-control motor 100 is held off without application of an electric current thereto, so that the required amount of consumption of electric power by the motor 100 is reduced. This manner of control of the braking system in the pressure hold mode will be further explained by reference to a time chart of FIG. 5.

When the operating force of the brake pedal 34 is held constant while the vehicle is stationary, the pressure hold mode is selected. As indicated at (A) in FIG. 5, the simulator control valve 135 is closed, and the drive torque of the pressure-control valve 100 is zeroed, so that the servo force produced by the motor 100 is zeroed. If the operating force of the brake pedal 34 is increased, the pressure increase mode is selected. In this pressure increase mode, the servo force produced by the motor 100 is increased, and then the simulator control valve 135 is opened, as indicated at (B) in FIG. 5. If the operating force is then reduced, the pressure decrease mode is selected. In this pressure decrease mode, the pressure-control motor 100 is first operated in the reverse direction, and upon subsequent detection of the releasing action of the brake pedal 34, the motor 100 is turned off while at the same time the simulator control valve 135 is returned to the open state, as indicated at (C) in FIG. 5. The master-cylinder cut-off valves 94, 96 are also returned to the open state.

In the present embodiment, the braking pressure while the vehicle is stopped on a slope can be maintained without an electric current being applied to the pressure-control motor 100. Further, a movement of the vehicle during a period between a moment of releasing of the brake pedal 34 and a moment of depression of the accelerator pedal can be prevented since the discharge flow of the fluid from the rear pressure chamber 128 toward the master cylinder 10 is prevented. The present arrangement is also effective to apply an automatic brake to the vehicle without an operation of the brake pedal 34 by the vehicle operator when the drive power source such as an engine of the vehicle is automatically stopped to reduce the exhaust emission, where the vehicle is designed for improved fuel economy and environmental protection.

In the embodiment described above, the simulator control valve 135 is switched to the closed state and the pressure-control motor 100 is turned off, in the pressure hold mode, irrespective of whether the vehicle is stationary or running. However, this control of the simulator control valve 135 and the motor 100 may be effected in the pressure hold mode only while the vehicle is stationary. In this case, the motor 100 is turned off while the simulator control valve 135 is held in the open state, in the pressure hold mode while the vehicle is running. This arrangement may be employed in view of a tendency that the pressure hold mode is maintained for a relative long time while the vehicle is stationary. In this sense, the pressure hold mode while the vehicle is stationary may be referred to as a "long pressure hold mode", which is distinguished from a "short pressure hold mode" which is the pressure hold mode while the vehicle is running.

The simulator control valve 135 in the form of a shut-off valve may be replaced by a linear control valve whose opening varies with the amount of electric current applied thereto. In this case, the rate of decrease of the braking pressure can be controlled by controlling the opening of the linear control valve. Where the pressure hold mode is followed by the pressure decrease mode, the opening of the linear control valve is reduced to decrease the braking pressure at a relatively low rate, in order to avoid a sudden decrease of the braking pressure, for thereby improving the operating feel of the brake pedal 34.

In the illustrated embodiment, the determination in step S84 as to whether there is a possibility of the fluid leakage from the wheel brake cylinders 14, 16 is effected o the basis of the time duration for which the pressure hold mode is maintained. However, the fluid leakage from the wheel brake cylinders 14, 16 may be directly detected. Where the pressurized fluid leaks from the wheel brake cylinders 14, 16 to the reservoir 62 through the check valve 132, for instance, the pressurized fluid is delivered from the master cylinder 10 to compensate for the fluid leakage through the check valve 132. If the operating stroke of the brake pedal 34 is held constant in this case, the fluid pressure in the master cylinder 10 is lowered. Accordingly, the fluid leakage through the check valve 132 may be detected by monitoring whether the fluid pressure in the master cylinder 10 has been lowered by more than a predetermined amount while the operating stroke of the brake pedal 34 is held constant. Thus, the fluid leakage may be detected on the basis of a relationship between the operating stroke of the brake pedal 34 and the master cylinder pressure. However, the fluid leakage may also be detected on the basis of a relationship between the braking pressure and the vehicle deceleration value or running speed, or any other running state of the vehicle which is influenced by the braking pressure.

In the above embodiment, the operating time during which the pressure-control motor 100 is operated upon detection of the possibility of the fluid leakage from the wheel brake cylinders 14, 16 is increased with a decrease of the voltage of the battery 220. However, the operating time may be reduced with the battery voltage. Further, the operating time may be determined on the basis of the temperature of the working fluid of the braking system, the temperature of the battery 220, the time duration of the pressure hold mode, the amount of decrease of the master cylinder pressure, the amount of decrease of the vehicle deceleration value, or the rate of decrease of the vehicle running speed. The operating time of the motor 100 is preferably made long when the degree or possibility of the fluid leakage is relatively high than when it is relatively low. The operating time may be determined on the basis of a combination of two or more of the above-indicated parameters.

The amount of electric current to be applied to the motor 100, rather than the operating time of the motor 100, may be determined in step S87. In this case, the amount of electric current is made relatively large when the degree or possibility of the fluid leakage is relatively high than when it is relatively low. Where the amount of electric current is determined depending upon the degree or possibility of the fluid leakage, the operating time of the motor 100 may be held constant. In any case, the operation of the motor 100 is effective to reduce the amount of drop of the braking pressure due to the fluid leakage, and to reduce the amount of reduction of the vehicle deceleration value due to the fluid leakage during running of the vehicle.

Figure 6:
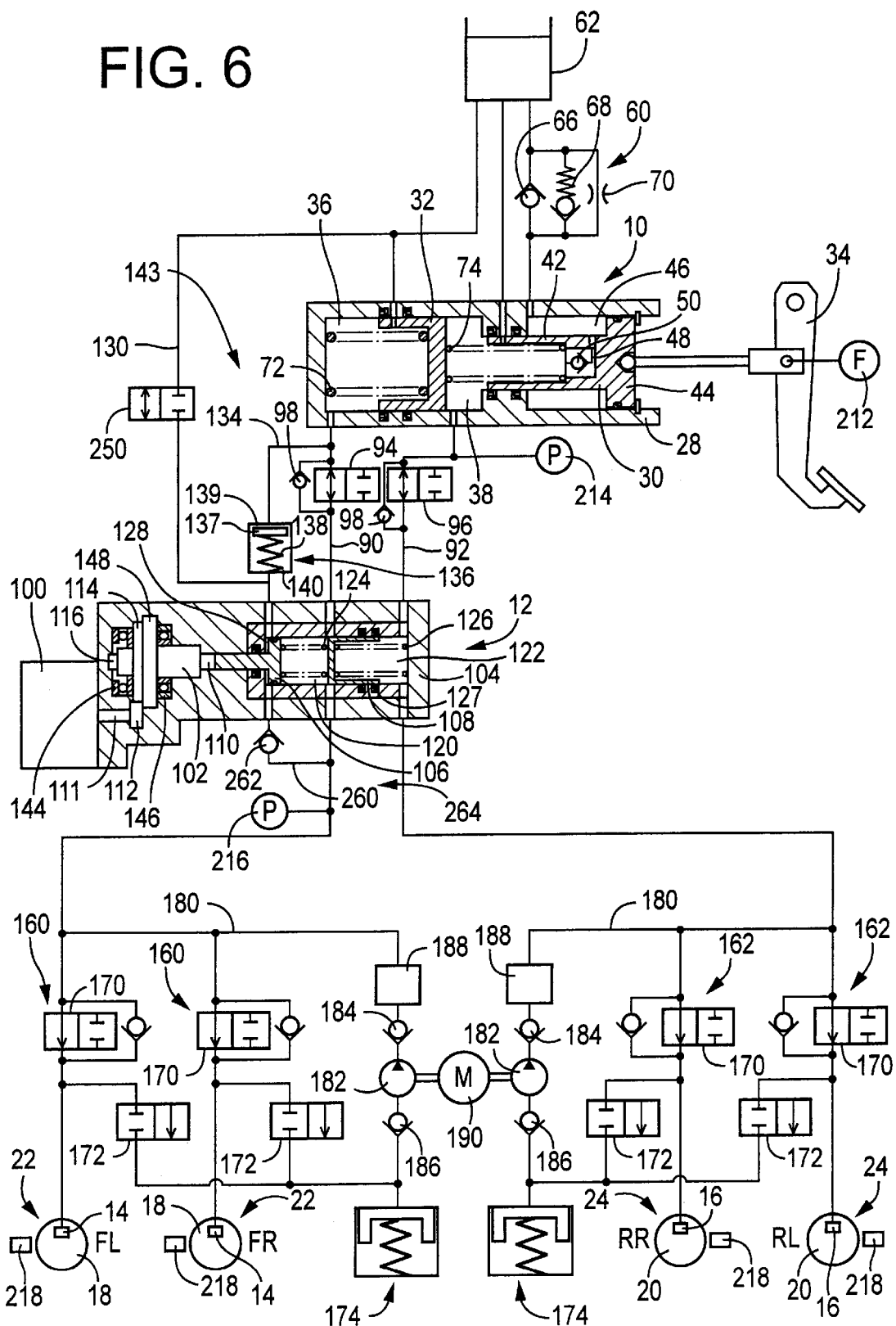
FIG. 6 is a hydraulic circuit diagram (partly in cross section) of a braking system according to another embodiment of this invention.

Referring to FIG. 6, there will be described a braking system according to a second embodiment of the present invention. In the present embodiment, the fluid passage 130 connecting the rear pressure chamber 128 and the reservoir 62 is provided with a reservoir communication valve 250, which is a solenoid-operated shut-off valve. The reservoir communication valve 250 placed in its closed state functions as a valve for preventing the discharge flow of the fluid from the rear pressure chamber 128 to the reservoir 62. This valve 250 is switched to its closed state when the pressure hold mode is selected.

The present second embodiment does not use the check valve 142 in parallel connection with the stroke simulator 136, and the simulator control valve 135 between the stroke simulator 136 and the master cylinder.

In the present embodiment, the second variable-volume chamber 140 of the stroke simulator 136 is disconnected from the reservoir 62 and is therefore placed in the inoperable state when the reservoir communication valve 250 is placed in the closed state. In this sense, the reservoir communication valve 250 functions as a simulator control valve similar in function to the simulator control valve 136.

Further, a connecting passage 260 is connected at one end thereof to the rear pressure chamber 128, and at the other end to a portion of the fluid passage 90 between the pressure-control cylinder 12 and the front wheel brake cylinders 14. The connecting passage 260 is provided with a check valve 262 which permits a flow of the fluid in a direction from the rear pressure chamber 128 toward the fluid passage 90 but inhibits a flow of the fluid in the reverse direction. Thus, the check valve 262 functions to inhibit the discharge flow of the fluid from the front wheel brake cylinders 14 toward the rear pressure chamber 128 even when the fluid pressure in the front wheel brake cylinders 14 is higher than that in the rear pressure chamber 128. When the fluid pressure in the brake cylinders 14 becomes lower than that in the rear pressure chamber 128, the check valve 262 permits the pressurized fluid be delivered from the rear pressure chamber 128 to the brake cylinders 14.

In the other aspects, the second embodiment is identical with the first embodiment.

When the braking system of this second embodiment is normal, the braking pressure is controlled with the pressure-control cylinder 12 controlled by the pressure-control motor 100, while the master-cylinder cut-off valves 94, 96 being held in the closed state, as in the first embodiment. In this normal braking operation, the reservoir communication valve 250 is placed in the open state, to maintain the stroke simulator 136 in the operable state, and the rear pressure chamber 128 is supplied with the fluid received from the master cylinder 10 through the stroke simulator 136 and from the reservoir 62 through the reservoir communication valve 250 in the open state.

In the pressure hold mode, the reservoir communication valve 250 is switched to the closed state, and the pressure-control motor 100 is supplied with an electric current the amount of which is determined on the basis of the operating stroke of the brake pedal 34. The reservoir communication valve 250 placed in the closed state prevents the discharge flow of the fluid from the rear pressure chamber 128 to the reservoir 62. The fluid pressure of the rear pressure chamber 128 is increased as a result of operation of the pressure-control motor 100, but does not exceed the fluid pressure in the second variable-volume chamber 140 of the stroke simulator 136, since the amount of electric current to be applied to the motor 100 is determined such that the fluid pressure in the rear pressure chamber 128 is equal to the level corresponding to the operating force of the brake pedal 34, namely, equal to the fluid pressure in the pressurizing chamber 36 of the master cylinder 10. Further, the check valve 262 prevents the fluid pressure in the rear pressure chamber 128 from exceeding the braking pressure in the wheel brake cylinders 14. In the pressure hold mode, the pressure-control motor 100 is required to be operated to hold the fluid pressure in the control-pressure chambers 120, 122. In this case, the required drive force to be produced by the motor 100 is reduced owing to a force which acts on the control piston 106 based on the fluid pressure in the rear pressure chamber 128. Accordingly, the required amount of electric current to be applied to the motor 100 is reduced.

Where the reservoir communication valve 250 cannot be switched to its open state and is held in the closed state, in the event of some failure of the braking system, the pressurized fluid in the rear pressure chamber 128 cannot be returned to the reservoir 62. However, the fluid passage 260 and the check valve 262 permit the pressurized fluid to be discharged from the rear pressure chamber 128 to the fluid passage 90 when the master-cylinder cut-off valves 94, 96 are opened upon releasing of the brake pedal 34. As a result, the control piston 106 can be returned to the original position even when the valve 250 is abnormally held in the closed state. The fluid passage 260 and check valve 262 constitute a check valve device 264 which functions to prevent the discharge flow of the fluid from the wheel brake cylinders 14 to the rear pressure chamber 128. This check valve device 264 also functions as a fluid returning device for returning the fluid from the rear pressure chamber 128 to the control-pressure chamber 120.

The pressurized fluid in the rear pressure chamber 128 may be returned to the master cylinder 10 through the master-cylinder cut-off valve 94 placed in the open state, if the fluid pressure in the rear pressure chamber 128 becomes higher than that in the pressurizing chamber 36, for some reason or other, while the cut-off valves 94, 96 are held in the closed state. In this case, the reaction force acting on the brake pedal 34 suddenly increases. In this respect, the fluid return from the chamber 128 to the master cylinder 10 is not desirable. On the other hand, the fluid return from the chamber 128 to the control-pressure chamber 120 does not cause an increase of the reaction force acting on the brake pedal 34, upon releasing the brake pedal 34, and is therefore desirable.

The check valve device 264 may be provided between the rear pressure chamber 128 and the fluid passage 92, rather than between the chamber 128 and the fluid passage 90. Further, two check valve devices may be provided between the chamber 128 and the respective two fluid passages 90, 92. In any case, the check valve device or devices may be disposed between a portion of the braking system in which the fluid pressure is substantially equal to that in the rear pressure chamber 128, and another portion of the braking system in which the fluid pressure is substantially equal to that in the control-pressure chambers 120, 122 or wheel brake cylinders 14, 16. Described differently, the check valve device or devices may be disposed between the rear pressure chamber 128 or a portion of the fluid passage 134 which is downstream of the stroke simulator 136, and the control-pressure chambers 120, 122 or portions of the fluid passages 90, 92 between the control-pressure chambers 120, 122 and the wheel brake cylinders 14, 16 or the master-cylinder cut-off valves 94, 96.

Figure 7:
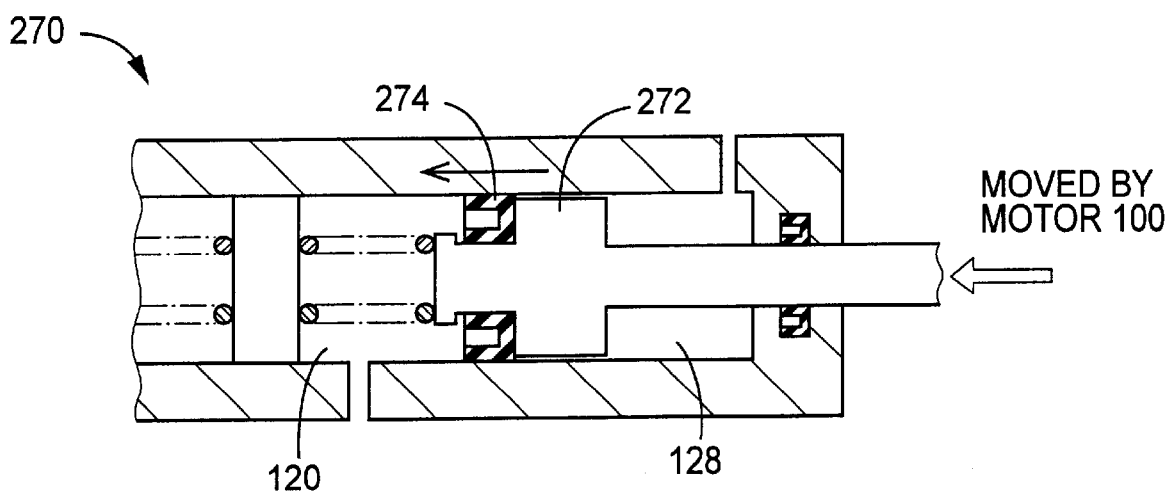
FIG. 7 is a view partly in cross section of a pressure control cylinder included in a braking system according to a further embodiment of this invention.

The check valve device may be disposed within the pressure-control cylinder, as in a braking system according to a third embodiment of the invention shown in FIG. 7. Namely, a control piston 262 of a pressure-control cylinder 270 is provided with a cup seal 274 which permits a flow of the fluid in a direction from the rear pressure chamber 128 toward the control-pressure chamber 120, but inhibits a flow of the fluid in the reverse direction. In this case, the pressure-control cylinder 270 does not require an O-ring.

While the control piston 262 is moved toward the control-pressure chamber 120 by the pressure-control motor 100, the cup seal 274 prevents the fluid from flowing from the control-pressure chamber 120 to the rear pressure chamber 218. When the fluid pressure in the control-pressure chamber 120 is lowered as a result of a releasing action of the brake pedal 34, the cup seal 274 permits the fluid to be discharged from the rear pressure chamber 128 into the control-pressure chamber 120. Thus, the cup seal 274 performs the same function as the check valve device 264 described above. Further, the cup seal 274 provided in place of the O-ring 127 has a smaller resistance to the sliding movement of the control piston 272 in the forward direction. Since the check valve device in the form of the cup seal 274 is not a device disposed outside the pressure-control cylinder 270, the check valve device does not increase the number of components of the braking system.

The simulator control valve may be disposed between the second variable-volume chamber 140 and the rear pressure chamber 128. It is noted that the flow restrictor device 60 and the stroke simulator 136 which are provided in the above embodiments are not essential. Further, the pressure-control motor 100 need not be bidirectionally operable, since the fluid pressure in the control-pressure chambers 120, 122 can be lowered in the pressure decrease mode by reducing the drive torque of the motor 100 to a value corresponding to the desired pressure in the chambers 120, 122. The manners of controlling the pressure-control motor 100 in the different pressure control modes are not limited to those in the embodiments described above.

Figure 8:
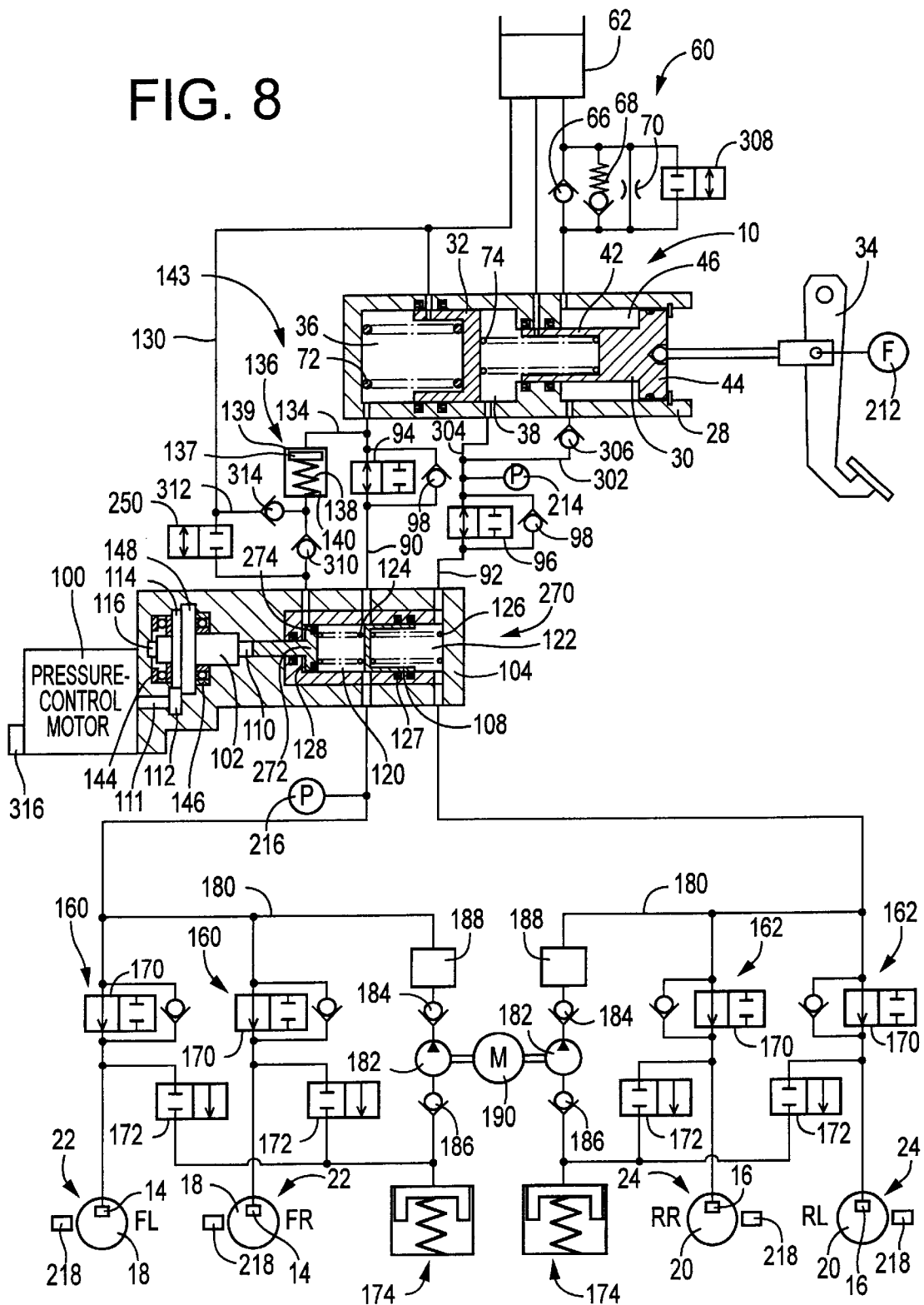
FIG. 8 is a hydraulic circuit diagram (partly in cross section) of a braking system according to a still further embodiment of the invention.

Referring to FIG. 8, there will be described a braking system constructed according to a fourth embodiment of this invention.

In the master cylinder 10 in the present embodiment, the small-diameter portion 42 of the pressurizing piston 30 does not have the communication passage 48, and the annular chamber 46 and pressuring chamber 38 are connected to the fluid passage 92 through respective independent passages 302, 304. The independent passage 302 is provided with a check valve 406 which permits a flow of the fluid in a direction from the annular chamber 46 to the pressurizing chamber 28 and fluid passage 92 but inhibits a flow of the fluid in the reverse direction. The independent passage 302 and check valve 306 achieve the same functions as the communication passage 48 and check valve 50 provided in the above embodiments.

The flow restrictor device 60 includes a solenoid-operated shut-off valve 308 in addition to and in parallel connection with the check valve 66, pressure-relief valve 68 and orifice 70. When the pressurizing piston 30 is advanced while the shut-off valve 308 is placed in the open state, the fluid is discharged from the annular chamber 46 to the reservoir 62, and the fluid in the annular chamber 46 is not pressurized. That is, the pressurized fluid is not delivered from the annular chamber 46 to the fluid passage 92 when the brake pedal 34 is operated. In this case, the fluid in the pressurizing chamber 38 is pressurized by the small-diameter portion 42, and delivered to the fluid passage 92. While the shut-off valve 308 is placed in the closed state, the fluid in the annular chamber 46 is pressurized by the large-diameter portion 44 until the fluid pressure in the annular chamber 46 has increased to the predetermined relief pressure of the pressure-relief valve 68. After the fluid pressure in the annular chamber 46 has exceeded the relief pressure, only the fluid in the pressurizing chamber 38 is increased by the small-diameter portion 42. The solenoid-operated shut-off valve 308 is selectively placed in the open or closed state depending upon whether the fast filling of the wheel brake cylinders 14, 16 is completed or not. Where the relief pressure of the pressure-relief valve 68 is relatively high, the fluid pressurization by the large-diameter portion 44 is changed to the fluid pressurization by the small-diameter portion 42 by switching the shut-off valve 308 from the closed state to the open state.

A check valve 310 is disposed in a portion of the fluid passage 134 between the stroke simulator 136 and the rear pressure chamber 128. The check valve 310 permits a flow of the fluid in a direction from the stroke simulator 136 toward the rear pressure chamber 128 but inhibits a flow of the fluid in the reverse direction. A connecting passage 312 is connected at one end thereof to a portion of the reservoir passage 130 between the reservoir communication valve 250 and the reservoir 62, and at the other end to a portion of the fluid passage 134 between the stroke simulator 136 and the check valve 310. The connecting passage 312 is provided with a check valve 314 which permits a flow of the fluid in a direction from the reservoir 62 toward the rear pressure chamber 128 but inhibits a flow of the fluid in the reverse direction.

Thus, the check valve 310 is provided between the rear pressure chamber 128 and the stroke simulator 136, while the reservoir communication valve 240 and a series connection of the two check valves 310, 314 are disposed in parallel connection with each other between the rear pressure chamber 128 and the reservoir 62. The check valve 310 inhibits the discharge flow of the fluid from the rear pressure chamber 128 to the stroke simulator 136. The check valves 310, 314 and the reservoir communication valve 250 placed in the closed state inhibit the discharge flow of the fluid from the chamber 128 to the reservoir 62. Thus, the check valves 310, 314 and the reservoir communication valve 250 provide a flow-restricting device in the form of a flow-inhibiting valve device for inhibiting the discharge flow of the fluid from the rear pressure chamber 128 to both of the stroke simulator 136 and the reservoir 62.

The braking system of FIG. 8 uses the pressure-control cylinder 270 of FIG. 7 wherein the control piston 272 is provided with the check valve device in the form of the cup seal 274, which permits the pressurized fluid to be discharged from the rear pressure chamber 128 to the control-pressure chamber 120 when the fluid pressure in the chamber 128 is higher than that in the chamber 120, as described above with respect to the third embodiment.

The check valve 314 is disposed between the stroke simulator 136 and the reservoir 62, while the check valve 310 is disposed between the stroke simulator 136 and the rear pressure chamber 128. The check valve 314 permits the fluid flow from the reservoir 62 to the second variable-volume chamber 140, while the check valve 310 permits the fluid flow from the second variable-volume 140 to the rear pressure chamber 128. Thus, the check valves 314, 310 permit the fluid flows into and from the second variable-volume chamber 140, for thereby placing the stroke simulator 136 in the operable state even while the reservoir communication valve 250 is placed in the closed state. Thus, the stroke simulator 136 may be placed in the operable state irrespective of the operating state of the valve 250.

A stroke sensor 316 is provided for detecting the operating stroke of the control piston 272. The stroke sensor 316 includes an encoder for detecting the number of revolutions of the pressure-control motor 100. The output signal of the stroke sensor 316 is applied to the brake ECU 200, which calculates the operating stroke of the control piston 272 on the basis of the detected number of revolutions of the motor 100.

The fully retracted position of the control piston 272 is determined by an abutting contact of the control piston 272 with a stop which is a part of the housing of the pressure-control cylinder 270.

In the other aspects, the braking system according to the fourth embodiment are identical with the braking systems according to the preceding embodiments.

In the present embodiment, the braking pressure is controlled by controlling the amount of electric current to be applied to the pressure-control motor 100, as in the preceding embodiments.

In the pressure increase mode and the pressure decrease mode, the amount of electric current IM to be applied to the pressure-control motor 100 is controlled such that the fluid pressure in the control-pressure chamber 120 coincides with a desired value determined by the operating force of the brake pedal 34, while the reservoir communication valve 250 is placed in the open state. The amount of electric current IM is controlled so as to satisfy the following equation (1):

$$FM = Ac1 \cdot PW \qquad (1)$$

wherein "FM", "PW" and "Ac1" represent the drive force produced by the motor 100, the desired fluid pressure in the control-pressure chamber 120, and an area of the pressure-receiving surface of the control piston 272 which partially defines the control-pressure chamber 120. "Ac2" included in the following equation (2) represents an area of the pressure-receiving surface of the piston 272 which partially defines the rear pressure chamber 128. This surface area Ac2 is equal to the total cross sectional area of the piston 272 minus the cross sectional area of the rod of the piston 272.

Where the long pressure hold mode is selected, the reservoir communication valve 250 is switched to the closed state, and the fluid in the rear pressure chamber 128 is pressurized, so that the control piston 272 receives a sum of the drive force of the pressure-control motor 100 and a force based on the fluid pressure in the rear pressure chamber 128. Accordingly, the amount of electric current to be applied to the motor 100 in the long pressure hold mode is controlled so as to satisfy the following equation (2):

$$FM + Ac2 \cdot PH = Ac1 \cdot PW \qquad (2)$$

wherein "PH" represents the fluid pressure in the rear pressure chamber 128.

Where the drive forces of the motor 100 when the reservoir communication valve 250 is in the closed and open states are represented by "FMH" and "FMO", the following equation (3) is satisfied as is understood from the above equations (1) and (2) and a fact that the fluid pressure PH in the rear pressure chamber 128 is not higher than that in the control-pressure chamber 120 (PW≧PH):

$$FMH \geqq FMO \cdot Ac2/Ac1 \qquad (3)$$

Since the drive force is substantially proportional to the amount of electric current IM, it will be understood that the following equation (4) is satisfied, where a constant α is larger than 1:

$$IM = IMO \cdot Ac2/Ac1 \cdot \alpha \qquad (4)$$

The amount of electric current IM to be applied to the pressure-control motor 100 in the long pressure hold mode is determined by the amount of electric current IMO upon selection of the long pressure hold mode, and a surface area ratio Ac2/Ac1 of the control piston 272. The constant α may be 1.1, for example, and the surface area ratio Ac2/Ac1 is usually determined to be about ⅓. In the long pressure hold mode in which the reservoir communication valve 250 is held in the closed state, the amount of electric current IM to be applied to the motor 100 to obtain the same pressure level in the control-pressure chamber 120 can be made smaller than in the other pressure control modes.

Figure 9:
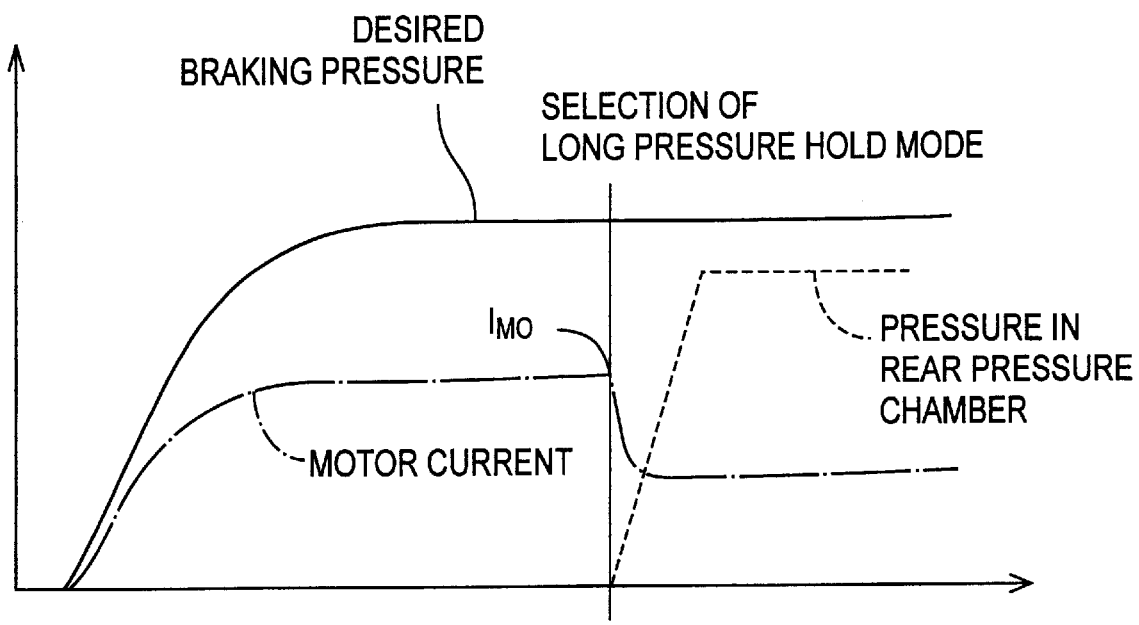
FIGS. 9 and 10 are views indicating an example of control of an electric current to be applied to a pressure-control electric motor when a long pressure hold mode is selected in the braking system of FIG. 8.

As indicated in the graph of FIG. 9, the amount of electric current IM of the pressure-control motor 100 to maintain the same fluid pressure in the control-pressure chamber 120 is made smaller in the long pressure hold mode than in the other pressure control modes, by an amount corresponding to the fluid pressure generated in the rear pressure chamber 128 with the reservoir communication valve 250 held in the closed state.

Figure 10:
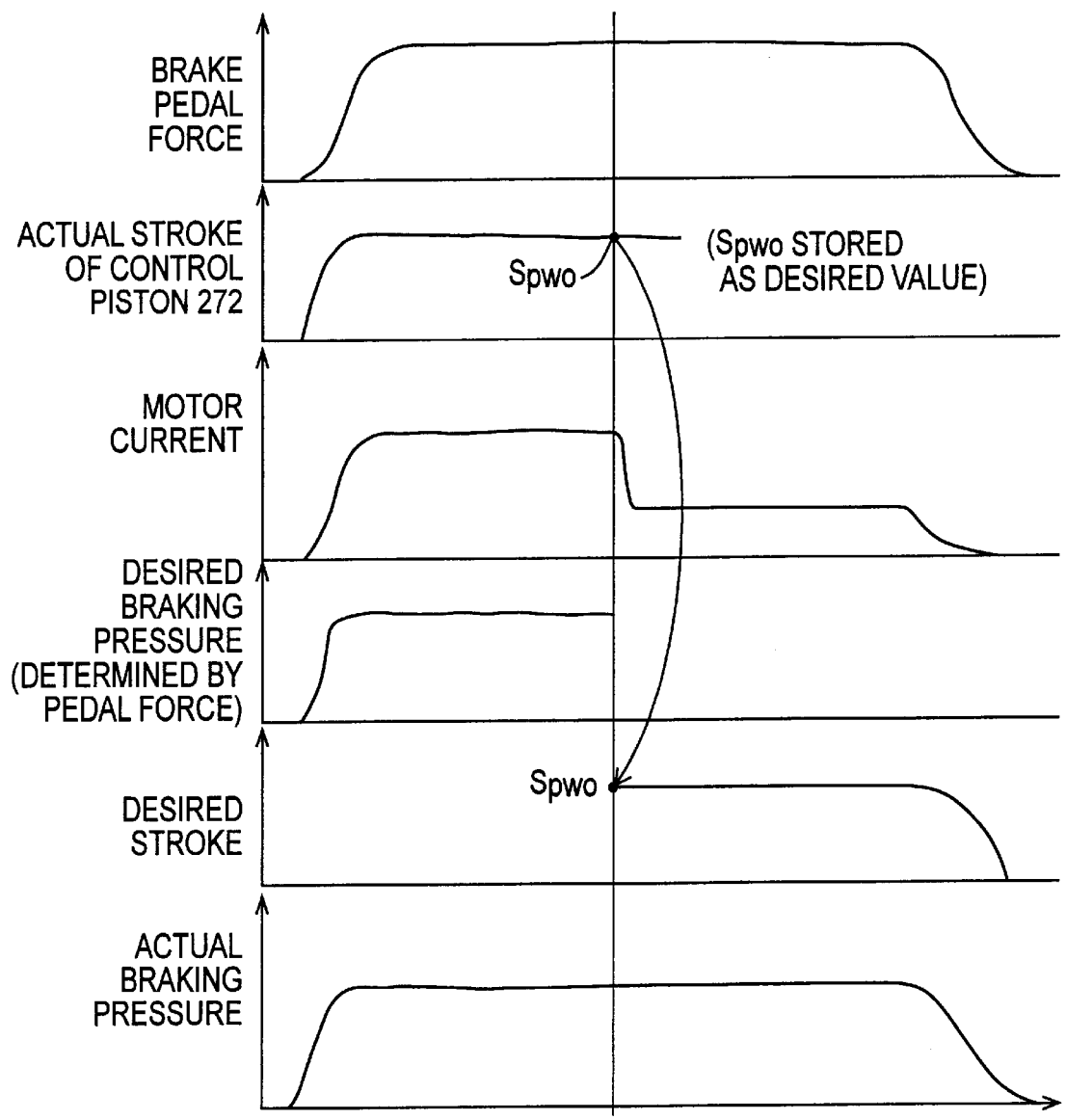

The amount of electric current to be applied to the motor 100 in the pressure increase mode and the pressure decrease mode is controlled such that the fluid pressure in the control-pressure chamber 120 is made equal to the desired value, as described above, while the amount of electric current in the long pressure hold mode may be controlled such that the control piston 272 is held at the position upon selection of the long pressure hold mode. As indicated in FIG. 10, the operating stroke of the control piston 272 upon selection of the long pressure hold mode is detected, and the motor 100 is controlled to maintain the detected operating stroke of the control piston.

If the amount of electric current of the motor 100 were controlled on the basis of the fluid pressure in the control-pressure chamber 120, this fluid pressure would vary upon switching of the reservoir communication valve 250 from the open state to the closed state, so that the amount of electric current would greatly change upon this switching of the valve 250, leading to hunting of the motor 100. In the present embodiment, however, the operating stroke of the control piston 262 is detected by the stroke sensor 316 on the basis of the number of revolutions of the motor 100, so that the operating stroke of the control piston 272 will not considerably change even when the fluid pressure in the control-pressure chamber 120 changes. Accordingly, the motor 100 is less likely to suffer from hunting when the amount of electric current is controlled on the basis of the operating stroke of the control piston 272.

The amount of electric current of the motor 100 may be zeroed after the control piston 262 is advanced by increasing the amount of electric current. The pressurized fluid is permitted to flow from the rear pressure chamber 128 into the control-pressure chamber 120 through the cup seal 274 even when the reservoir communication valve 250 is switched to the closed state upon selection of the long pressure hold mode. Accordingly, zeroing the amount of electric current of the motor 100 immediately after the selection of the long pressure hold mode would cause the control piston 272 to be retracted to increase the volume of the control-pressure chamber 120, so that the fluid pressure in the control-pressure chamber 120 would be made lower than before the amount of electric current was zeroed. To avoid this, the amount of electric current of the motor 100 is first increased to once advance the control piston 272 upon selection of the long pressure hold mode, and is then zeroed. This arrangement makes it possible to maintain the fluid pressure in the control-pressure chamber 120 at a level upon selection of the long pressure hold mode.

Initially, the amount of electric current is increased to increase the operating stroke of the control piston 272 to a value Spw represented by the following equation:

$$Spw = Spwo \cdot Ac1/Ac2$$

In the above equation, "Spwo" represents the operating stroke when the long pressure hold mode is selected. As is understood from the above equation, the desired operating stroke Spw of the control piston 272 is determined by the present operating stroke Spwo and the surface area ratio Ac1/Ac2. In other words, the desired operating stroke Spw is determined on the basis of the amount of increase of the volume of the rear pressure chamber 128 due to the retracting movement of the control piston 272.

After the control piston 272 has been advanced, the control piston 272 is held at the present position for a predetermined time t. Namely, the advancing movement of the control piston 272 causes an increase of the volume of the rear pressure chamber 128 SO that the fluid is supplied from the reservoir 62 to the rear pressure chamber 128. Then, the control piston 272 is held at the present position for the predetermined time t during which the rear pressure chamber 128 becomes fluid tight with respect to the control-pressure chamber 120.

After the predetermined time t has passed, the reservoir switching valve 250 is switched to the closed state, and the amount of electric current to be applied to the motor 100 is reduced to zero. As a result, the control piston 272 is retracted, and the volume of the rear pressure chamber 128 is reduced while the volume of the control-pressure chamber 120 is increased. Accordingly, the fluid pressure in the rear pressure chamber 128 is increased, and the fluid pressure in the control-pressure chamber 120 is reduced. When the fluid pressure in the rear pressure chamber 128 has been increased to a level not lower than the pressure in the control-pressure chamber 120, the fluid is delivered from the rear pressure chamber 128 to the control-pressure chamber 120, so that the control piston 272 is retracted to the fully retracted position since the surface area of the control piston 272 which partially defines the chamber 128 is smaller than the surface area partially defines the chamber 120. At the fully retracted position, a force based on the fluid pressure in the rear pressure chamber 128 acts on the control piston 272 in the advancing direction, while a force based on the fluid pressure in the control-pressure chamber 120 acts on the control piston 272 in the retracting direction. These two forces are equal to each other, and the fluid pressures in the chambers 128, 120 are controlled to be equal to each other, and equal to the value when the long pressure hold mode was selected. Thus, the present embodiment is arranged to first raise the fluid pressure in the control-pressure chamber 120 before the amount of electric current of the motor 100 is zeroed, so that the fluid pressure in the control-pressure chamber 120 can be held at the level upon selection of the long pressure control mode.

Figure 11:
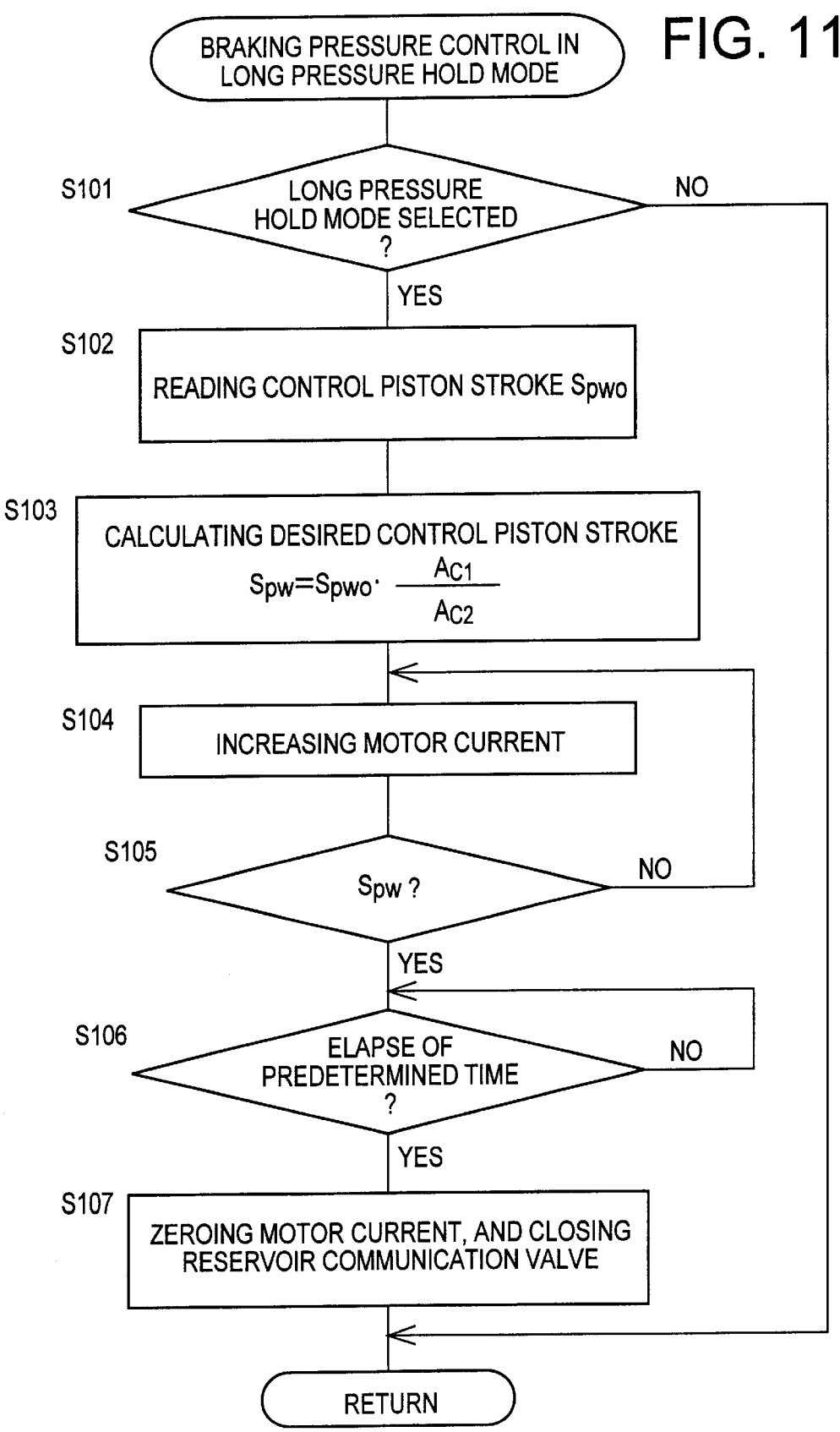
FIG. 11 is a flow chart illustrating a long pressure hold control routine executed according to a control program stored in a ROM of an electric control unit in the braking system of FIG. 8.

Referring next to the flow chart of FIG. 11, there will be described a braking pressure control routine executed in the long pressure hold mode. This braking control routine is initiated with step S101 to determine whether the long pressure hold mode has been selected, that is, a long-pressure-hold requirement is detected. If an affirmative decision (YES) is obtained in step S101, the control flow goes to step S102 to read the operating stroke Spwo of the control piston 272, and then to step S103 to calculate the desired value Spw of the operating stroke Spwo. Step S103 is followed by steps S104 and S105 to increase the amount of electric current IM to be applied to the pressure-control motor 100 to advance the control piston 272 until the desired operating stroke Spw is obtained. For instance, the amount of electric current of the motor 100 is gradually increased in a predetermined increment until the desired operating stroke Spw is obtained. Then, the control flow goes to step S106 in which the control piston 272 is held at the present position for the predetermined time t. After the predetermined time t has passed, the control flow goes to step S107 to reduce the amount of electric current IM to zero, and close the reservoir communication valve 250.

Figure 12:
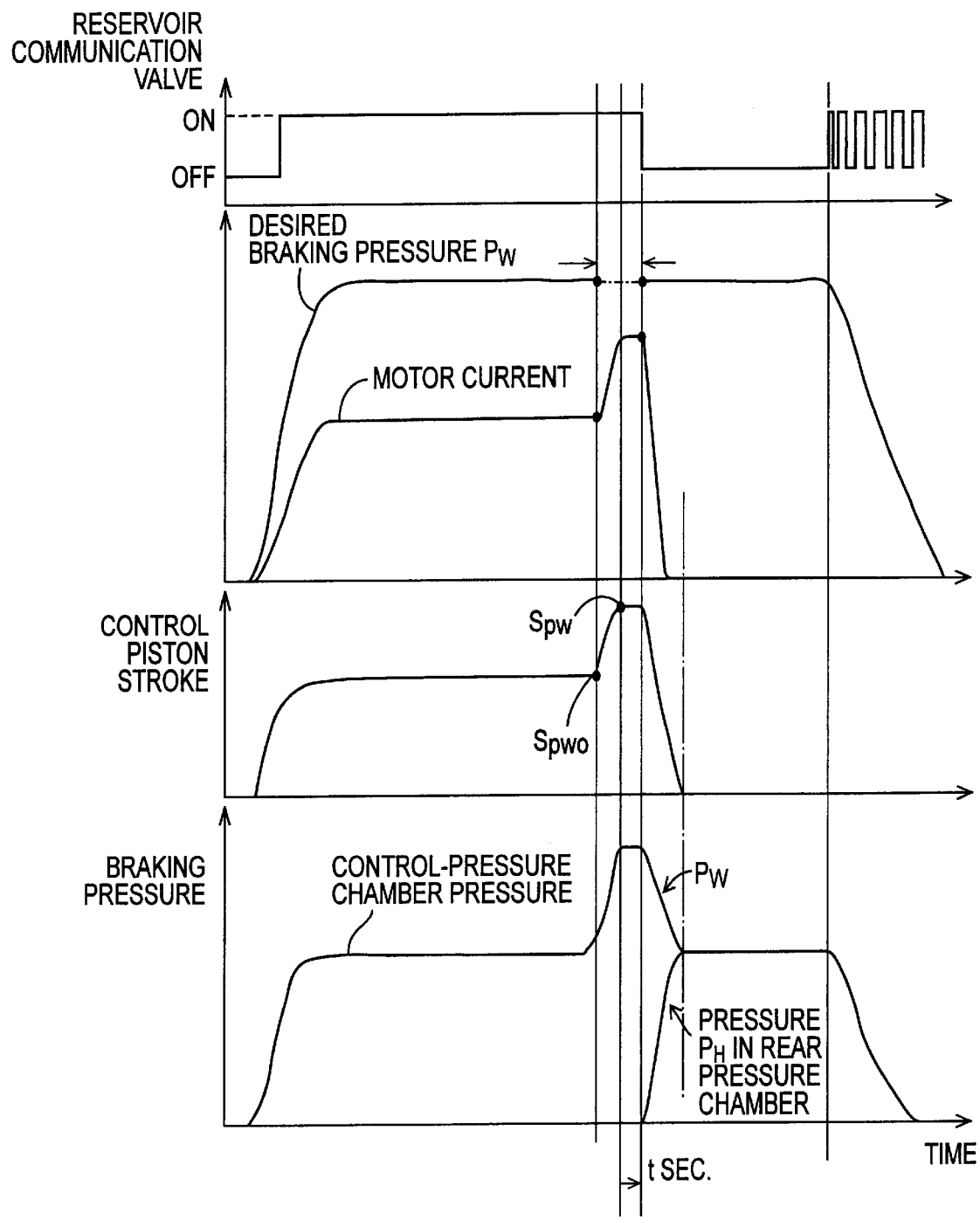
FIG. 12 is a view indicating another example of control of the electric current to be applied to the pressure-control electric motor in the long pressure hold mode in the braking system of FIG. 8.

In the present embodiment, the fluid pressure in the control-pressure chamber 120 can be held constant even if the amount of electric current of the pressure-control motor 100 is zeroed, as indicated in FIG. 12. Accordingly, the required amount of consumption of the electric power by the motor 100 can be reduced.

When the pressure decrease mode is selected following the long pressure increase mode, the fluid pressure in the rear pressure chamber 128 is reduced by alternately placing the reservoir communication valve 250 in the open and closed states, so that the fluid pressure in the control-pressure chamber 120 is be reduced. The duty ratio of the valve 250 is controlled so that the fluid pressure in the control-pressure chamber 120 coincides with the desired value. In this case, the control piston 272 is located at the fully retracted position.

While the braking system of the present fourth embodiment is arranged to advance the control piston 272 until the detected operating stroke has increased to the desired value, the control piston 272 may be advanced until the detected fluid pressure in the control-pressure chamber 120 has increased to the desired value.

Further, the control piston 272 may be advanced by a predetermined constant distance, that is, to obtain a predetermined constant operating stroke, until the fluid pressure in the control-pressure chamber 120 is increased by a predetermined amount. Where it is not necessary to maintain the fluid pressure in the control-pressure chamber 120 at the value upon selection of the long pressure hold mode, the control piston 272 may be advanced by a predetermined suitable distance before the amount of electric current of the motor 100 is zeroed. This arrangement is sufficient to reduce the amount of reduction of the fluid pressure in the control-pressure chamber 120 due to the retracting movement of the control piston 272.

While the preceding embodiments are arranged to select the long pressure hold mode, when the pressure hold mode is continued for a relatively long time while the vehicle is stationary, the long pressure hold mode may be selected when any other predetermined condition is satisfied, for instance: when the pressure hold mode is continued for more than a predetermined time irrespective of whether the vehicle is stationary or running; when an amount of change of the desired braking pressure for a predetermined time is not larger than a predetermined threshold; or when the frequency of change of the desired braking pressure is not higher than a predetermined threshold.

Figure 13:
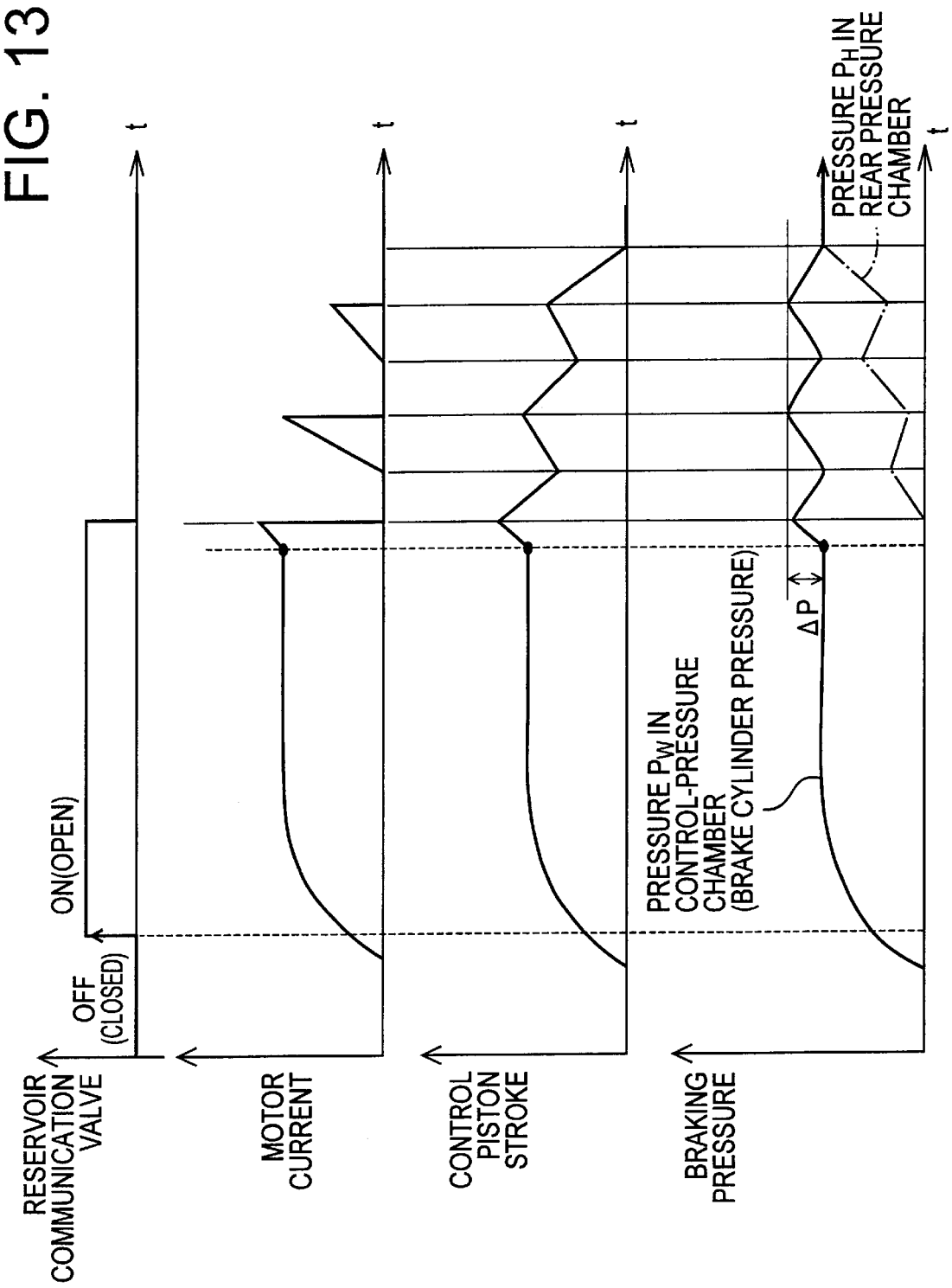
FIG. 13 is a view indicating a further example of control the electric current in the long pressure hold mode in the braking system of FIG. 8.

Further, the amount of electric current to be applied to the pressure-control motor 100 may be controlled as indicated in FIG. 13. When the long pressure hold mode is selected, the amount of electric current of the motor 100 is increased to advance the control piston 272 so that the fluid pressure in the control-pressure chamber 120 is increased by a predetermined amount $\Delta P$. Then, the amount of electric current of the motor 100 is reduced to zero, and the reservoir communication valve 250 is closed.

Thereafter, the amount of electric current of the motor 100 is controlled so that the fluid pressure in the control-pressure chamber 120 is held within a predetermined range (between the value Pw upon selection of the long pressure hold mode, and a value (Pw+$\Delta P$)). When the control piston 272 has reached the fully retracted position, the fluid pressures in the rear pressure chamber 128 and the control-pressure chamber 120 become equal to each other, and the fluid pressure in the control-pressure chamber 120 is equal to the value when the long pressure hold mode was selected.

Figure 14:
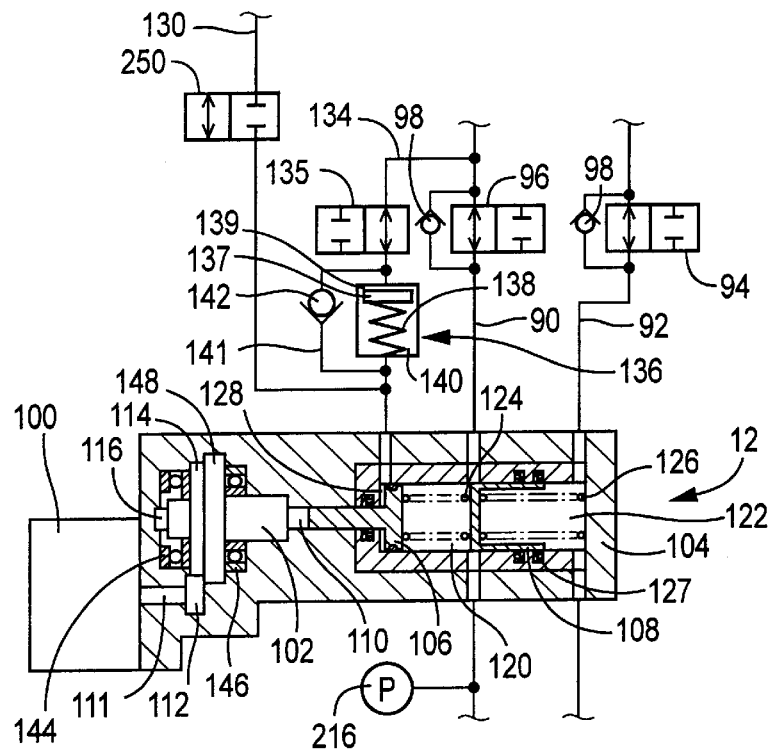
FIG. 14 is a fragmentary hydraulic circuit diagram (partly in cross section) of a braking system according to a yet further embodiment of the present invention.

In the modification of FIG. 14, the distance of the advancing movement of the control piston 272 is smaller than in the fourth embodiment, so that the operating stroke of the brake pedal 34 can be made relatively small, reducing the degree of deterioration of the operating feel of the brake pedal 34.

Figure 15:
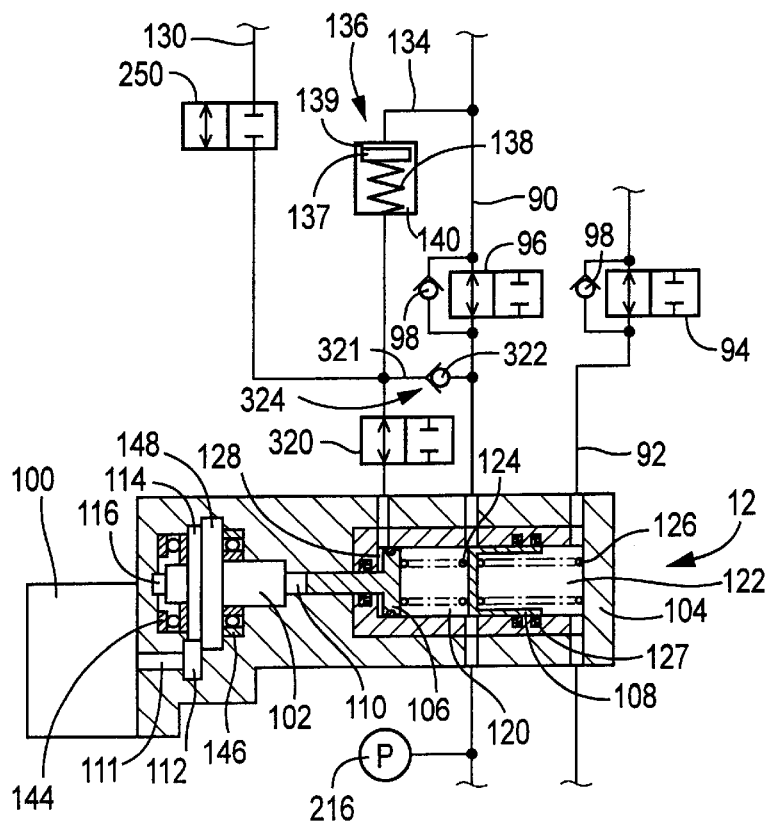
FIG. 15 is a fragmentary hydraulic circuit diagram (partly in cross section) of a braking system according to still another embodiment of this invention.

Referring to FIGS. 14 and 15, there will be described braking systems according to fifth and sixth embodiments of this invention. The braking system of FIG. 14 is a modification of FIG. 1, wherein the reservoir communication valve 250 provided in the braking system of FIG. 6 is provided in place of the check valve 132 in the fluid passage 130.

The rear pressure chamber 128 is communicated with the reservoir 62 through the reservoir communication valve 250 placed in the open state, so that the volume of the chamber 128 can be changed as the control piston 106 is moved. Since the simulator control valve 135 is opened upon releasing of the brake pedal 34, the fluid in the rear pressure chamber 128 can be returned to the master cylinder 10 through the simulator control valve 135.

In the braking system of FIG. 15, a flow inhibiting valve 320 is provided in a portion of the fluid passage 135 between the stroke simulator 136 and the rear pressure chamber 128. Further, a fluid passage 321 is connected at one end thereof to a portion of the fluid passage 134 between the stroke simulator 136 and the flow inhibiting valvev 320, and at the other end to a portion of the fluid passage 90 between the master-cylinder cut-off valve 94 and the pressure-control cylinder 12. The fluid passage 321 is provided with a check valve 322. The fluid passage 321 and the check valve 322 cooperate to constitute a check valve device 324. The flow inhibiting valve 320 is a normally open valve, and therefore permits the fluid in the rear pressure chamber 128 to be returned to the master cylinder 10, where the flow inhibiting valve 320 cannot be closed due to an electrical failure.

The discharge flow of the fluid from the rear pressure chamber 128 can be prevented by the flow inhibiting valve 320 placed in the closed state, even when the amount of electric current of the motor 100 is zeroed in the long pressure hold mode. Thus, the flow inhibiting valve 320 prevents a retracting movement of the control piston 106, and maintains the fluid pressure in the control-pressure chamber 120, in the long pressure hold mode.

Even while the flow inhibiting valve 320 is placed in the closed state, the fluid flows between the second variable-volume chamber 140 of the stroke simulator 136 and the reservoir 62 are permitted through the reservoir communication valve 250 placed in the open state, so that the stroke simulator 136 can be placed in the operable state.

In the pressure-control cylinder 12, 270 in the illustrated embodiments, the control piston 106, 272 is moved by the pressure-control motor 100 which is an electric motor. However, the control piston may be moved by a power-operated drive device other than the electric motor.

Referring next to FIGS. 16–19, there will be described a braking system according to a seventh embodiment of this invention. The braking system of this embodiment is different from the first embodiment in that the present braking system does not includes the simulator control valve 135, stroke simulator 136 and check valve 142 which are disposed between the master cylinder 10 and the rear pressure chamber 128 of the pressure-control cylinder 12 in the first embodiment. The present braking system does not include the fluid passage 130 connecting the rear pressure chamber 128 and the reservoir 62, and the check valve 132 in the fluid passage 130, which fluid passage 30 and check valve 132 are provided in the first embodiment.

Figure 16:
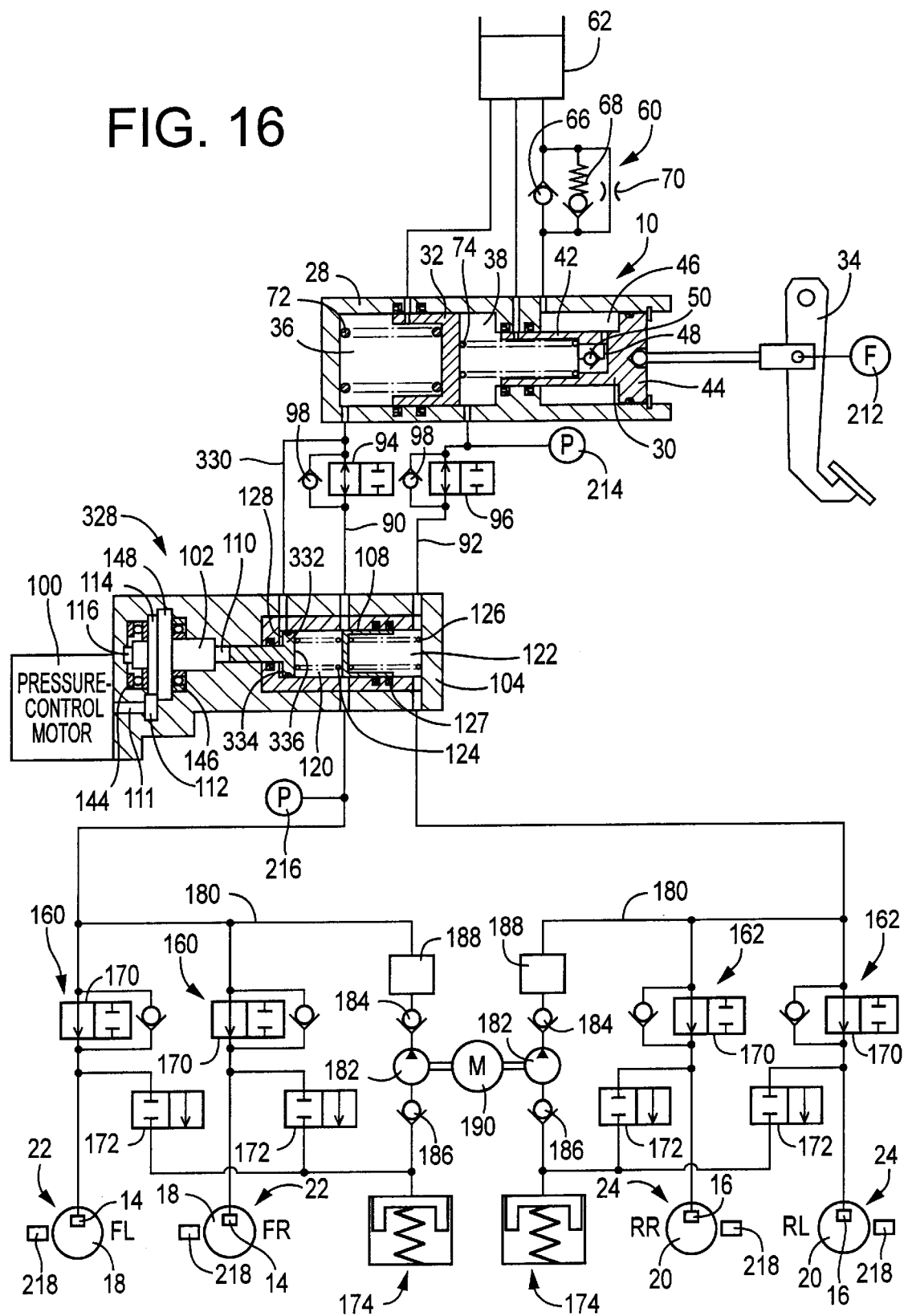
FIG. 16 is a hydraulic circuit diagram (partly in cross section) of a braking system according to yet another embodiment of the invention.

In the braking system of FIG. 16, the rear pressure chamber 128 of a control-pressure cylinder 328 is directly connected to the pressurizing chamber 36 of the master cylinder 10 through a by-pass fluid passage 330, to permit permanent fluid communication between the rear pressure chamber 128 and the pressurizing chamber 36.

The pressure-control piston 328 includes a control piston 332 having a rear pressure-receiving surface 334 partially defining the rear pressure chamber 128, and a front pressure-receiving surface 336 partially defining the control-pressure chamber 120. The rear pressure-receiving surface 334 has a smaller area than the front pressure-receiving surface 336, so that the amount of fluid to be delivered from the pressure-control cylinder 328 to the wheel brake cylinders 14, 16 is made larger than the amount which is delivered from the master cylinder 10.

Figure 17:
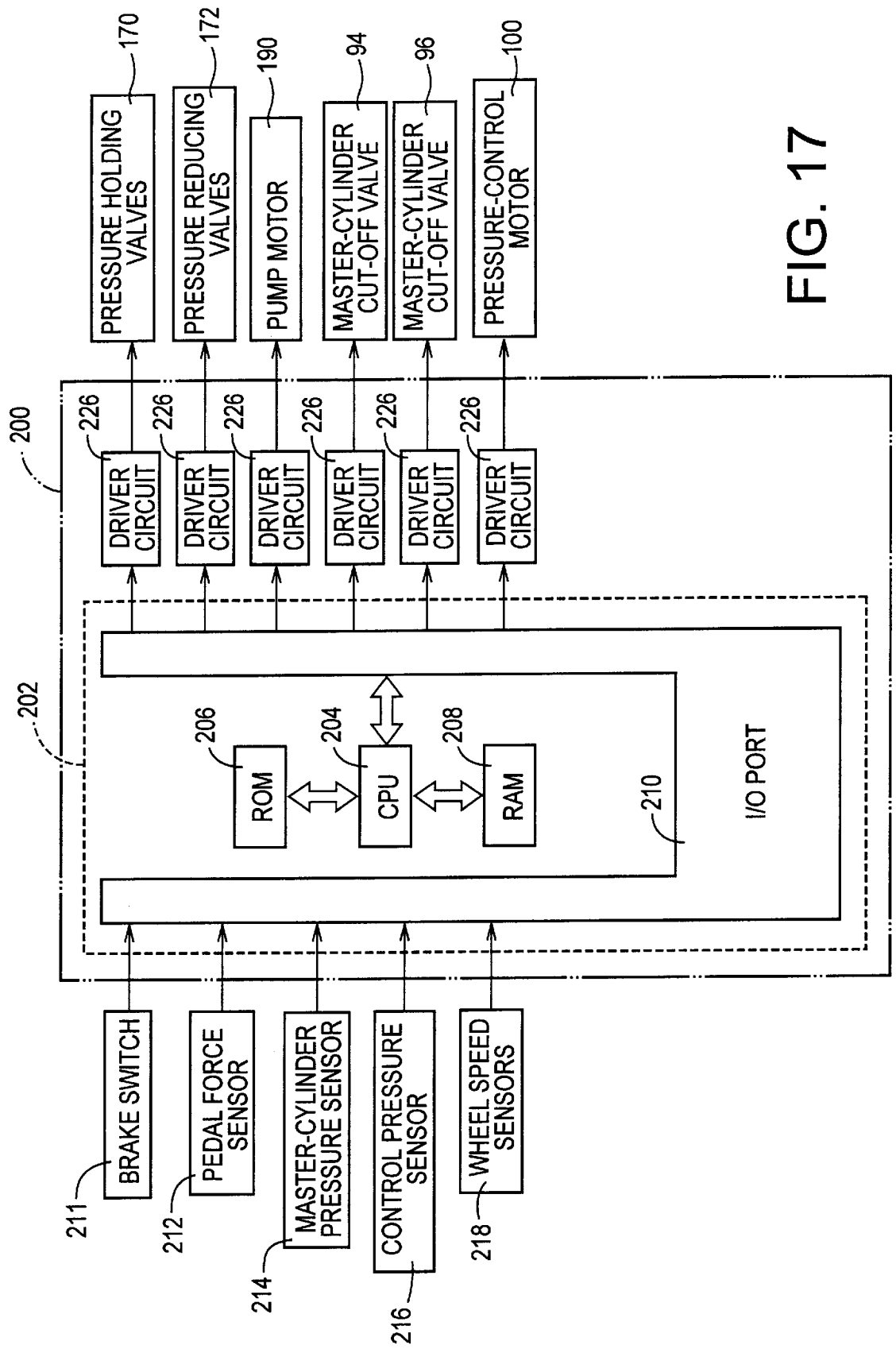
FIG. 17 is a block diagram showing a braking-pressure control device included in the braking system of FIG. 16.

In the present braking system, the input-output portion 210 of the control portion 202 of the control device 200 is arranged to receive the output signals of the brake switch 211, pedal force sensor 212, master-cylinder pressure sensor 214, control pressure sensor 216 and wheel speed sensors 218, as shown in FIG. 17. As in the first embodiment, the control portion 202 controls the pressure holding valves 170, pressure reducing valves 172, pump drive motor 190, master-cylinder cut-off valves 94, 96 and pressure-control motor 100. The ROM 206 stores control programs such as a program for executing a normal braking control routine illustrated in the flow chart of FIG. 18, which will be described.

The amount of electric current to be applied to the pressure-control motor 100 is controlled such that the fluid pressure in the control-pressure chambers 120, 122 coincides with a desired value determined by the operating force of the brake pedal 34. The control piston 332 receives a drive force F(I) produced by the motor 100, a force based on the fluid pressure in the rear pressure chamber 128 and a force based on the fluid pressure in the control-pressure chamber 120. Since the fluid pressure in the rear pressure chamber 128 is equal to the fluid pressure PM in the pressurizing chamber 36, the fluid pressure PB in the control-pressure chamber 120 is represented by the following equation (5):

$$PB=(PM \cdot SM+F(I))/SB \qquad (5)$$

In the above equation (5), "SM" and "SB" represent the respective areas of the rear and front pressure-receiving surfaces 132 and 134 of the control piston 332.

The fluid pressure PM in the master cylinder 10 corresponds to the operating force of the brake pedal 34, while the desired value of the fluid pressure PB in the control-pressure chamber 120 is equal to the operating force multiplied by a predetermined boosting ratio. Therefore, the fluid pressures PM and PB satisfy an equation $PB=k \cdot PM$. From this equation and the above equation (5), the following equation (6) may be obtained:

$$PB=(k \cdot F(I))/(k \cdot SB-SM) \qquad (6)$$

Figure 19:
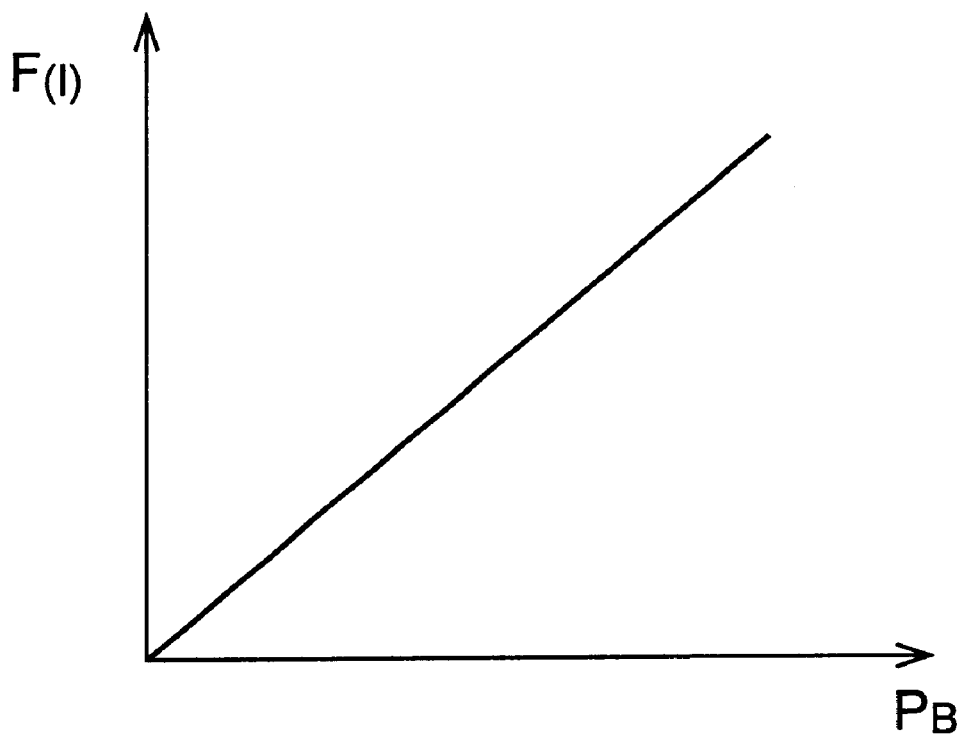
FIG. 19 is a graph indicating a relationship between a drive force produced by a pressure-control electric motor and a desired braking pressure, which relationship is used by the braking-pressure control device.

It will be understood from the above equation (6) that the desired fluid pressure PB (desired braking pressure in the wheel brake cylinders 14, 16) and the drive force F(I) satisfy a relationship as shown in the graph of FIG. 19. The amount of electric current to be applied to the pressure-control motor 100 is determined so that the motor 100 produces the drive force F(I) corresponding to the desired braking pressure PB. As described above with respect to the first embodiment, the control piston 332 receives the drive force F(I) corresponding to the drive torque of the motor 100.

Figure 18:
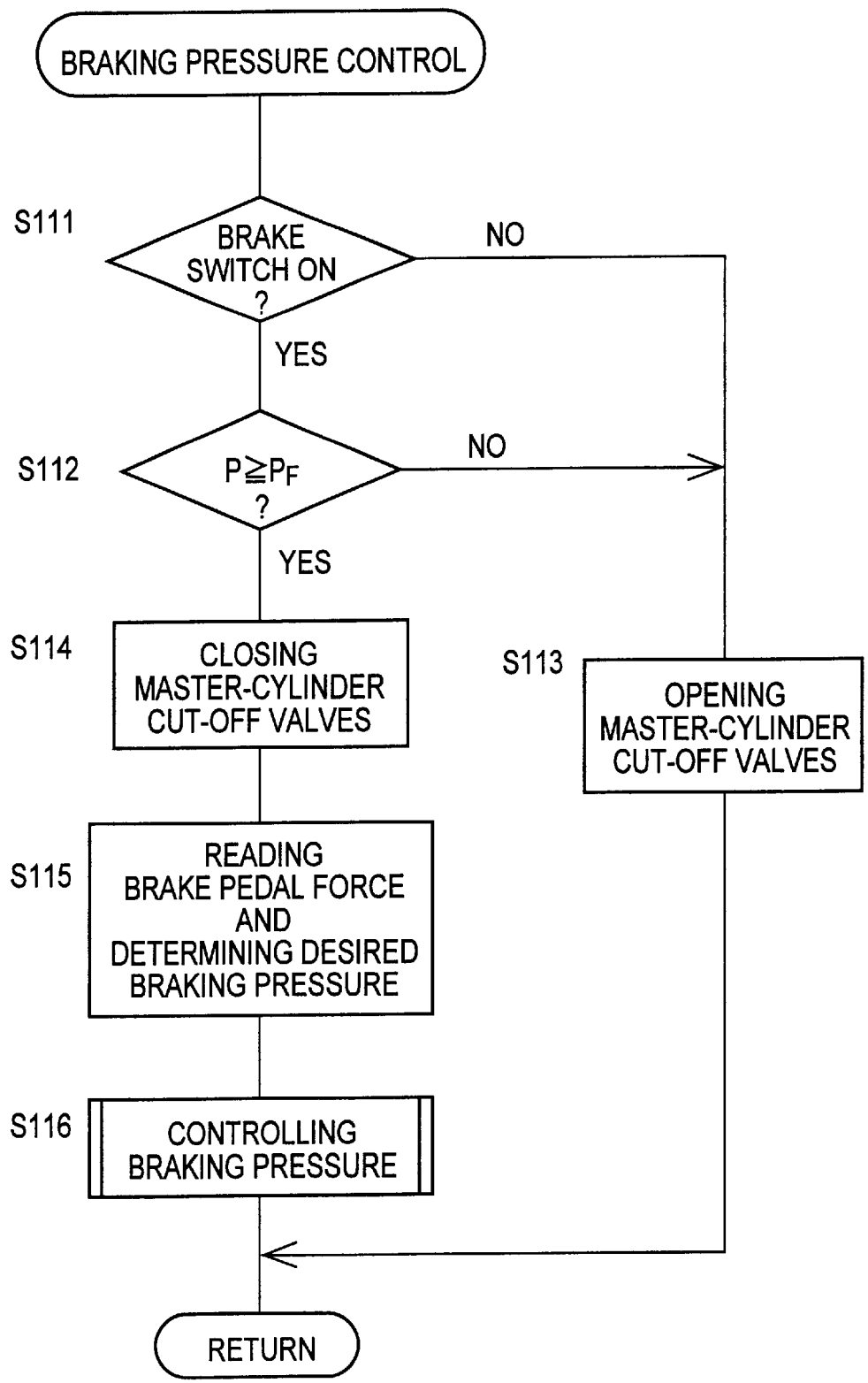
FIG. 18 is a flow chart illustrating a brake control routine executed according to a control program stored in a ROM of the braking-pressure control device of FIG. 17.

The normal braking control routine illustrated in the flow chart of FIG. 18 will be described. The routine is initiated with step S111 to determine whether the brake pedal 34 is in operation, that is, whether the brake switch 211 is in the ON state. If an affirmative decision (YES) is obtained in step S111, the control flow goes to step S112 to determine whether the fluid pressure detected by the control pressure sensor 216 has increased to a level at which the fast filling of the wheel brake cylinders 14, 16 is completed. Before the fast filling of the wheel brake cylinders 14, 16 is completed, a negative decision (NO) is obtained in step S112, and the control flow goes to step S113 in which the master-cylinder cut-off valves 94, 96 are placed in the open state, so that the pressurized fluid is delivered from the master cylinder 10 to the wheel brake cylinders 14, 16 at a comparatively high rate of flow of the fluid, so that the fast filling of the wheel brake cylinders can be completed in a relatively short time. In this state, the pressure-control cylinder 328 is held in the inoperable state, and the pressurized fluid is not delivered from the pressurizing chamber 36 to the rear pressure chamber 128 of the pressure-control cylinder 328.

Upon completion of the fast filling of the wheel brake cylinders 14, 16, an affirmative decision (YES) is obtained in step S112, and the control flow goes to step S114 to open the master-cylinder cut-off valves 94, 96, and then to step S115 to read the operating force of the brake pedal 34 detected by the pedal force sensor 212, and determine the desired value of the braking pressure on the basis of the detected operating force of the brake pedal 34. Step S115 is followed by step S116 in which the pressure-control motor 100 is controlled so as to establish the desired braking pressure in the wheel brake cylinders 14, 16 based on the pressurized fluid masses in the control-pressure chambers 120, 122, for activating the front and rear brakes 22, 24.

Since the area of the rear pressure-receiving surface 334 of the control piston 332 is smaller than that of the front pressure-receiving surface 336, the amount of the pressurized fluid to be delivered from the pressure-control chambers 120, 122 to the wheel brake cylinders 14, 16 is made larger than the amount which is delivered from the master cylinder 10. This arrangement is effective to avoid an excessively large operating stroke of the brake pedal 34. Further, the volume of the rear pressure chamber 128 is changed with a change of the volume of the pressurizing chamber 36, so that the brake pedal 34 receives an accordingly changing reaction force.

When the brake pedal 34 is released, a negative decision (NO) is obtained in step S111, and the control flow directly goes to step S113 to place the master-cylinder cut-off valves 94, 96 in the original open state of FIG. 16.

The master-cylinder cut-off valves 94, 96 are held in the original open state where the electric system becomes defective, so that the pressurized fluid is delivered from the pressurizing chambers 36, 38 directly to the wheel brake cylinders 14, 16, to activate the front and rear brakes 22, 24. In this event, the fluid in the pressurizing chamber 38 is increased by the small-diameter portion 42 of the pressurizing piston 32, so that the fluid in the pressurizing chamber 38 is made relatively high for a given operating force of the brake pedal 34.

In the present seventh embodiment, the pressure-control cylinder 328 controlled as described above provides substantially the same effect as provided by a stroke simulator connected to the master cylinder 10. During an operation of the brake pedal 34, the required operating stroke of the brake pedal 34 can be reduced, and the fluid in the pressurizing chamber 38 can be increased at a relatively high boosting ratio, when the master cylinder 10 is communicated with the wheel brake cylinders 14, 16.

In the present embodiment, the control piston 332 receives not only the drive force of the pressure-control motor 100 but also a force based on the fluid-pressure in the rear pressure chamber 128. Accordingly, the required amount of electric power to operate the motor 100 for increasing the fluid pressure in the control-pressure chambers 120, 122 to a given level is reduced by an amount corresponding to the force based on the fluid pressure in the chamber 128. That is, the fluid pressure generated by the master cylinder 10 is utilized to operate the control piston 332, so that the required amount of consumption of the electric energy by the motor 100 can be reduced.

In addition, the present braking system which does not include a stroke simulator is available at a reduced cost with a reduced number of components.

Figure 20:
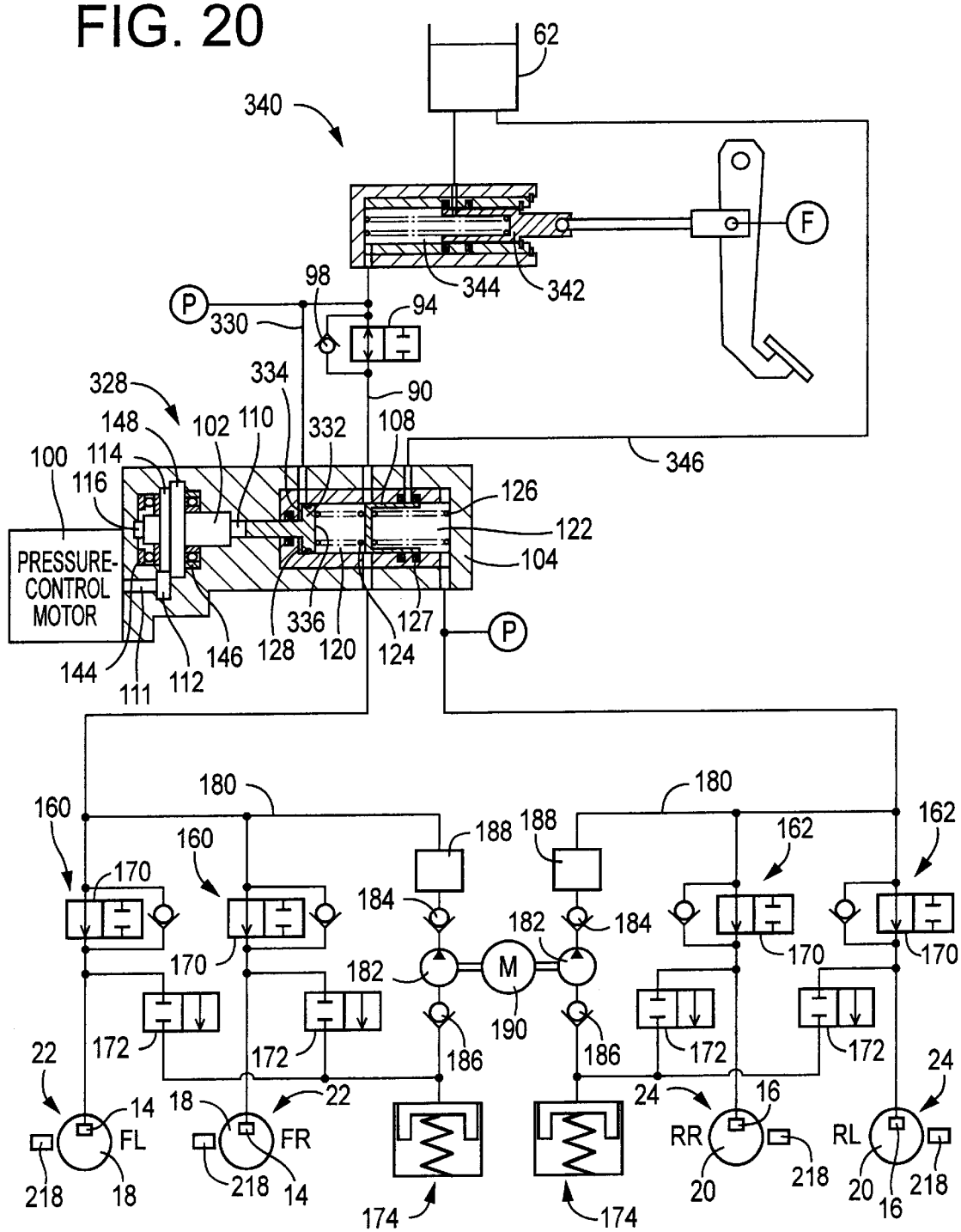
FIG. 20 is a hydraulic circuit diagram (partly in cross section) of a braking system according to a further embodiment of this invention.

Referring to FIG. 20, there will be described a braking system according to an eighth embodiment of this invention. The present braking system is provided with a master cylinder 340 which includes a single pressurizing piston 342. A pressurizing chamber 344 is formed in front of the pressurizing piston 342, and is connected to the control-pressure chamber 120 of the pressure-control cylinder 328 through the fluid passage 90, and to the rear pressure chamber 128 through the fluid passage 330. The control-pressure chamber 122 of the control-pressure chamber 328 is connected to the reservoir 62 through a fluid passage 346, to prevent the fluid pressure in the control-pressure chamber 328 from being lowered below the atmospheric level. In the other aspects, the braking system of FIG. 20 is identical with the braking system of FIG. 16. Thus, the principle of the present invention is applicable to a braking system including a single-piston master cylinder, as well as a braking system including a tandem-type two-piston master cylinder.

It is to be understood that the present invention may be embodied with various other changes, modifications and improvements, such as those described in the SUMMARY OF THE INVENTION, which may occur to those skilled in the art, without departing from the spirit and scope of the invention defined in the following claims:

What is claimed is:

1. A braking system comprising:
   a hydraulically operated brake cylinder for operating a brake;
   a master cylinder operable according to an operation of a manually operable brake operating member, to pressurize a working fluid;
   a master-cylinder cut-off valve connected to the master cylinder:
   a high-pressure source disposed between the master-cylinder cut-off valve and the brake cylinder and operable according to the operation of the brake operating member, to pressurize the fluid, characterized by further comprising, said high-pressure source comprising a power-operated drive device, and a pressure-control cylinder having a control piston which is operable by said power-operated drive device and which partially defines a front control-pressure chamber and a rear pressure chamber on respective front and rear sides thereof, said front control-pressure chamber being connected to said brake cylinder while said rear pressure chamber being held in communication with said master cylinder; and
   a braking-pressure control device operable to control said power-operated drive device, to thereby control the pressure of the fluid in said brake cylinder.

2. A braking system comprising:
   a hydraulically operated brake cylinder for operating a brake;
   a master cylinder operable according to an operation of a manually operable brake operating member, to pressurize a working fluid;
   a master-cylinder cut-off valve connected to the master cylinder:
   a high-pressure source disposed between the master-cylinder cut-off valve and the brake cylinder and operable according to the operation of the brake operating member, to pressurize the fluid, characterized by further comprising, said high-pressure source comprises a power-operated drive device, and a pressure-control cylinder having a control piston which is operable by said power-operated drive device and which partially defines a front control-pressure chamber and a rear pressure chamber on respective front and rear sides thereof, said front control-pressure chamber being connected to said brake cylinder while said rear pressure chamber being normally held in communication with said master cylinder; and
   a braking-pressure control device operable to control said power-operated drive device, to thereby control the pressure of the fluid in said brake cylinder.

3. A braking system according to claim 2, further comprising a fluid passage connecting said master cylinder and said control-pressure chamber, and wherein said master-cylinder cut-off valve is disposed in said fluid passage, and has an open state in which said master cylinder and said control-pressure chamber are communicated with each other, and a closed state in which said master cylinder and said control-pressure chamber are isolated from each other.

4. A braking system according to claim 2, wherein said braking-pressure control device includes an operation detecting portion operable to detect an operating state of said brake operating member, said braking-pressure control device controlling said power-operated drive device on the basis of said operating state detected by said operation detecting portion.

5. A braking system according to claim 2, wherein said braking-pressure control device controls said power-operated drive device such that the pressure of the fluid in said control-pressure chamber is controlled to a level determined by the detected operating state of the brake operating member.

6. A braking system according to claim 2, which is arranged such that a volume of said rear pressure chamber is changed as said manually operated brake operating member is operated, while said power-operated drive device is controlled to operate said control piston of said pressure-control cylinder.

7. A braking system according to claim 2, which is arranged such that the pressure of the fluid in said rear pressure chamber is controlled to a level corresponding to an operating force of said manually operable brake operating member, while said power-operated drive device is controlled to operate said control piston of said pressure-control cylinder.

8. A braking system according to claim 3, wherein said master-cylinder cut-off valve is an electromagnetic shut-off valve which is switched at least between said open and closed state depending upon an amount of electric current applied thereto, and said braking-pressure control device controls said power-operated drive device to control the fluid pressure in said brake cylinder, while said electromagnetic shut-off valve is placed in said closed state.

9. A braking system according to claim 2, wherein said control piston of said pressure-control cylinder has a rear pressure-receiving surface partially defining said rear pressure chamber and a rear pressure-receiving surface partially defining said control-pressure chamber, said rear pressure-receiving surface having a smaller area than said front pressure-receiving surface.

10. A braking system according to claim 2, wherein said master cylinder includes a pressurizing piston which is connected to said manually operable brake operating member and which includes a rear large-diameter portion on the side of said brake operating member, and a front small-diameter portion partially defining a pressurizing chamber in front of said small-diameter portion, said front small-diameter portion having a smaller diameter than said rear large-diameter portion, and wherein said pressurizing chamber of said master cylinder is connected to said rear pressure chamber of said pressure-control cylinder.

11. A braking system comprising:
    a hydraulically operated brake cylinder for operating a brake;
    a master cylinder operable according to an operation of a manually operable brake operating member, to pressurize a working fluid;

a power-operated drive device;

a pressure-control cylinder having a control piston which is operable by said power-operated drive device and which partially defines a front control-pressure chamber and a rear pressure chamber on respective front and rear sides thereof, said front control-pressure chamber being connected to said brake cylinder while said rear pressure chamber being directly connected through a fluid passage to said master cylinder; and a braking-pressure control device operable to control said power-operated drive device, to thereby control the pressure of the fluid in said brake cylinder.

12. A braking system according to claim 1, wherein said master cylinder includes a pressurizing piston which partially defines a pressurizing chamber and which is operable by said manually operable brake operating member, to pressurize the fluid in said pressurizing chamber, and said high-pressure source comprises a power-operated drive device, and a pressure-control cylinder having a control piston which is operable by said power-operated drive device and which partially defines a front control-pressure chamber and a rear pressure chamber on respective front and rear sides thereof, said front control-pressure chamber being connected to said brake cylinder, while said rear pressure chamber being connected to said pressurizing chamber such that a pressure of the fluid pressurized in said pressurizing chamber is applicable to said rear pressure chamber, said braking system further comprising a braking-pressure control device operable to control an electric energy to be applied to said power-operated drive device, for controlling the pressure of the fluid in said front control-pressure chamber, to thereby control the pressure of the fluid in said brake cylinder.

13. A braking system according to claim 12, further comprising a stroke simulator including:

a housing;

a simulator piston slidably received within said housing and cooperating with said housing to define a first variable-volume chamber and a second variable-volume chamber, said first variable-volume chamber being connected to said pressurizing chamber of said master cylinder, while said second variable-volume chamber being connected to said rear pressure chamber of said pressure-control cylinder; and biasing means for biasing said simulator piston in a direction that causes a volume of said first variable-volume chamber to be reduced.

14. A braking system according to claim 13, which is arranged such that an amount of increase of the volume of said rear pressure chamber is larger than an amount of decrease of said second variable-volume chamber of said stroke simulator.

15. A braking system according to claim 12, further comprising:

a low-pressure source which stores the working fluid under a pressure substantially equal to an atmospheric pressure; and a valve device disposed in a fluid passage connecting said low-pressure source and said rear pressure chamber of said pressure-control cylinder, and operable to control a flow of the fluid between said low-pressure source and said rear pressure chamber.

16. A braking system according to claim 15, wherein said valve device includes a check valve which permits a flow of the fluid in a first direction from said low-pressure source toward said rear pressure chamber and inhibits a flow of the fluid in a second direction opposite to said first direction.

17. A braking system according to claim 15, wherein said valve device includes an electromagnetic control valve which is placed in an open state while said control piston is being advanced.

18. A braking system according to claim 12, further comprising a flow-restricting device operable to restrict a discharge flow of the fluid from said rear pressure chamber when the fluid pressure in said brake cylinder is required to be held at a present level.

19. A braking system comprising:

a hydraulically operated brake cylinder for operating a brake;

a master cylinder operable according to an operation of a manually operable brake operating member, to pressurize a working fluid;

a power-operated drive device;

a pressure-control cylinder having a control piston which is operable by said power-operated drive device and which partially defines a front control-pressure chamber and a rear pressure chamber on respective front and rear sides thereof, said front control-pressure chamber being connected to said brake cylinder;

a braking-pressure control device operable to control an electric energy to be applied to said power-operated drive device, for controlling the pressure of the fluid in said front control-pressure chamber, to thereby control the pressure in said brake cylinder, while said brake cylinder is isolated from said master cylinder; and a flow-restricting device operable to restrict a discharge flow of the fluid from said rear pressure chamber when the fluid pressure in said brake cylinder is required to be held at a present level.

20. A braking system according to claim 19, further comprising a reservoir system including a reservoir which stores the fluid at a pressure substantially equal to an atmospheric level, and wherein said flow-restricting device is disposed in a fluid passage connecting said reservoir system and said rear pressure chamber, said flow-restricting device restricting the discharge flow of the fluid from said rear pressure chamber to said reservoir system at least when the fluid pressure in said brake cylinder is required to be held at the present level.

21. A braking system according to claim 19, further comprising a master cylinder system including said master cylinder, and wherein said flow-restricting device restricts the discharge flow of the fluid from said rear pressure chamber to said master cylinder system at least when the fluid pressure in said brake cylinder is required to be held at the present level.

22. A braking system according to claim 21, wherein said master cylinder includes a pressurizing piston which partially defines a pressurizing chamber and which is advanced by an operation of said manually operable brake operating member, to pressurize the fluid in said pressurizing chamber, and said master cylinder system further includes a stroke simulator comprising (a) a housing, (b) a simulator piston slidably received within said housing and cooperating with said housing to define a first variable-volume chamber and a second variable-volume chamber, said first variable-volume chamber being connected to said pressurizing chamber of said master cylinder, while said second variable-volume chamber being connected to said rear pressure chamber of said pressure-control cylinder, and (c)

biasing means for biasing said simulator piston in a direction that causes a volume of said first variable-volume chamber to be reduced.

23. A braking system according to claim 22, wherein said flow-restricting device is disposed on at least one of upstream and downstream sides of said stroke simulator which correspond to said first and second variable-volume chambers connected to said pressurizing chamber and said rear pressure chamber, respectively.

24. A braking system according to claim 19, wherein said flow-restricting device restricts the discharge flow of the fluid from said rear pressure chamber to a portion of the braking system other than a brake cylinder portion which includes said brake cylinder.

25. A braking system according to claim 19, wherein said braking-pressure control device includes a pressure-hold-requirement detecting portion operable to detect a pressure-hold requirement for holding the fluid pressure in said brake cylinder, on the basis of an operating state of said manually operable brake operating member.

26. A braking system according to claim 19, wherein said braking-pressure control device includes an electric-energy reducing portion operable to reduce an amount of electric energy applied to said power-operated drive device after initiation of restriction of the discharge flow of the fluid from the rear pressure chamber by said flow-restricting device, as compared with an amount of electric energy applied to said power-operated drive device before the initiation of restriction.

27. A braking system according to claim 25, wherein said braking-pressure control device includes an area-ratio-based electric-energy reducing portion operable to reduce an amount of electric energy applied to said power-operated drive device, to a value determined by an amount of electric energy required to be applied to said power-operated drive device when said pressure-hold requirement is detected by said pressure-hold-requirement detecting portion, and a ratio of an area of a front pressure-receiving surface of said control piston which partially defines said front control-pressure chamber, to an area of a rear pressure-receiving surface of said control piston which partially defines said rear pressure chamber.

28. A braking system according to claim 27, wherein the area of said rear pressure-receiving surface of said control piston is smaller than that of said front pressure-receiving surface.

29. A braking system according to claim 19, wherein said braking-pressure control device includes a stroke-based electric-energy control portion operable while the discharge flow of the fluid from said rear pressure chamber is restricted by said flow-restricting device, to control an amount of electric current to be applied to said power-operated drive device, on the basis of an operating stroke of said control piston, and a control-pressure-based electric-energy control portion operable when said discharge flow is not restricted by said flow-restricting device, to control said amount of electric current, on the basis of the fluid pressure in said control-pressure chamber.

30. A braking system according to claim 25, wherein said braking-pressure control device reduces an amount of electric current to be applied to said power-operated drive device, to a predetermined value, when said pressure-hold-requirement detecting portion has detected said pressure-hold requirement.

31. A braking system according to claim 25, wherein said braking-pressure control device controls an amount of electric current to be applied to said power-operated drive device, to a value determined by an operating state of said manually operable brake operating member, when said pressure-hold-requirement detecting has detected said pressure-hold requirement.

32. A braking system according to claim 19, wherein said flow-restricting device includes an electromagnetic control valve operable in response to a signal received from said braking-pressure control device, and said braking-pressure control device includes a valve and electric-energy control portion operable to control said electromagnetic control valve and an amount of electric energy to be applied to said power-operated drive device, on the basis of an operating state of said manually operable brake operating member, while said brake cylinder is isolated from said master cylinder.

33. A braking system according to claim 32, further comprising a check valve device which permits a flow of the fluid in a first direction from said rear pressure chamber toward said brake cylinder and inhibits a flow of the fluid in a second direction opposite to said first direction, and wherein said valve and electric-energy control portion includes an electric-energy increasing and reducing portion operable to first increase said amount of electric energy and place said electromagnetic control valve in a flow-inhibiting state for inhibiting the discharge flow of the fluid from said rear pressure chamber, when said pressure-hold-requirement detecting portion has detected said pressure-hold requirement, said electric-energy increasing and reducing portion then reducing said amount of electric energy after said amount of electric energy has been once increased and said electromagnetic control valve has been placed in said flow-inhibiting state.

34. A braking system according to claim 33, wherein said electric-energy increasing and reducing portion includes a stroke-based electric-energy increasing portion operable to increase said amount of electric energy, on the basis of an amount of increase of a volume of said front control-pressure chamber which takes place due to a retracting movement of said control piston.

35. A braking system according to claim 33, wherein said electric-energy increasing and reducing portion includes a control-pressure-based electric-energy increasing portion operable to increase said amount of electric energy, on the basis of an amount of reduction of a volume of said front control-pressure chamber which takes place due to a retracting movement of said control piston.

36. A braking system according to claim 33, wherein said electric-energy increasing and reducing portion includes a preset-amount increasing portion operable to increase said amount of electric energy by a predetermined amount.

37. A braking system according to claim 33, wherein said electric-energy increasing and reducing portion includes a holding portion operable to hold said amount of electric energy for a predetermined time after said amount of electric energy is increased and before said amount of electric energy is reduced.

38. A braking system according to claim 19, wherein said flow-restricting device is a flow-inhibiting device operable to inhibit said discharge flow of the fluid from said rear pressure chamber.

39. A braking system according to claim 19, wherein said braking-pressure control device includes:
a leakage detecting portion operable to detect an actual leakage of the fluid from said flow-restricting device or a possibility of said leakage; and
an electric-energy applying portion operable to apply the electric energy to said power-operated drive device when said leakage detecting portion has detected said actual leakage or said possibility.

40. A braking system according to claim 39, wherein said leakage detecting portion includes a portion operable to detect said actual leakage or said possibility on the basis of at lest one of an operating state of the braking system and a running state of a vehicle equipped with the braking system.

41. A braking system according to claim 39, wherein said electric-energy applying portion controls application of the electric energy to said power-operated drive device, on the basis of at least one of an operating state of the braking system and a running state of a vehicle equipped with the braking system.

42. A braking system according to claim 39, wherein said electric-energy applying portion determines at least one of an amount of electric energy to be applied to said power-operated drive device and a time duration for which the electric energy is applied to said power-operated drive device, on the basis of at least one of an operating state of the braking system and a running state of a vehicle equipped with the braking system.

43. A braking system according to claim 12, wherein said braking-pressure control device is operable in a selected one of: (a) a first control state in which the fluid pressure in said brake cylinder is controlled by applying the electric current to the power-operated drive device while said brake cylinder is isolated from said master cylinder; and (b) a second control state in which said brake cylinder is held in communication with said master cylinder, for operating said brake cylinder with the pressurized fluid received from said master cylinder.

44. A braking system according to claim 13, further comprising a simulator-switching device, and wherein said simulator-switching device is operable to switch said stroke simulator between an operable state which permits a change of a volume of said first variable-volume chamber according to the operation of said manually operable brake operating member, and an inoperable state which inhibits said change of the volume of said first variable-volume chamber.

45. A braking system according to claim 12, further comprising a check valve device which permits a flow of the fluid in a first direction from said rear pressure chamber toward said brake cylinder and inhibits a flow of the fluid in a second direction opposite to said first direction.

46. A braking system comprising:
  a hydraulically operated brake cylinder for operating a brake;
  a master cylinder including a pressurizing piston which partially defines a pressurizing chamber and which is operable according to an operation of a manually operable brake operating member, to pressurize a working fluid in said pressurizing chamber;
  a power-operated drive device;
  a pressure-control cylinder having a control piston which is operable by said power-operated drive device and which partially defines a front control-pressure chamber and a rear pressure chamber on respective front and rear sides thereof, said front pressure-control chamber being connected to said brake cylinder;
  a stroke simulator includes (a) a housing, (b) a simulator piston slidably received within said housing and cooperating with said housing to define a first variable-volume chamber and a second variable-volume chamber, said first variable-volume chamber being connected to said pressurizing chamber of said master cylinder, while said second variable-volume chamber being connected to said rear pressure chamber of said pressure-control cylinder, and (c) biasing means for biasing said simulator piston in a direction that causes a volume of said first variable-volume chamber to be reduced; and
  a braking-pressure control device operable in a selected one of (i) a first control state in which the fluid pressure in said brake cylinder is controlled by applying an electric current to the power-operated drive device while said brake cylinder is isolated from said master cylinder and while said stroke simulator is placed in an operable state which permits a change of a volume of said first variable-volume chamber according to the operation of said manually operable brake operating member; and (ii) a second control state in which said brake cylinder is held in communication with said master cylinder, while permitting a flow of the fluid from said rear pressure chamber to said second variable-volume chamber.

47. A braking system comprising:
  a hydraulically operated brake cylinder for operating a brake;
  a power-operated drive device;
  a pressure-control cylinder having a control piston which is operable by said power-operated drive device and which partially defines a front control-pressure chamber and a rear pressure chamber on respective front and rear sides thereof, said front pressure-control chamber being connected to said brake cylinder;
  a braking-pressure control device operable to control application of an electric energy to said power-operated drive device, to control a pressure of a working fluid in said brake cylinder; and
  a flow-restricting device operable to restrict a discharge flow of the fluid from said rear pressure chamber when a predetermined condition is satisfied.

48. A braking system comprising:
  a hydraulically operated brake cylinder for operating a brake;
  a power-operated drive device;
  a pressure-control cylinder having a control piston which is operable by said power-operated drive device and which partially defines a front control-pressure chamber and a rear pressure chamber on respective front and rear sides thereof, said front pressure-control chamber being connected to said brake cylinder;
  a braking-pressure control device operable to control application of an electric energy to said power-operated drive device, to control a pressure of a working fluid in said brake cylinder; and
  a flow-restricting device operable to restrict a discharge flow of the fluid from said rear pressure chamber when the pressure of the fluid in said brake cylinder is required to be held at a present level.

49. A braking system comprising:
  a hydraulically operated brake cylinder for operating a brake;
  a master cylinder including a pressurizing piston which partially defines a pressurizing chamber and which is operable according to an operation of a manually operable brake operating member, to pressurize a working fluid;
  a power-operated drive device;
  a pressure-control cylinder having a control piston which is operable by said power-operated drive device and which partially defines a front control-pressure chamber and a rear pressure chamber on respective front and rear sides thereof, said front pressure-control chamber being connected to said brake cylinder;
  a fluid passage connecting said rear pressure chamber and said pressurizing chamber of said master cylinder;

a stroke simulator disposed ins aid fluid passage and includes (a) a housing, (b) a simulator piston slidably received within said housing and cooperating with said housing to define a first variable-volume chamber and a second variable-volume chamber, said first variable-volume chamber being connected to said pressurizing chamber of said master cylinder, while said second variable-volume chamber being connected to said rear pressure chamber of said pressure-control cylinder, and (c) biasing means for biasing said simulator piston in a direction that causes a volume of said first variable-volume chamber to be reduced; and a braking-pressure control device operable to control an electric energy to be applied to said power-operated drive device, for controlling the pressure of the fluid in said front control-pressure chamber, to thereby control the pressure in said brake cylinder.

50. A braking system comprising:

a hydraulically operated brake cylinder for operating a brake;

a master cylinder including a pressurizing piston which partially defines a pressurizing chamber and which is operable according to an operation of a manually operable brake operating member, to pressurize a working fluid;

a power-operated drive device;

a pressure-control cylinder having a control piston which is operable by said power-operated drive device and which partially defines a front control-pressure chamber and a rear pressure chamber on respective front and rear sides thereof, said front pressure-control chamber being connected to said brake cylinder;

a master-cylinder passage connecting said rear pressure chamber and said pressurizing chamber of said master cylinder;

a reservoir which stores the working fluid under a pressure substantially equal to an atmospheric level;

a reservoir passage connecting said rear pressure chamber and said reservoir; and a braking-pressure control device operable to control application of an electric energy to said power-operated drive device, to control a pressure of a working fluid in said brake cylinder.

51. A braking system according to claim 50, wherein said master-cylinder passage is provided with a stroke simulator and a simulator control valve which are connected in series with each other.

52. A braking system according to claim 50, wherein said master-cylinder passage is provided with a stroke simulator and a check valve which are connected in series with each other such that said check valve is disposed between said stroke simulator and said rear pressure chamber.

53. A braking system according to claim 50, wherein said reservoir passage is provided with at least one of (a) a reservoir communication valve which is operable switched at least between an open state and a closed state, and (b) a check valve which permits a flow of the fluid in a first direction from said reservoir toward said rear pressure chamber and inhibits a flow of the fluid in a second direction opposite to said first direction.

54. A braking system according to claim 51, wherein said reservoir passage is connected to a portion of said master-cylinder passage between said simulator control valve and said stroke simulator.

55. A braking system according to claim 54, wherein said portion of said master-cylinder passage is connected by a connecting passage to said front control-pressure chamber, and said connecting passage is provided with a check valve which permits a flow of the fluid in a first direction from said portion toward said rear pressure chamber and inhibits a flow of the fluid in a second direction opposite to said first direction.

56. A braking system according to claim 52, wherein said reservoir passage is provided with a reservoir communication valve, and a portion of said reservoir passage between said reservoir communication valve and said reservoir is connected by a connecting passage to a portion of said master-cylinder passage between said stroke simulator and said check valve, said connecting passage being provided with a check valve.

* * * * *